United States Patent
Decoster et al.

(10) Patent No.: US 11,772,031 B2
(45) Date of Patent: *Oct. 3, 2023

(54) FILTER CARTRIDGES; AIR CLEANER ASSEMBLIES; HOUSINGS; FEATURES COMPONENTS; AND, METHODS

(71) Applicant: Donaldson Company, Inc., Minneapolis, MN (US)

(72) Inventors: Kristof Decoster, Vilvoorde (BE); Johnny Craessaerts, Sint-Agatha-Rode (BE); Johan G. Dewit, CP Den Haag (NL); Bart Catoor, Kessel-lo (BE); Tim Billiau, Bierbeek (BE); Anthonius Jan-Baptist Maria Moers, Holsbeek (BE); Rui Sun, Minneapolis, MN (US); Jacob C. Savstrom, Minneapolis, MN (US)

(73) Assignee: Donaldson Company, Inc., Bloomington, MN (US)

( * ) Notice: Subject to any disclaimer, the term of this patent is extended or adjusted under 35 U.S.C. 154(b) by 224 days.

This patent is subject to a terminal disclaimer.

(21) Appl. No.: 17/066,705

(22) Filed: Oct. 9, 2020

(65) Prior Publication Data

US 2021/0101104 A1 Apr. 8, 2021

Related U.S. Application Data

(63) Continuation of application No. 16/062,579, filed as application No. PCT/US2016/067329 on Dec. 16, 2016, now Pat. No. 10,835,852.

(Continued)

(51) Int. Cl.
*B01D 46/52* (2006.01)
*B01D 46/62* (2022.01)
*B01D 50/20* (2022.01)

(52) U.S. Cl.
CPC ......... *B01D 46/526* (2013.01); *B01D 46/527* (2013.01); *B01D 46/62* (2022.01);
(Continued)

(58) Field of Classification Search
CPC .......... B01D 2271/02; B01D 2271/022; B01D 2271/025; B01D 2271/027;
(Continued)

(56) References Cited

U.S. PATENT DOCUMENTS

| | | | |
|---|---|---|---|
| 4,925,561 | A | 5/1990 | Ishii et al. |
| 5,049,326 | A | 9/1991 | Matsumoto et al. |

(Continued)

FOREIGN PATENT DOCUMENTS

| | | |
|---|---|---|
| DE | 38 06 208 A1 | 9/1989 |
| DE | 20 2008 017 059 U1 | 6/2010 |

(Continued)

OTHER PUBLICATIONS

Office Action corresponding to China Application 20168007395.1 dated Apr. 19, 2021.
(Continued)

*Primary Examiner* — Robert Clemente
(74) *Attorney, Agent, or Firm* — Merchant & Gould P.C.

(57) ABSTRACT

Air cleaner assemblies, components, and features are described. The features can be used to provide that the air cleaner assembly includes a housing and cover within which a filter cartridge having a media pack and a seal arrangement surrounding the media pack can be installed. The air cleaner assembly may also include a projection-receiver arrangement in which the filter cartridge has at least one first member and the housing has at least one second member that interacts with the first member. In one example, a portion of the seal arrangement is coplanar with the first member and a portion that is below the first member such that the first (Continued)

member is located between the seal arrangement and an inlet end of the filter cartridge.

17 Claims, 81 Drawing Sheets

Related U.S. Application Data

(60) Provisional application No. 62/316,713, filed on Apr. 1, 2016, provisional application No. 62/269,761, filed on Dec. 18, 2015.

(52) U.S. Cl.
CPC ........ *B01D 50/20* (2022.01); *B01D 2265/021* (2013.01); *B01D 2265/026* (2013.01); *B01D 2271/027* (2013.01)

(58) Field of Classification Search
CPC .......... B01D 46/525–527; B01D 46/10; B01D 2265/021; B01D 2265/026
See application file for complete search history.

(56) References Cited

U.S. PATENT DOCUMENTS

| | | |
|---|---|---|
| 5,472,463 A | 12/1995 | Herman et al. |
| 5,525,226 A | 6/1996 | Brown et al. |
| 5,562,825 A | 10/1996 | Yamada et al. |
| 5,613,992 A | 3/1997 | Engel |
| 5,738,785 A | 4/1998 | Brown et al. |
| 5,772,883 A | 6/1998 | Rothman et al. |
| D396,098 S | 7/1998 | Gillingham et al. |
| 5,792,247 A | 8/1998 | Gillingham et al. |
| D398,046 S | 9/1998 | Gillingham et al. |
| D399,944 S | 10/1998 | Gillingham et al. |
| 5,820,646 A | 10/1998 | Gillingham et al. |
| 5,895,574 A | 4/1999 | Friedmann et al. |
| 5,902,364 A | 5/1999 | Tokar et al. |
| 6,039,778 A | 3/2000 | Coulonvaux |
| D428,128 S | 7/2000 | Gillingham et al. |
| 6,179,890 B1 | 1/2001 | Ramos et al. |
| D437,401 S | 2/2001 | Ramos et al. |
| 6,190,432 B1 | 2/2001 | Gieseke et al. |
| 6,210,469 B1 | 4/2001 | Tokar |
| 6,235,195 B1 | 5/2001 | Tokar |
| 6,350,296 B1 | 2/2002 | Warner |
| 6,419,718 B1 | 7/2002 | Klug et al. |
| 6,482,247 B2 | 11/2002 | Jaroszczyk et al. |
| 6,673,136 B2 | 1/2004 | Gillingham et al. |
| 6,936,084 B2 | 8/2005 | Schlensker et al. |
| 6,949,189 B2 | 9/2005 | Bassett et al. |
| 7,311,748 B2 | 12/2007 | Holmes et al. |
| 7,351,270 B2 | 4/2008 | Engelland et al. |
| 7,494,017 B2 | 2/2009 | Miller |
| 7,625,419 B2 | 12/2009 | Nelson et al. |
| 7,708,953 B2 | 5/2010 | Cremeens et al. |
| 7,967,886 B2 | 6/2011 | Schrage et al. |
| 8,034,145 B2 | 10/2011 | Boehrs et al. |
| 8,061,530 B2 | 11/2011 | Kindkeppel et al. |
| 8,097,061 B2 | 1/2012 | Smith et al. |
| 8,152,876 B2 | 4/2012 | Gillenberg et al. |
| 8,202,419 B2 | 6/2012 | Wallerstorfer et al. |
| 8,246,702 B2 | 8/2012 | Ackermann et al. |
| 8,349,049 B2 | 1/2013 | Amesöder et al. |
| 8,361,181 B2 | 1/2013 | Osendorf et al. |
| RE44,424 E | 8/2013 | Barnwell |
| 8,778,044 B2 | 7/2014 | Amesoeder et al. |
| 8,864,866 B2 | 10/2014 | Osendorf et al. |
| 8,916,044 B2 | 12/2014 | Rapin |
| 9,114,346 B2 | 8/2015 | Schrage et al. |
| 9,120,047 B2 | 9/2015 | Boehrs et al. |
| 9,180,399 B2 | 11/2015 | Reichter et al. |
| 9,320,997 B2 | 4/2016 | Campbell et al. |
| 9,346,001 B2 | 5/2016 | Kato et al. |
| 9,346,002 B2 | 5/2016 | Kleynen |
| 10,029,198 B2 | 7/2018 | Adamek et al. |
| 10,357,732 B2 | 7/2019 | Rieger et al. |
| 10,835,852 B2 * | 11/2020 | Decoster ................ B01D 46/62 |
| 11,426,691 B2 | 8/2022 | Decoster et al. |
| 11,517,840 B2 | 12/2022 | Moers et al. |
| 2004/0187689 A1 | 9/2004 | Sporre et al. |
| 2005/0130508 A1 | 6/2005 | Yeh |
| 2006/0037296 A1 | 2/2006 | Duffy |
| 2008/0041026 A1 | 2/2008 | Engel et al. |
| 2008/0142426 A1 | 6/2008 | Greco et al. |
| 2008/0282890 A1 | 11/2008 | Rocklitz et al. |
| 2009/0127211 A1 | 5/2009 | Rocklitz et al. |
| 2009/0230051 A1 | 9/2009 | Holmes et al. |
| 2010/0032365 A1 | 2/2010 | Moe et al. |
| 2010/0064646 A1 | 3/2010 | Smith et al. |
| 2012/0067014 A1 | 3/2012 | Dhiman et al. |
| 2013/0000267 A1 | 1/2013 | Merritt |
| 2013/0062270 A1 | 3/2013 | Braunheim |
| 2014/0102060 A1 | 4/2014 | Kato et al. |
| 2014/0165834 A1 | 6/2014 | Kaufmann et al. |
| 2014/0208705 A1 | 7/2014 | Krull |
| 2014/0251895 A1 | 9/2014 | Wagner |
| 2014/0260143 A1 | 9/2014 | Kaiser |
| 2015/0096931 A1 | 4/2015 | Jensen |
| 2015/0101295 A1 | 4/2015 | Thompson et al. |
| 2015/0306530 A1 | 10/2015 | Reichter et al. |
| 2016/0040633 A1 * | 2/2016 | Schmid ............ F02M 35/02491 55/502 |
| 2016/0045848 A1 | 2/2016 | Campbell et al. |
| 2016/0059172 A1 | 3/2016 | Allott et al. |
| 2016/0131094 A1 | 5/2016 | Pereira Madeira et al. |
| 2017/0001134 A1 | 1/2017 | Rieger et al. |
| 2017/0232374 A1 | 8/2017 | Osendorf et al. |
| 2017/0266601 A1 | 9/2017 | Carter et al. |
| 2018/0142650 A1 | 5/2018 | Finn |
| 2018/0318745 A1 | 11/2018 | Nichols et al. |
| 2018/0369735 A1 | 12/2018 | Decoster et al. |
| 2019/0070548 A1 | 3/2019 | Franz et al. |
| 2019/0105593 A1 | 4/2019 | Krull et al. |
| 2019/0299143 A1 | 10/2019 | Decoster et al. |
| 2020/0032423 A1 | 10/2020 | Moers et al. |
| 2020/0324237 A1 | 10/2020 | Moers et al. |
| 2023/0001341 A1 | 1/2023 | Decoster et al. |

FOREIGN PATENT DOCUMENTS

| | | |
|---|---|---|
| DE | 10 2016 002 954 A1 | 9/2016 |
| EP | 2 774 667 A1 | 9/2014 |
| EP | 2 665 535 B1 | 4/2016 |
| JP | 4141226 B2 | 8/2008 |
| WO | 97/40918 A1 | 11/1997 |
| WO | 02/098540 A1 | 12/2002 |
| WO | 03/047722 A2 | 6/2003 |
| WO | 2004/007054 A1 | 1/2004 |
| WO | 2004/082795 A2 | 9/2004 |
| WO | 2005/077487 A1 | 8/2005 |
| WO | 2006/014941 A2 | 2/2006 |
| WO | 2006/026241 A1 | 3/2006 |
| WO | 2006/076456 A1 | 7/2006 |
| WO | 2006/076479 A1 | 7/2006 |
| WO | 2007/133635 A2 | 11/2007 |
| WO | 2009/014988 A1 | 1/2009 |
| WO | 2009/039285 A1 | 3/2009 |
| WO | 2010/033291 A1 | 3/2010 |
| WO | 2010033291 | 3/2010 |
| WO | 2010/117799 A2 | 10/2010 |
| WO | 2013/063497 A2 | 5/2013 |
| WO | 2013/104792 A1 | 7/2013 |
| WO | 2014/078796 A2 | 5/2014 |
| WO | 2014/210541 A1 | 12/2014 |
| WO | 2015/010085 A2 | 1/2015 |
| WO | 2015/054397 A1 | 4/2015 |
| WO | 2016/077377 A1 | 5/2016 |
| WO | 2016/105560 A2 | 6/2016 |

(56) References Cited

FOREIGN PATENT DOCUMENTS

WO   2017/079191 A1   5/2017
WO   2017/106752 A1   6/2017

OTHER PUBLICATIONS

International Search Report and Written Opinion for Application No. PCT/US2016/067329 dated Mar. 14, 2017.
Search Report and Written Opinion corresponding to PCT/US2018/062628, dated Apr. 30, 2019.

* cited by examiner

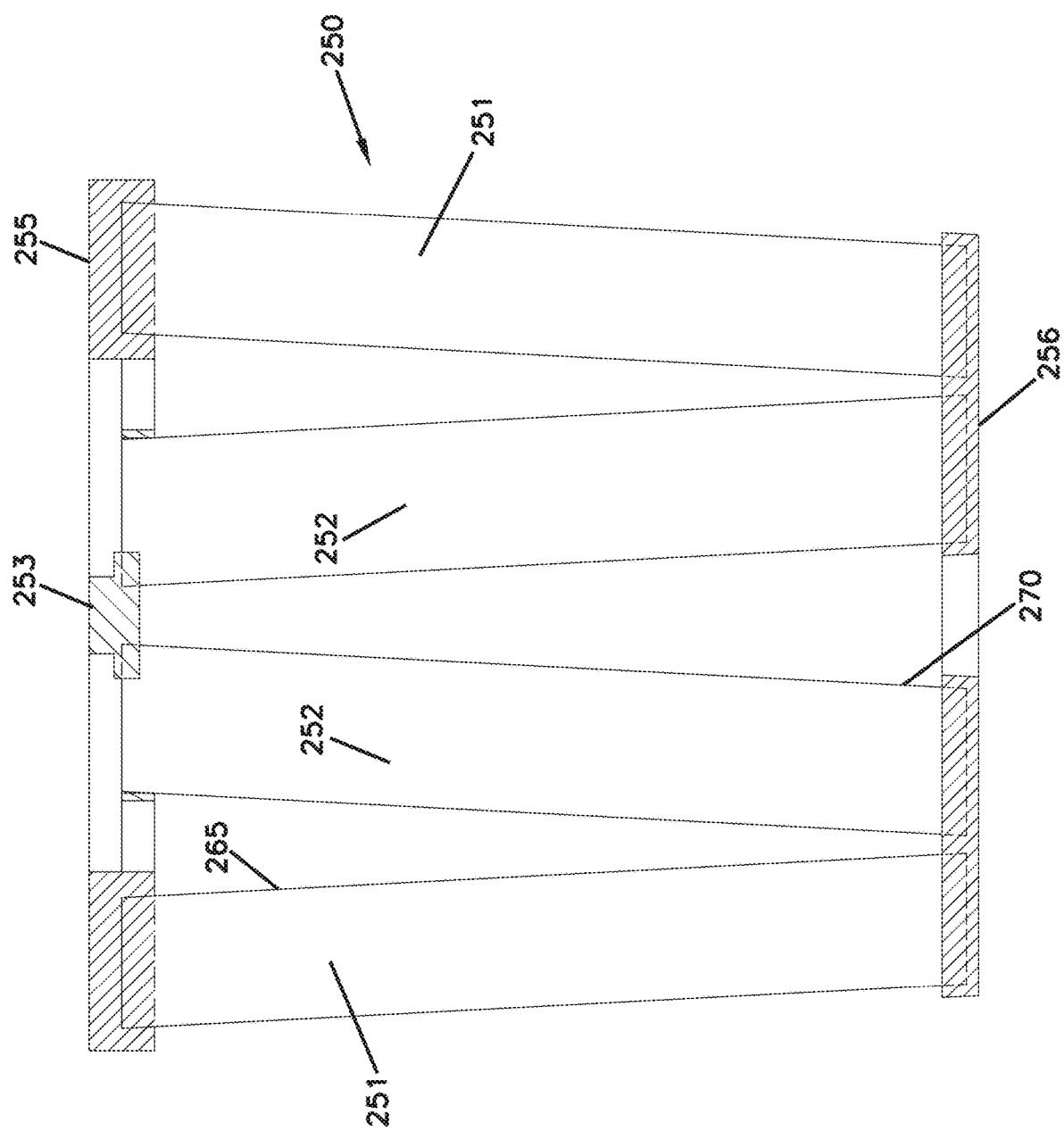

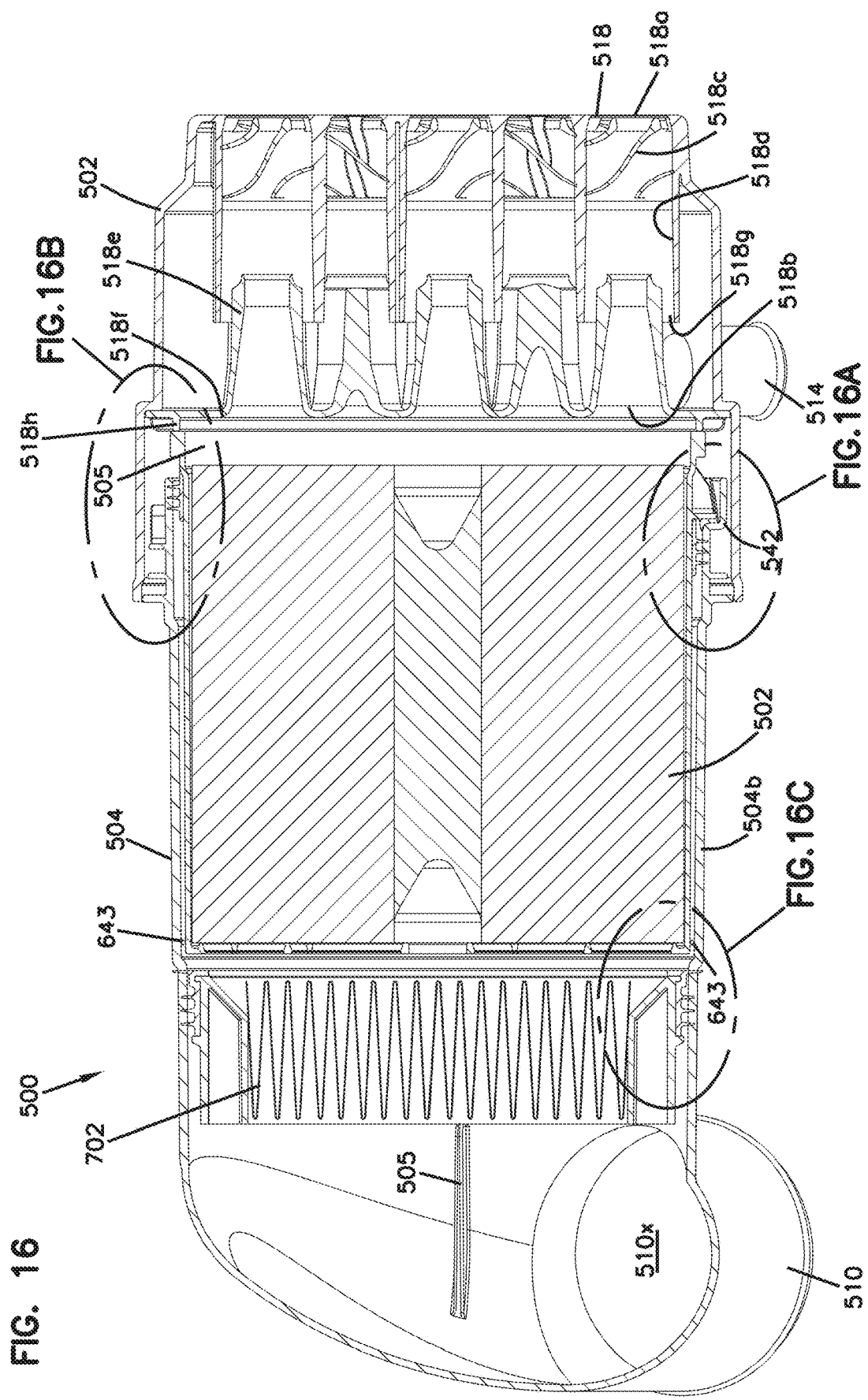

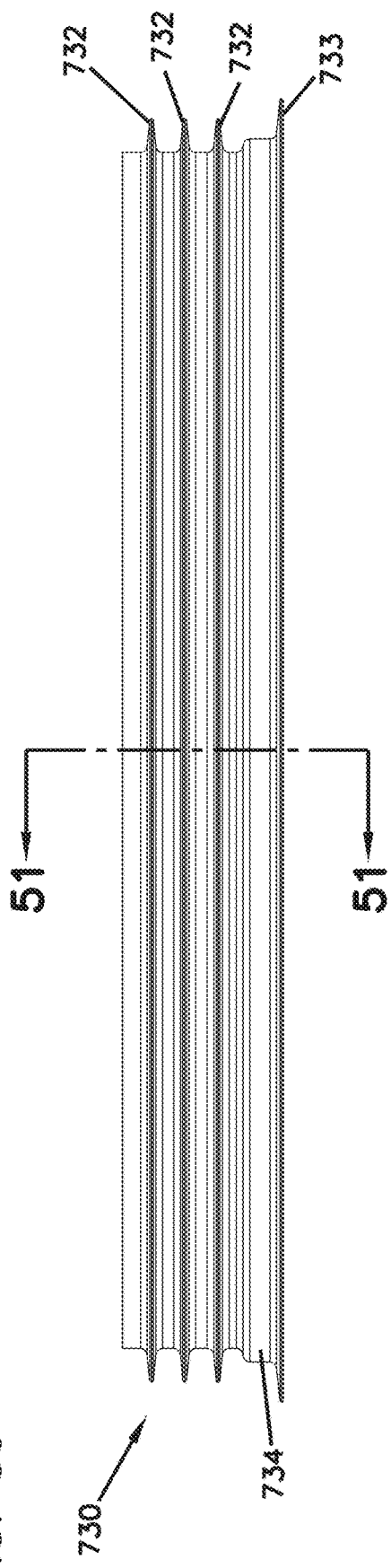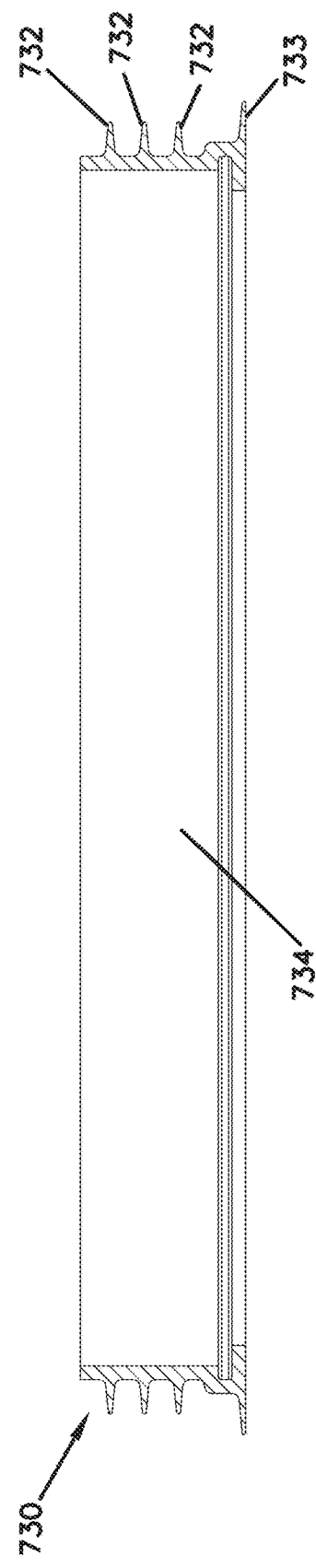

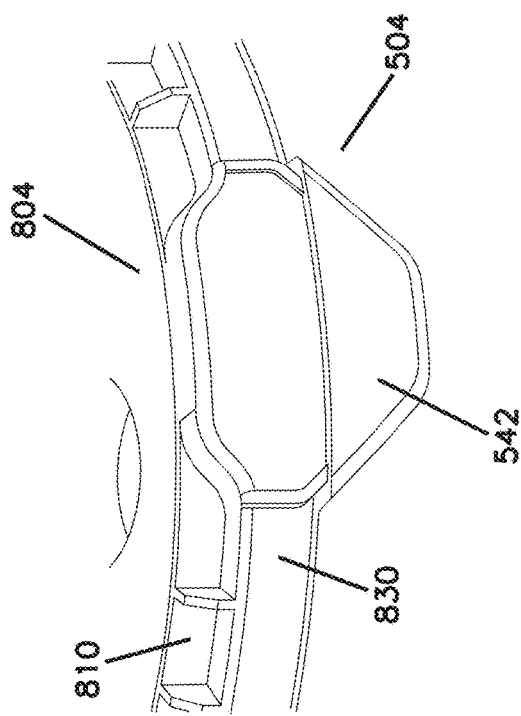
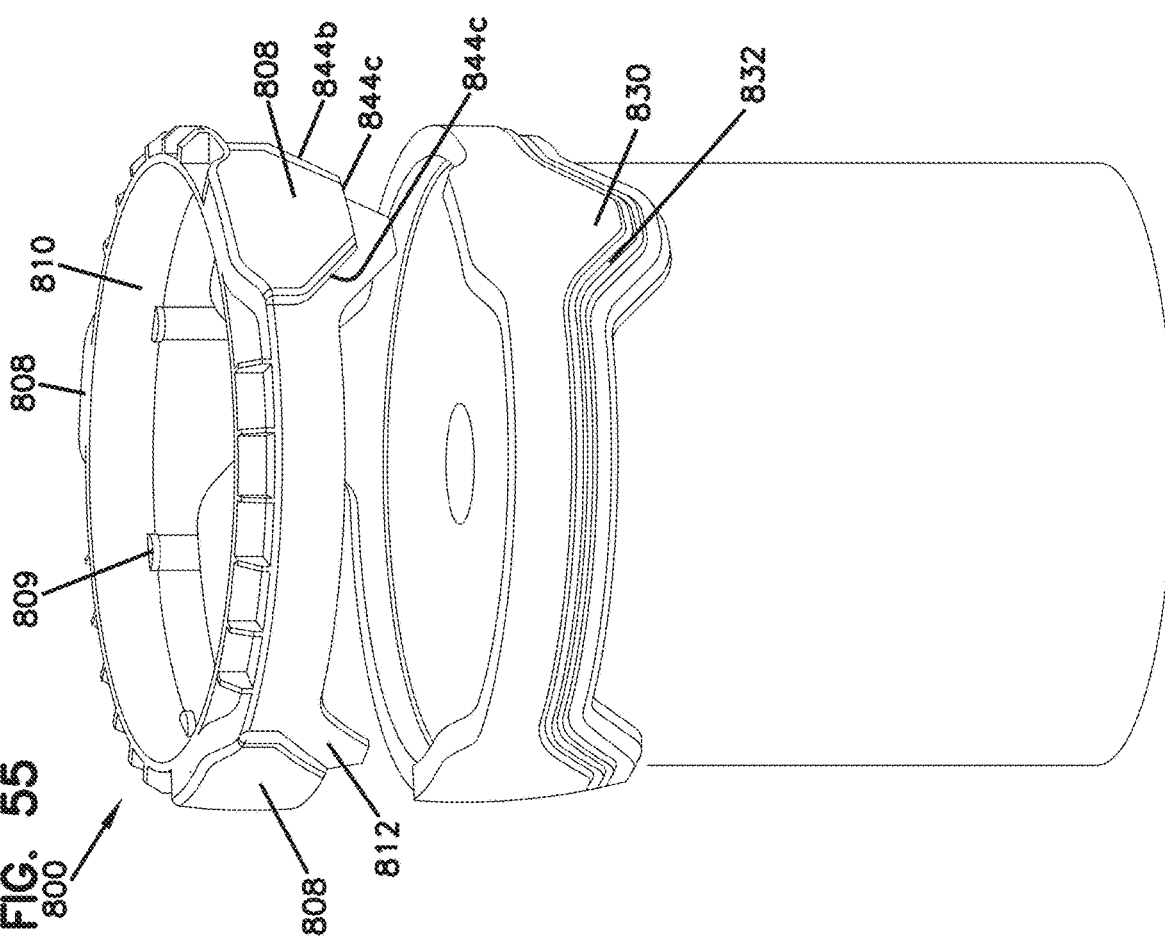

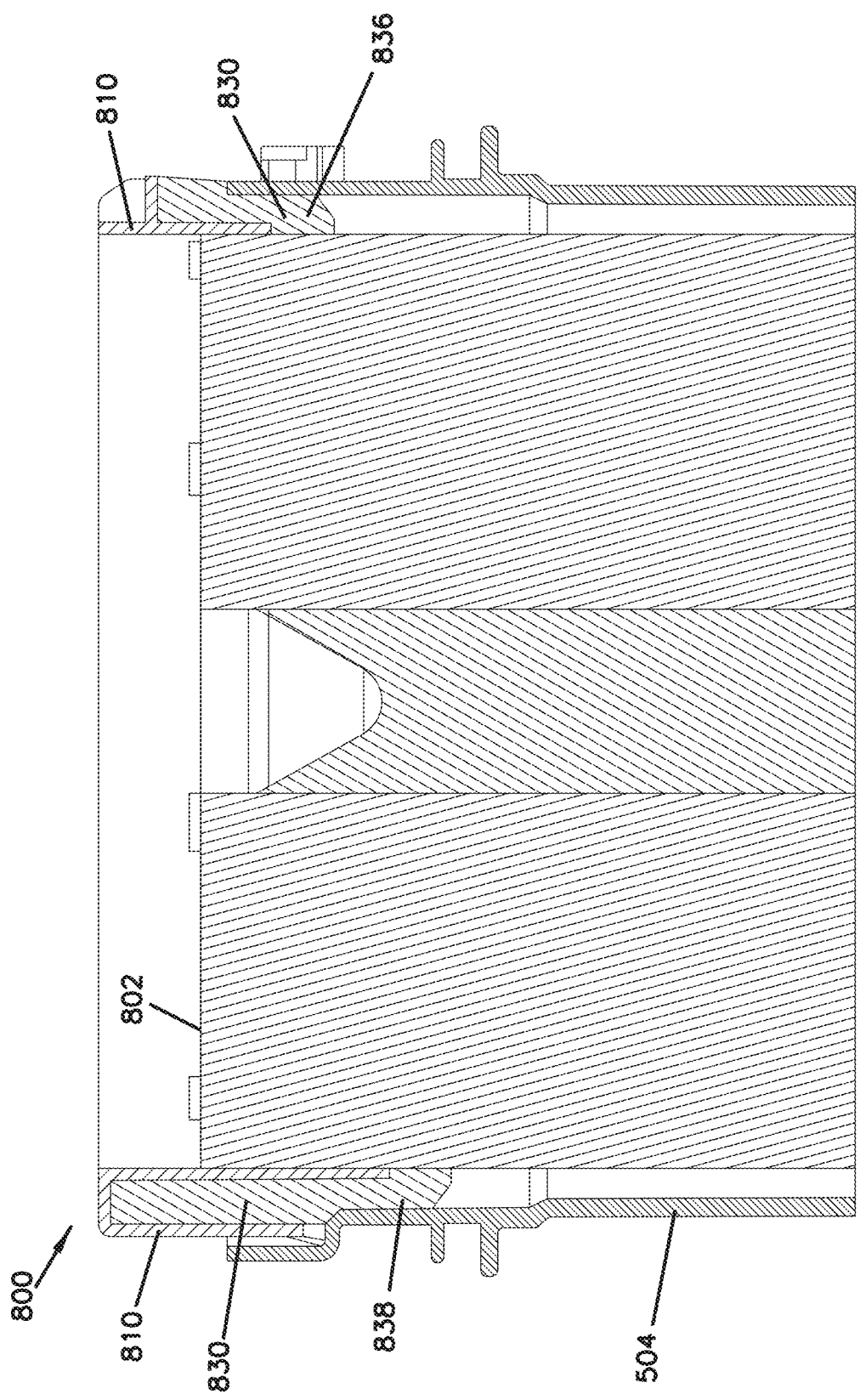

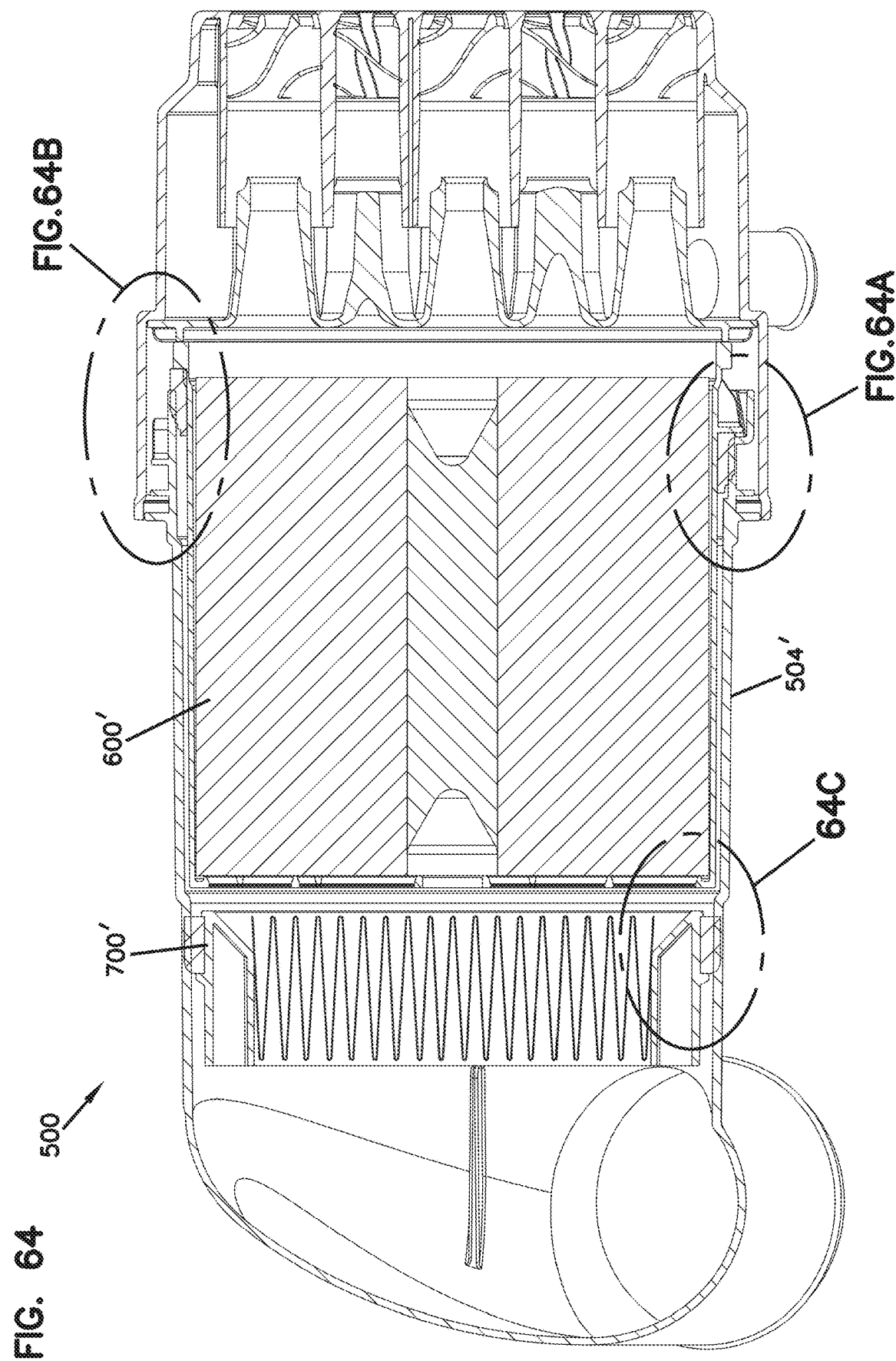

FILTER CARTRIDGES; AIR CLEANER ASSEMBLIES; HOUSINGS; FEATURES COMPONENTS; AND, METHODS

CROSS-REFERENCE TO RELATED APPLICATIONS

This application is a continuation of U.S. application Ser. No. 16/062,579, filed Jun. 14, 2018, now U.S. Pat. No. 10,835,852. U.S. application Ser. No. 16/062,579 is a National Stage application of PCT International patent application No. PCT/US2016/067329, filed Dec. 16, 2016, which claims priority to U.S. Provisional Patent Applications 62/269,761, filed on Dec. 18, 2015 and 62/316,713, filed on Apr. 1, 2016. The above-referenced applications are incorporated herein by reference. To the extent appropriate, a claim of priority is made to each of the above disclosed applications.

FIELD OF THE DISCLOSURE

The present disclosure relates to filter arrangements, typically for use in filtering air; such as intake air for internal combustion engines. The disclosure particularly relates to filter arrangements that use cartridges having opposite flow ends. Air cleaner arrangements and features; and, methods of assembly and use, are also described.

BACKGROUND

Air streams can carry contaminant material such as dust and liquid particulate therein. In many instances, it is desired to filter some or all of the contaminant material from the air stream. For example, air flow streams to engines (for example combustion air streams) for motorized vehicles or for power generation equipment, gas streams to gas turbine systems and air streams to various combustion furnaces, carry particulate contaminant therein that should be filtered. It is preferred, for such systems, that selected contaminant material be removed from (or have its level reduced in) the air. A variety of air filter arrangements have been developed for contaminant removal. Improvements are sought.

SUMMARY

According to the present disclosure, air cleaner assemblies, housings, serviceable filter cartridges and features, components, and methods, relating thereto are disclosed. In general, the features relate to systems that are configured to ensure proper orientation and sealing of a filter cartridge within an air cleaner assembly housing. A variety of approaches are described herein, that can be used independently or together to achieve a desired result.

BRIEF DESCRIPTION OF THE DRAWINGS

FIG. 8B is a schematic cross-sectional view of the media pack of FIGS. 8 and 8A.

FIG. 16 is a schematic, cross-sectional view of the air cleaner assembly of FIG. 13, taken along the line 16-16 shown in FIG. 15.

FIG. 50 is a schematic side view of the seal arrangement shown in FIG. 49.

FIG. 51 is a schematic cross-sectional view of the seal arrangement shown in FIG. 49, taken along the line 51-51 in FIG. 50.

FIG. 55 is a schematic partially exploded view of the air filter cartridge shown in FIG. 53.

FIG. 56 is a schematic perspective partial view of the air filter cartridge shown in FIG. 53 installed into the housing shown in FIG. 13.

FIG. 57 is a schematic cross-sectional view of the air filter cartridge shown in FIG. 53 in a fully installed position in the housing shown in FIG. 13.

FIG. 64 is a schematic, cross-sectional view of the air cleaner assembly of FIG. 13, taken along the line 16-16 shown in FIG. 15, but with the filter cartridges of FIGS. 58 and 65 installed.

DETAILED DESCRIPTION

I. Example Media Configurations, Generally

Figure 1:
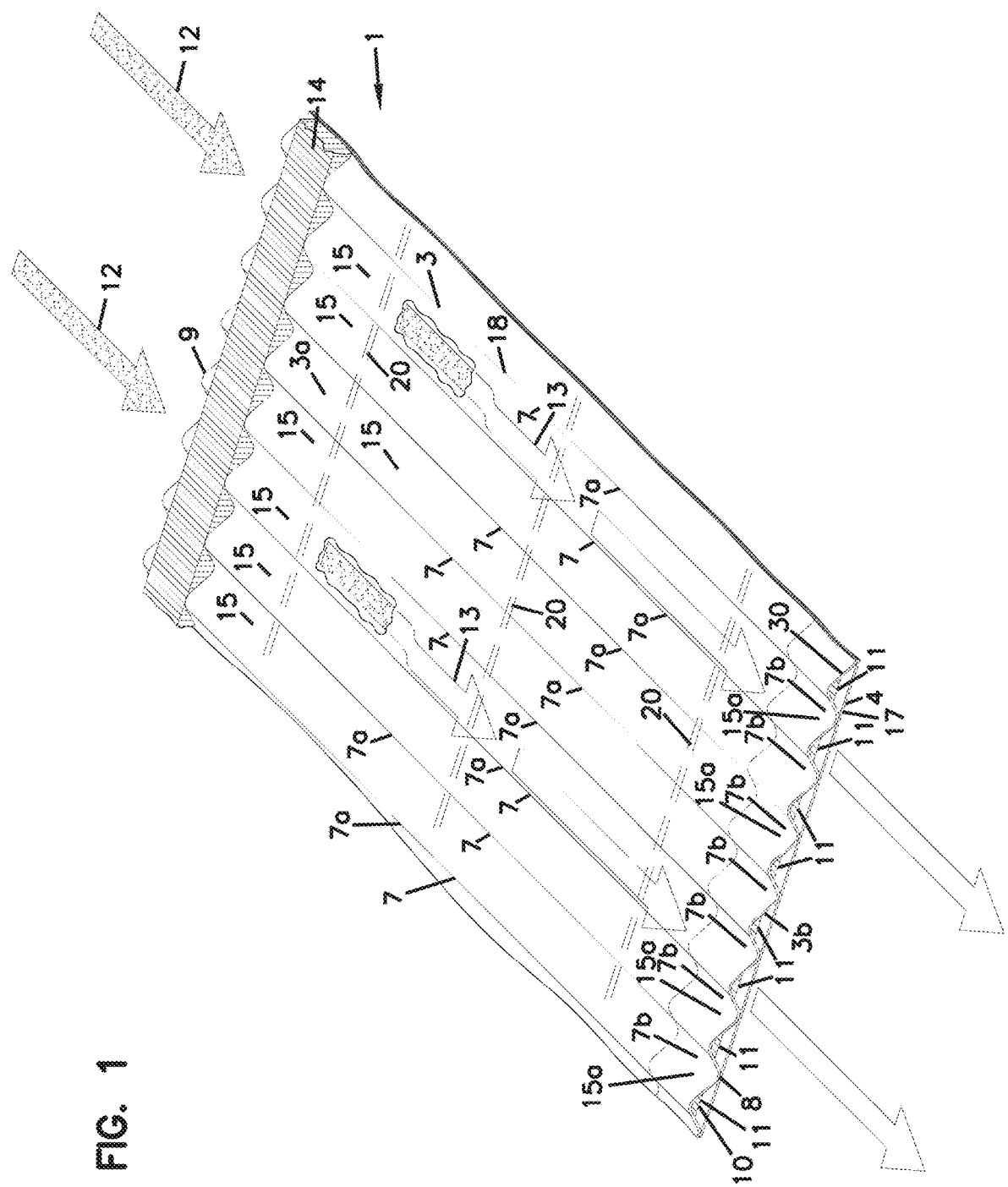
FIG. 1 is a fragmentary, schematic, perspective view of a first example media type useable in arrangements according to the present disclosure.

Principles according to the present disclosure relate to interactions between filter cartridges and air cleaner systems, in advantageous manners to achieve certain, selected, desired results discussed below. The filter cartridge would generally include a filter media therein, through which air and other gases pass, during a filtering operation. The media can be of a variety of types and configurations, and can be made from using a variety of materials. For example, pleated media arrangements can be used in cartridges according to the principles of the present disclosure, as discussed below.

The principles are particularly well adapted for use in situations in which the media is quite deep in extension between the inlet and outlet ends of the cartridge, but alternatives are possible. Also, the principles are often used in cartridges that relatively large cross-dimension sizes. With such arrangements, alternate media types to pleated media will often be desired.

In this section, examples of some media arrangements that are usable with the techniques described herein are provided. It will be understood, however, that a variety of alternate media types can be used. The choice of media type is generally one of preference for: availability; function in a given situation of application, ease of manufacturability, etc. and the choice is not necessarily specifically related to the overall function of selected ones of various filter cartridge/air cleaner interaction features characterized herein.

A. Media Pack Arrangements Using Filter Media Having Media Ridges (flutes) Secured to Facing Media Fluted filter media (media having media ridges) can be used to provide fluid filter constructions in a variety of manners. One well known manner is characterized herein as a z-filter construction. The term "z-filter construction" as used herein, is meant to include (but not be limited) a type of filter construction in which individual ones of corrugated, folded or otherwise formed filter flutes are used to define (typically in combination with facing media) sets of longitudinal, typically parallel, inlet and outlet filter flutes for fluid flow through the media. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428,128; Des. 396,098; Des. 398,046; and, Des. 437,401; each of these cited references being incorporated herein by reference.

One type of z-filter media, utilizes two specific media components joined together, to form the media construction. The two components are: (1) a fluted (typically corrugated) media sheet or sheet section, and, (2) a facing media sheet or sheet section. The facing media sheet is typically non-corrugated, however it can be corrugated, for example perpendicularly to the flute direction as described in U.S. provisional 60/543,804, filed Feb. 11, 2004, and published as PCT WO 05/077487 on Aug. 25, 2005, incorporated herein by reference.

The fluted media section and facing media section can comprise separate materials between one another. However, they can also be sections of the single media sheet folded to bring the facing media material into appropriate juxtaposition with the fluted media portion of the media.

The fluted (typically corrugated) media sheet and the facing media sheet or sheet section together, are typically used to define media having parallel flutes. In some instances, the fluted sheet and facing sheet are separate and then secured together and are then coiled, as a media strip, to form a z-filter media construction. Such arrangements are described, for example, in U.S. Pat. Nos. 6,235,195 and 6,179,890, each of which is incorporated herein by reference. In certain other arrangements, some non-coiled sections or strips of fluted (typically corrugated) media secured to facing media, are stacked with one another, to create a filter construction. An example of this is described in FIG. 11 of U.S. Pat. No. 5,820,646, incorporated herein by reference.

Herein, strips of material comprising fluted sheet (sheet of media with ridges) secured to corrugated sheet, which are then assembled into stacks to form media packs, are sometimes referred to as "single facer strips," "single faced strips," or as "single facer" or "single faced" media. The terms and variants thereof, are meant to refer to a fact that one face, i.e., a single face, of the fluted (typically corrugated) sheet is faced by the facing sheet, in each strip.

Typically, coiling of a strip of the fluted sheet/facing sheet (i.e., single facer) combination around itself, to create a coiled media pack, is conducted with the facing sheet directed outwardly. Some techniques for coiling are described in U.S. provisional application 60/467,521, filed May 2, 2003 and PCT Application US 04/07927, filed Mar. 17, 2004, now published as WO 04/082795, each of which is incorporated herein by reference. The resulting coiled arrangement generally has, as the outer surface of the media pack, a portion of the facing sheet, as a result.

The term "corrugated" used herein to refer to structure in media, is often used to refer to a flute structure resulting from passing the media between two corrugation rollers, i.e., into a nip or bite between two rollers, each of which has surface features appropriate to cause corrugations in the resulting media. The term "corrugation" is however, not meant to be limited to such flutes, unless it is stated that they result from flutes that are by techniques involving passage of media into a bite between corrugation rollers. The term "corrugated" is meant to apply even if the media is further modified or deformed after corrugation, for example by the folding techniques described in PCT WO 04/007054, and published Jan. 22, 2004, incorporated herein by reference.

Corrugated media is a specific form of fluted media. Fluted media is media which has individual flutes or ridges (for example formed by corrugating or folding) extending thereacross.

Serviceable filter element or filter cartridge configurations utilizing z-filter media are sometimes referred to as "straight through flow configurations" or by variants thereof. In general, in this context what is meant is that the serviceable filter elements or cartridges generally have an inlet flow end (or face) and an opposite exit flow end (or face), with flow entering and exiting the filter cartridge in generally the same straight through direction. The term "serviceable" in this context is meant to refer to a media containing filter cartridge that is periodically removed and replaced from a corresponding fluid (e.g. air) cleaner. In some instances, each of the inlet flow end (or face) and outlet flow end (or face) will be generally flat or planar, with the two parallel to one another. However, variations from this, for example non-planar faces, are possible.

A straight through flow configuration (especially for a coiled or stacked media pack) is, for example, in contrast to serviceable filter cartridges such as cylindrical pleated filter cartridges of the type shown in U.S. Pat. No. 6,039,778, incorporated herein by reference, in which the flow generally makes a substantial turn as its passes into and out of the media. That is, in a U.S. Pat. No. 6,039,778 filter, the flow enters the cylindrical filter cartridge through a cylindrical side, and then turns to exit through an open end of the media (in forward-flow systems). In a typical reverse-flow system, the flow enters the serviceable cylindrical cartridge through an open end of the media and then turns to exit through a side of the cylindrical filter media. An example of such a reverse-flow system is shown in U.S. Pat. No. 5,613,992, incorporated by reference herein.

The term "z-filter media construction" and variants thereof as used herein, without more, is meant to include, but not necessarily be limited to, any or all of: a web of corrugated or otherwise fluted media (media having media ridges) secured to (facing) media, whether the sheets are separate or part of a single web, with appropriate sealing (closure) to allow for definition of inlet and outlet flutes; and/or a media pack constructed or formed from such media into a three dimensional network of inlet and outlet flutes; and/or, a filter cartridge or construction including such a media pack.

In FIG. 1, an example of media 1 useable in z-filter media construction is shown. The media 1 is formed from a fluted, in this instance corrugated, sheet 3 and a facing sheet 4. A construction such as media 1 is referred to herein as a single facer or single faced strip.

Sometimes, the corrugated fluted or ridged sheet 3, FIG. 1, is of a type generally characterized herein as having a regular, curved, wave pattern of flutes, ridges or corrugations 7. The term "wave pattern" in this context, is meant to refer to a flute, ridge or corrugated pattern of alternating troughs 7b and ridges 7a. The term "regular" in this context is meant to refer to the fact that the pairs of troughs and ridges (7b, 7a) alternate with generally the same repeating corrugation (flute or ridge) shape and size. (Also, typically in a regular configuration each trough 7b is substantially an inverse ridge for each ridge 7a.) The term "regular" is thus meant to indicate that the corrugation (or flute) pattern comprises troughs (inverted ridges) and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction, an equal number of ridges and troughs is necessarily present. The media 1 could be terminated, for example, between a pair comprising a ridge and a trough, or partially along a pair comprising a ridge and a trough. (For example, in FIG. 1 the media 1 depicted in fragmentary has eight complete ridges 7a and seven complete troughs 7b.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, in certain instances the corrugation pattern is not the result of a folded or creased shape provided to the media, but rather the apex 7a of each ridge and the bottom 7b of each trough is formed along a radiused curve. A typical radius for such z-filter media would be at least 0.25 mm and typically would be not more than 3 mm.

An additional characteristic of the particular regular, curved, wave pattern depicted in FIG. 1, for the corrugated sheet 3, is that at approximately a midpoint 30 between each trough and each adjacent ridge, along most of the length of the flutes 7, is located a transition region where the curvature inverts. For example, viewing back side or face 3a, FIG. 1, trough 7b is a concave region, and ridge 7a is a convex region. Of course when viewed toward front side or face 3b, trough 7b of side 3a forms a ridge; and, ridge 7a of face 3a, forms a trough. (In some instances, region 30 can be a straight segment, instead of a point, with curvature inverting at ends of the segment 30.)

A characteristic of the particular regular, wave pattern fluted (in this instance corrugated) sheet 3 shown in FIG. 1, is that the individual corrugations, ridges or flutes are generally straight, although alternatives are possible. By "straight" in this context, it is meant that through at least 70%, typically at least 80% of the length, the ridges 7a and troughs (or inverted ridges) 7b do not change substantially in cross-section. The term "straight" in reference to corrugation pattern shown in FIG. 1, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 1 and as referenced above, the media 1 has first and second opposite edges 8 and 9. When the media 1 is formed into a media pack, in general edge 9 will form an inlet end or face for the media pack and edge 8 an outlet end or face, although an opposite orientation is possible.

In the example depicted, the various flutes 7 extend completely between the opposite edges 8, 9, but alternatives are possible. For example, they can extend to a location adjacent or near the edges, but not completely therethrough. Also, they can be stopped and started partway through the media, as for example in the media of US 2014/0208705 A1, incorporated herein by reference.

When the media is as depicted in FIG. 1, adjacent edge 8 can provided a sealant bead 10, sealing the corrugated sheet 3 and the facing sheet 4 together. Bead 10 will sometimes be referred to as a "single facer" or "single face" bead, or by variants, since it is a bead between the corrugated sheet 3 and facing sheet 4, which forms the single facer (single faced) media strip 1. Sealant bead 10 seals closed individual flutes 11 adjacent edge 8, to passage of air therefrom (or thereto in an opposite flow).

In the media depicted in FIG. 1, adjacent edge 9 is provided seal bead 14. Seal bead 14 generally closes flutes 15 to passage of unfiltered fluid therefrom (or flow therein in an opposite flow), adjacent edge 9. Bead 14 would typically be applied as media 1 is configured into a media pack. If the media pack is made from a stack of strips 1, bead 14 will form a seal between a back side 17 of facing sheet 4, and side 18 of the next adjacent corrugated sheet 3. When the media 1 is cut in strips and stacked, instead of coiled, bead 14 is referenced as a "stacking bead." (When bead 14 is used in a coiled arrangement formed from a long strip of media 1, it may be referenced as a "winding bead.").

In alternate types of through-flow media, seal material can be located differently, and added sealant or adhesive can even be avoided. For example, in some instances, the media can be folded to form an end or edge seam; or, the media can be sealed closed by alternate techniques such as ultrasound application, etc. Further, even when sealant material is used, it need not be adjacent opposite ends.

Referring to FIG. 1, once the filter media 1 is incorporated into a media pack, for example by stacking or coiling, it can be operated as follows. First, air in the direction of arrows 12, would enter open flutes 11 adjacent end 9. Due to the closure at end 8, by bead 10, the air would pass through the filter media 1, for example as shown by arrows 13. It could then exit the media or media pack, by passage through open ends 15a of the flutes 15, adjacent end 8 of the media pack. Of course operation could be conducted with air flow in the opposite direction.

For the particular arrangement shown herein in FIG. 1, the parallel corrugations 7a, 7b are generally straight completely across the media, from edge 8 to edge 9. Straight flutes, ridges or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown. Also, flutes which are modified in shape to include various ridges are known.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

Typically, in the corrugation process, an inelastic deformation is caused to the media. This prevents the media from returning to its original shape. However, once the tension is released the flute or corrugations will tend to spring back, recovering only a portion of the stretch and bending that has occurred. The facing media sheet is sometimes tacked to the fluted media sheet, to inhibit this spring back in the corrugated sheet. Such tacking is shown at 20.

Also, typically, the media contains a resin. During the corrugation process, the media can be heated to above the glass transition point of the resin. When the resin then cools, it will help to maintain the fluted shapes.

The media of the corrugated (fluted) sheet 3 facing sheet 4 or both, can be provided with a fine fiber material on one or both sides thereof, for example in accord with U.S. Pat. No. 6,673,136, incorporated herein by reference. In some instances, when such fine fiber material is used, it may be desirable to provide the fine fiber on the upstream side of the material and inside the flutes. When this occurs, air flow, during filtering, will typically be into the edge comprising the stacking bead.

An issue with respect to z-filter constructions relates to closing of the individual flute ends. Although alternatives are possible, typically a sealant or adhesive is provided, to accomplish the closure. As is apparent from the discussion above, in typical z-filter media especially that which uses straight flutes as opposed to tapered flutes and sealant for flute seals, large sealant surface areas (and volume) at both the upstream end and the downstream end are needed. High quality seals at these locations are important to proper operation of the media structure that results. The high sealant volume and area, creates issues with respect to this.

Figure 2:
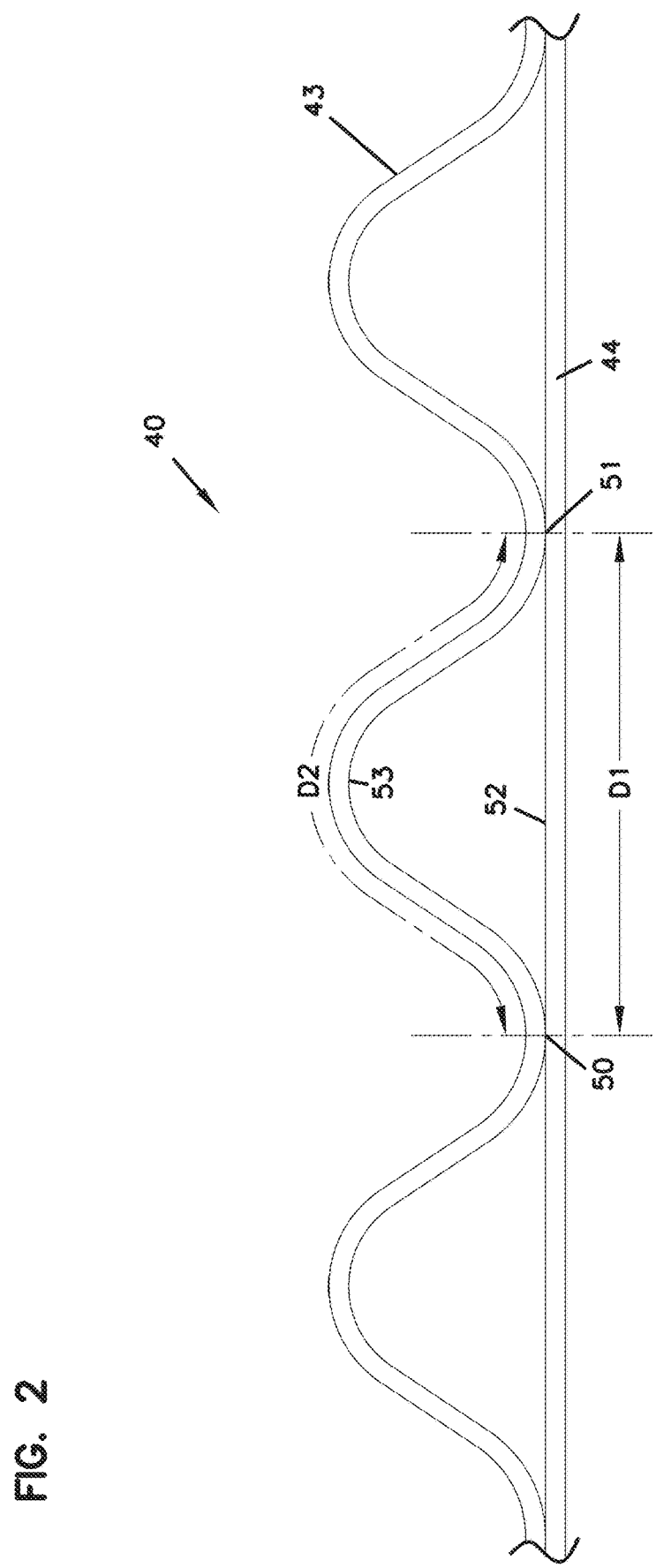
FIG. 2 is an enlarged, schematic, cross-sectional view of a portion of the media type depicted in FIG. 1.

Attention is now directed to FIG. 2, in which z-filter media; i.e., a z-filter media construction 40, utilizing a regular, curved, wave pattern corrugated sheet 43, and a non-corrugated flat sheet 44, i.e., a single facer strip is schematically depicted. The distance D1, between points 50 and 51, defines the extension of flat media 44 in region 52 underneath a given corrugated flute 53. The length D2 of the arcuate media for the corrugated flute 53, over the same distance D1 is of course larger than D1, due to the shape of the corrugated flute 53. For a typical regular shaped media used in fluted filter applications, the linear length D2 of the media 53 between points 50 and 51 will often be at least 1.2 times D1. Typically, D2 would be within a range of 1.2-2.0 times D1, inclusive. One particularly convenient arrangement for air filters has a configuration in which D2 is about 1.25-1.35×D1. Such media has, for example, been used commercially in Donaldson Powercore™ Z-filter arrangements. Another potentially convenient size would be one in which D2 is about 1.4-1.6 times D1. Herein the ratio D2/D1 will sometimes be characterized as the flute/flat ratio or media draw for the corrugated media.

Figure 3:
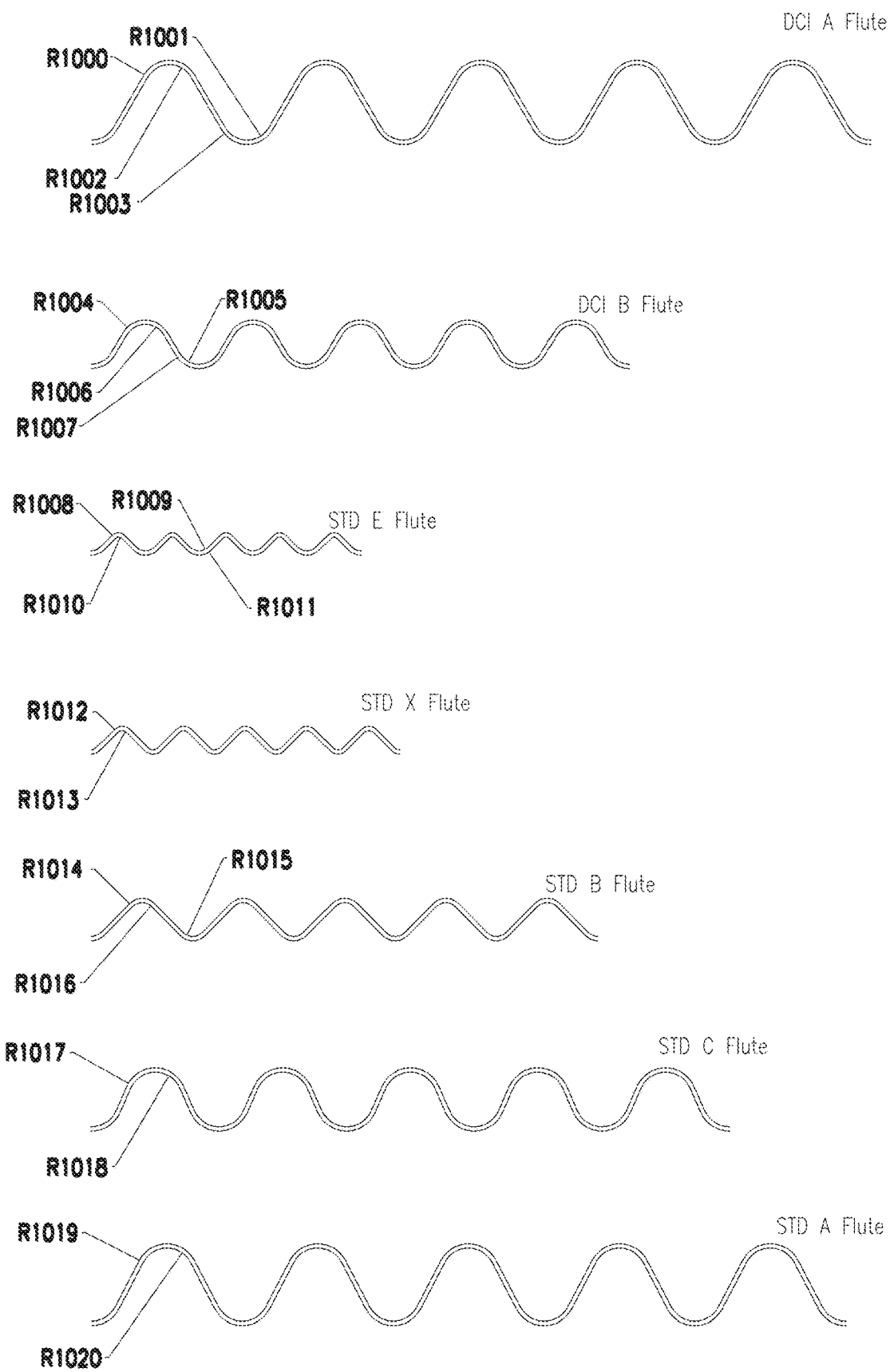
FIG. 3 includes schematic views of examples of various fluted media definitions, for media of the type of FIGS. 1 and 2.

In the corrugated cardboard industry, various standard flutes have been defined. For example the standard E flute, standard X flute, standard B flute, standard C flute and standard A flute. FIG. 3, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 3.

TABLE A (Flute definitions for FIG. 3)

DCI A Flute: Flute/flat = 1.52:1; The Radii (R) are as follows:

R1000 = .0675 inch (1.715 mm); R1001 = .0581 inch (1.476 mm); R1002 = .0575 inch (1.461 mm); R1003 = .0681 inch (1.730 mm); DCI B Flute: Flute/flat = 1.32:1; The Radii (R) are as follows:

R1004 = .0600 inch (1.524 mm); R1005 = .0520 inch (1.321 mm); R1006 = .0500 inch (1.270 mm); R1007 = .0620 inch (1.575 mm); Std. E Flute: Flute/flat = 1.24:1; The Radii (R) are as follows:

R1008 = .0200 inch (.508 mm); R1009 = .0300 inch (.762 mm); R1010 = .0100 inch (.254 mm); R1011 = .0400 inch (1.016 mm); Std. X Flute: Flute/flat = 1.29:1; The Radii (R) are as follows:

R1012 = .0250 inch (.635 mm); R1013 = .0150 inch (.381 mm); Std. B Flute: Flute/flat = 1.29:1; The Radii (R) are as follows:

R1014 = .0410 inch (1.041 mm); R1015 = .0310 inch (.7874 mm); R1016 = .0310 inch (.7874 mm); Std. C Flute: Flute/flat = 1.46:1; The Radii (R) are as follows:

R1017 = .0720 inch (1.829 mm); R1018 = .0620 inch (1.575 mm); Std. A Flute: Flute/flat =1.53:1; The Radii (R) are as follows:

R1019 = .0720 inch (1.829 mm); R1020 = .0620 inch (1.575 mm).

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations.

It is noted that alternative flute definitions such as those characterized in U.S. Ser. No. 12/215,718, filed Jun. 26, 2008; and published as US 2009/0127211; U.S. Ser. No. 12/012,785, filed Feb. 4, 2008 and published as US 2008/0282890 and/or U.S. Ser. No. 12/537,069 published as US 2010/0032365 can be used, with air cleaner features as characterized herein below. The complete disclosures of each of US 2009/0127211, US 2008/0282890 and US 2010/0032365 are incorporated herein by reference.

Another media variation comprising fluted media with facing media secured thereto, can be used in arrangements according to the present disclosure, in either a stacked or coiled form, is described in US 2014/0208705 A1, owned by Baldwin Filters, Inc., published Jul. 31, 2014, and incorporated herein by reference.

B. Manufacture of Media Pack Configurations Including the Media of FIGS. 1-3, see FIGS. 4-7

Figure 4:
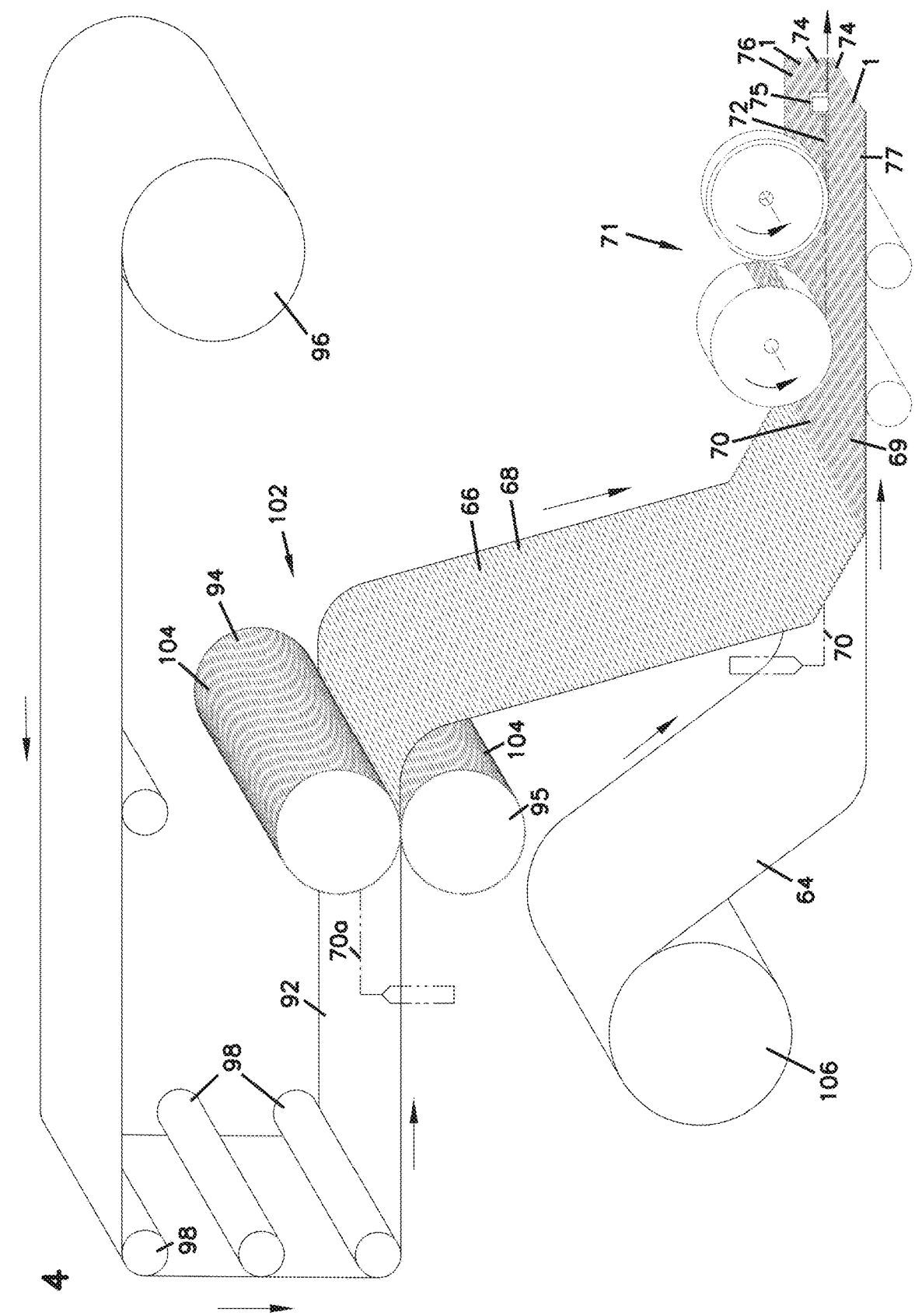
FIG. 4 is a schematic view of an example process for manufacturing media of the type of FIGS. 1-3.

In FIG. 4, one example of a manufacturing process for making a media strip (single facer) corresponding to strip 1, FIG. 1 is shown. In general, facing sheet 64 and the fluted (corrugated) sheet 66 having flutes 68 are brought together to form a media web 69, with an adhesive bead located therebetween at 70. The adhesive bead 70 will form a single facer bead 10, FIG. 1. An optional darting process occurs at station 71 to form center darted section 72 located mid-web. The z-filter media or Z-media strip 74 can be cut or slit at 75 along the bead 70 to create two pieces or strips 76, 77 of z-filter media 74, each of which has an edge with a strip of sealant (single facer bead) extending between the corrugating and facing sheet. Of course, if the optional darting process is used, the edge with a strip of sealant (single facer bead) would also have a set of flutes darted at this location.

Techniques for conducting a process as characterized with respect to FIG. 4 are described in PCT WO 04/007054, published Jan. 22, 2004 incorporated herein by reference.

Still in reference to FIG. 4, before the z-filter media 74 is put through the darting station 71 and eventually slit at 75, it must be formed. In the schematic shown in FIG. 4, this is done by passing a sheet of filter media 92 through a pair of corrugation rollers 94, 95. In the schematic shown in FIG. 4, the sheet of filter media 92 is unrolled from a roll 96, wound around tension rollers 98, and then passed through a nip or bite 102 between the corrugation rollers 94, 95. The corrugation rollers 94, 95 have teeth 104 that will give the general desired shape of the corrugations after the flat sheet 92 passes through the nip 102. After passing through the nip 102, the sheet 92 becomes corrugated across the machine direction and is referenced at 66 as the corrugated sheet. The corrugated sheet 66 is then secured to facing sheet 64. (The corrugation process may involve heating the media, in some instances.)

Still in reference to FIG. 4, the process also shows the facing sheet 64 being routed to the darting process station 71. The facing sheet 64 is depicted as being stored on a roll 106 and then directed to the corrugated sheet 66 to form the Z-media 74. The corrugated sheet 66 and the facing sheet 64 would typically be secured together by adhesive or by other means (for example by sonic welding).

Referring to FIG. 4, an adhesive line 70 is shown used to secure corrugated sheet 66 and facing sheet 64 together, as the sealant bead. Alternatively, the sealant bead for forming the facing bead could be applied as shown as 70a. If the sealant is applied at 70a, it may be desirable to put a gap in the corrugation roller 95, and possibly in both corrugation rollers 94, 95, to accommodate the bead 70a.

Of course the equipment of FIG. 4 can be modified to provide for the tack beads 20, FIG. 1, if desired.

The type of corrugation provided to the corrugated media is a matter of choice, and will be dictated by the corrugation or corrugation teeth of the corrugation rollers 94, 95. One useful corrugation pattern will be a regular curved wave pattern corrugation, of straight flutes or ridges, as defined herein above. A typical regular curved wave pattern used, would be one in which the distance D2, as defined above, in a corrugated pattern is at least 1.2 times the distance D1 as defined above. In example applications, typically D2=1.25–1.35×D1, although alternatives are possible. In some instances the techniques may be applied with curved wave patterns that are not "regular," including, for example, ones that do not use straight flutes. Also, variations from the curved wave patterns shown, are possible.

Figure 5:
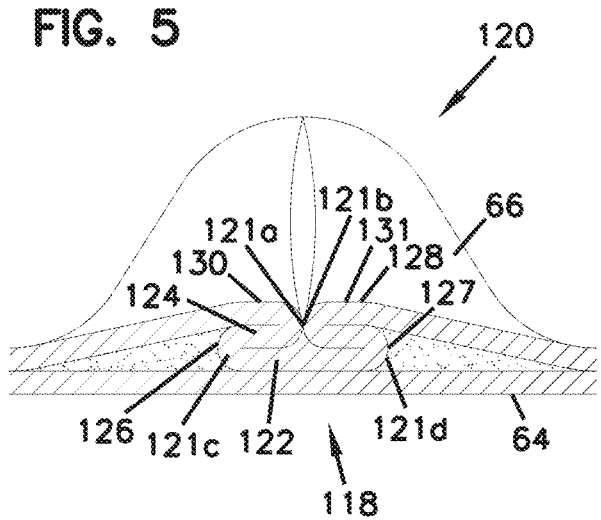
FIG. 5 is a schematic cross-sectional view of an optional end dart for media flutes of the type of FIGS. 1-4.

As described, the process shown in FIG. 4 can be used to create the center darted section 72. FIG. 5 shows, in cross-section, one of the flutes 68 shown in FIG. 4 after darting and slitting to form a darted flute 120.

A fold arrangement 118 can be seen to form the darted flute 120 with four creases 121a, 121b, 121c, 121d. The fold arrangement 118 includes a flat first layer or portion 122 that is secured to the facing sheet 64. A second layer or portion 124 is shown pressed against the first layer or portion 122. The second layer or portion 124 is preferably formed from folding opposite outer ends 126, 127 of the first layer or portion 122.

Still referring to FIG. 5, two of the folds or creases 121a, 121b will generally be referred to herein as "upper, inwardly directed" folds or creases. The term "upper" in this context is meant to indicate that the creases lie on an upper portion of the entire fold 120, when the fold 120 is viewed in the orientation of FIG. 5. The term "inwardly directed" is meant to refer to the fact that the fold line or crease line of each crease 121a, 121b, is directed toward the other.

In FIG. 5, creases 121c, 121d, will generally be referred to herein as "lower, outwardly directed" creases. The term "lower" in this context refers to the fact that the creases 121c, 121d are not located on the top as are creases 121a, 121b, in the orientation of FIG. 5. The term "outwardly directed" is meant to indicate that the fold lines of the creases 121c, 121d are directed away from one another.

The terms "upper" and "lower" as used in this context are meant specifically to refer to the fold 120, when viewed from the orientation of FIG. 5. That is, they are not meant to be otherwise indicative of direction when the fold 120 is oriented in an actual product for use.

Based upon these characterizations and review of FIG. 5, it can be seen that a regular fold arrangement 118 according to FIG. 5 in this disclosure is one which includes at least two "upper, inwardly directed, creases." These inwardly directed creases are unique and help provide an overall arrangement in which the folding does not cause a significant encroachment on adjacent flutes.

A third layer or portion 128 can also be seen pressed against the second layer or portion 124. The third layer or portion 128 is formed by folding from opposite inner ends 130, 131 of the third layer 128.

Another way of viewing the fold arrangement 118 is in reference to the geometry of alternating ridges and troughs of the corrugated sheet 66. The first layer or portion 122 is formed from an inverted ridge. The second layer or portion 124 corresponds to a double peak (after inverting the ridge) that is folded toward, and in preferred arrangements, folded against the inverted ridge.

Techniques for providing the optional dart described in connection with FIG. 5, in a preferred manner, are described in PCT WO 04/007054, incorporated herein by reference. Techniques for coiling the media, with application of the winding bead, are described in PCT application US 04/07927, filed Mar. 17, 2004 and published as WO 04/082795 and incorporated herein by reference.

Alternate approaches to darting the fluted ends closed are possible. Such approaches can involve, for example: darting which is not centered in each flute; and, rolling, pressing or folding over the various flutes. In general, darting involves folding or otherwise manipulating media adjacent to fluted end, to accomplish a compressed, closed, state.

Techniques described herein are particularly well adapted for use in media packs that result from a step of coiling a single sheet comprising a corrugated sheet/facing sheet combination, i.e., a "single facer" strip. However, they can also be made into stacked arrangements.

Coiled media or media pack arrangements can be provided with a variety of peripheral perimeter definitions. In this context the term "peripheral, perimeter definition" and variants thereof, is meant to refer to the outside perimeter shape defined, looking at either the inlet end or the outlet end of the media or media pack. Typical shapes are circular as described in PCT WO 04/007054. Other useable shapes are obround, some examples of obround being oval shape. In general oval shapes have opposite curved ends attached by a pair of opposite sides. In some oval shapes, the opposite sides are also curved. In other oval shapes, sometimes called racetrack shapes, the opposite sides are generally straight. Racetrack shapes are described for example in PCT WO 04/007054, and PCT application US 04/07927, published as WO 04/082795, each of which is incorporated herein by reference.

Another way of describing the peripheral or perimeter shape is by defining the perimeter resulting from taking a cross-section through the media pack in a direction orthogonal to the winding access of the coil.

Opposite flow ends or flow faces of the media or media pack can be provided with a variety of different definitions. In many arrangements, the ends or end faces are generally flat (planer) and perpendicular to one another. In other arrangements, one or both of the end faces include tapered, for example, stepped, portions which can either be defined to project axially outwardly from an axial end of the side wall of the media pack; or, to project axially inwardly from an end of the side wall of the media pack.

The flute seals (for example from the single facer bead, winding bead or stacking bead) can be formed from a variety of materials. In various ones of the cited and incorporated references, hot melt or polyurethane seals are described as possible for various applications.

Figure 6:
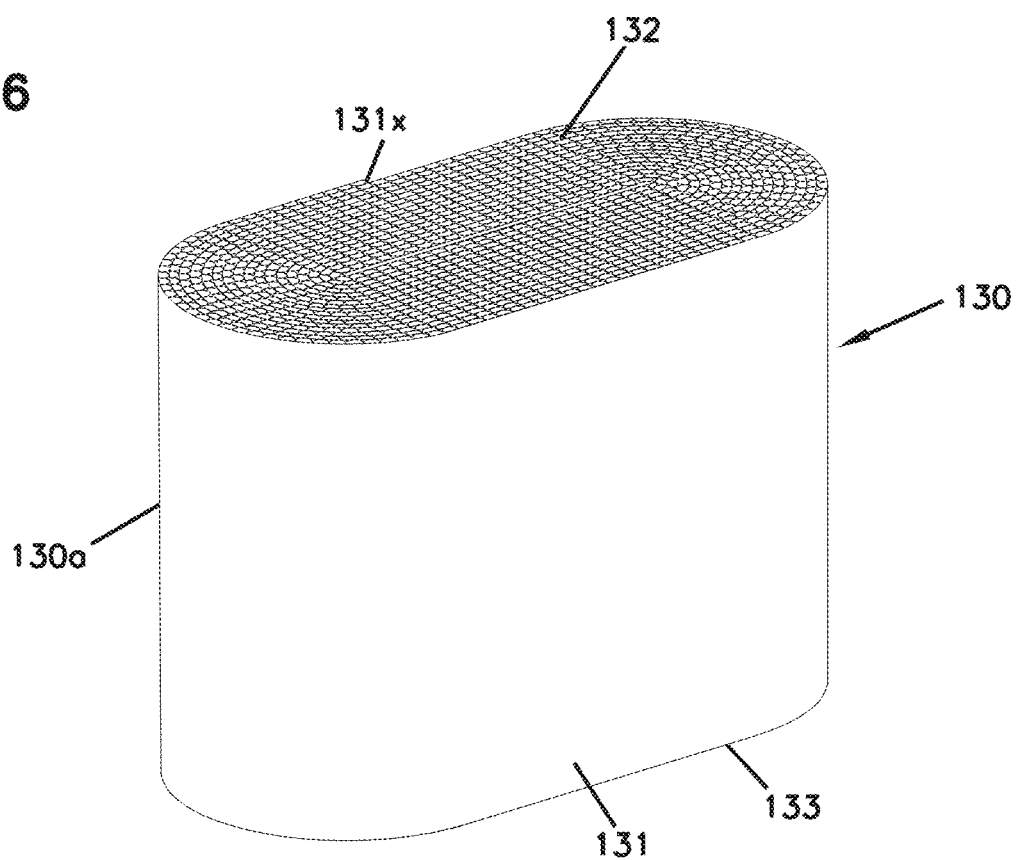
FIG. 6 is a schematic perspective view of a coiled filter arrangement usable in a filter cartridge having features in accord with the present disclosure, and made with a strip of media for example in accord with FIG. 1.

In FIG. 6, a coiled media pack (or coiled media) 130 constructed by coiling a single strip of single faced media is depicted, generally. The particular coiled media pack depicted is an oval media pack 130a, specifically a racetrack shaped media pack 131. The tail end of the media, at the outside of the media pack 130 is shown at 131x. It will be typical to terminate that tail end along straight section of the media pack 130 for convenience and sealing. Typically, a hot melt seal bead or seal bead is positioned along that tail end to ensure sealing. In the media pack 130, the opposite flow (end) faces are designated at 132, 133. One would be an inlet flow face, the other an outlet flow face.

Figure 7:
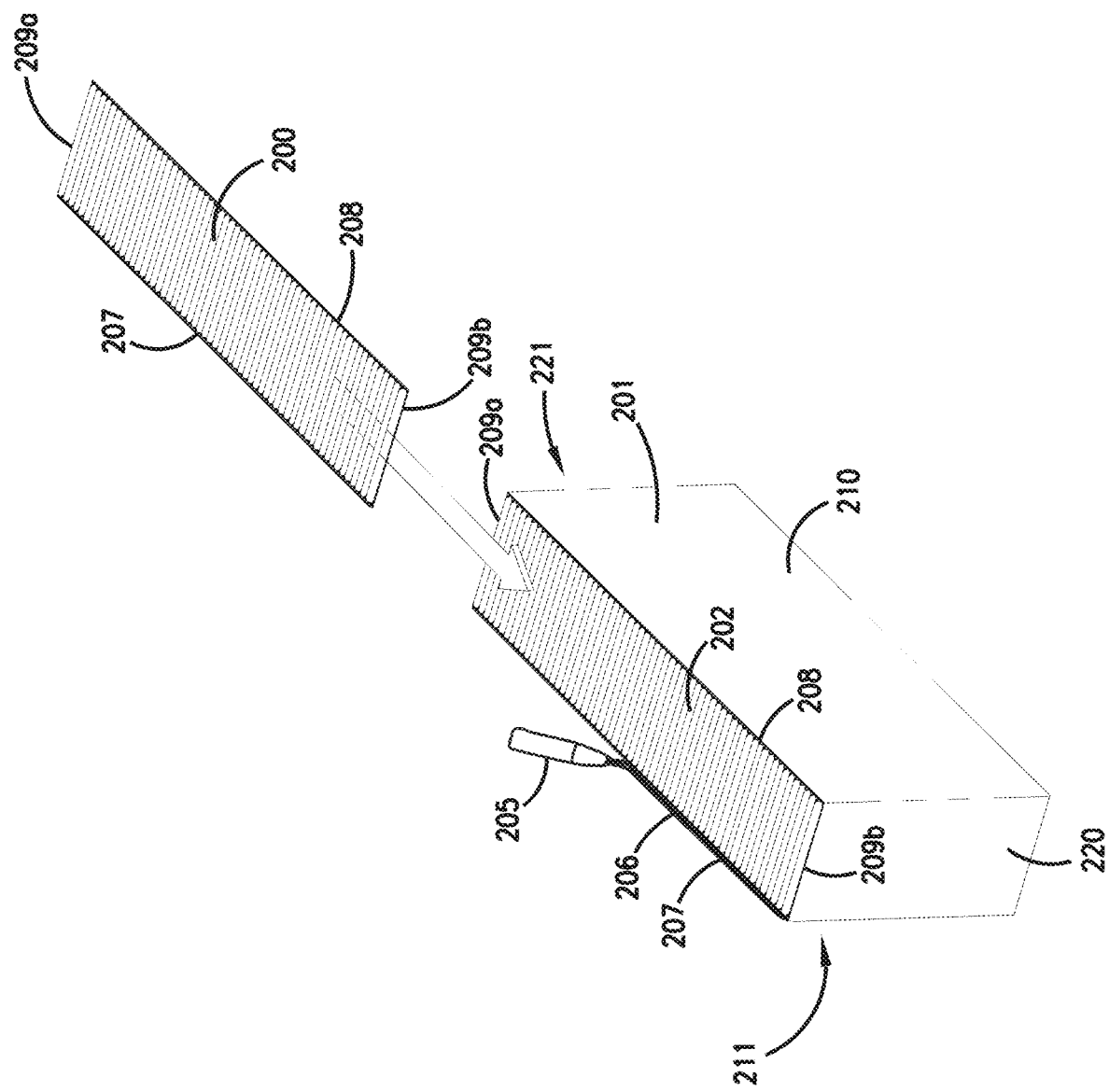
FIG. 7 is a schematic perspective view of a stacked media pack arrangement usable in a filter arrangement having features in accord with the present disclosure and made with a strip of media for example in accord with FIG. 1.

In FIG. 7, there is (schematically) shown a step of forming stacked z-filter media (or media pack) from strips of z-filter media, each strip being a fluted sheet secured to a facing sheet. Referring to FIG. 6, single facer strip 200 is being shown added to a stack 201 of strips 202 analogous to strip 200. Strip 200 can be cut from either of strips 76, 77, FIG. 4. At 205, FIG. 6, application of a stacking bead 206 is shown, between each layer corresponding to a strip 200, 202 at an opposite edge from the single facer bead or seal. (Stacking can also be done with each layer being added to the bottom of the stack, as opposed to the top.)

Referring to FIG. 7, each strip 200, 202 has front and rear edges 207, 208 and opposite side edges 209a, 209b. Inlet and outlet flutes of the corrugated sheet/facing sheet combination comprising each strip 200, 202 generally extend between the front and rear edges 207, 208, and parallel to side edges 209a, 209b.

Still referring to FIG. 7, in the media or media pack 201 being formed, opposite flow faces are indicated at 210, 211. The selection of which one of faces 210, 211 is the inlet end face and which is the outlet end face, during filtering, is a matter of choice. In some instances the stacking bead 206 is positioned adjacent the upstream or inlet face 211; in others the opposite is true. The flow faces 210, 211, extend between opposite side faces 220, 221.

The stacked media configuration or pack 201 shown being formed in FIG. 7, is sometimes referred to herein as a "blocked" stacked media pack. The term "blocked" in this context, is an indication that the arrangement is formed to a rectangular block in which all faces are 90° relative to all adjoining wall faces. For example, in some instances the stack can be created with each strip 200 being slightly offset from alignment with an adjacent strip, to create a parallelogram or slanted block shape, with the inlet face and outlet face parallel to one another, but not perpendicular to upper and bottom surfaces.

In some instances, the media or media pack will be referenced as having a parallelogram shape in any cross-section, meaning that any two opposite side faces extend generally parallel to one another.

It is noted that a blocked, stacked arrangement corresponding to FIG. 7 is described in the prior art of U.S. Pat. No. 5,820,646, incorporated herein by reference. It is also noted that stacked arrangements are described in U.S. Pat. Nos. 5,772,883; 5,792,247; U.S. Provisional 60/457,255 filed Mar. 25, 2003; and U.S. Ser. No. 10/731,564 filed Dec. 8, 2003 and published as 2004/0187689. Each of these latter references is incorporated herein by reference. It is noted that a stacked arrangement shown in U.S. Ser. No. 10/731,504, published as 2005/0130508 is a slanted stacked arrangement.

It is also noted that, in some instances, more than one stack can be incorporated into a single media pack. Also, in some instances, the stack can be generated with one or more flow faces that have a recess therein, for example, as shown in U.S. Pat. No. 7,625,419 incorporated herein by reference.

Figure 8:
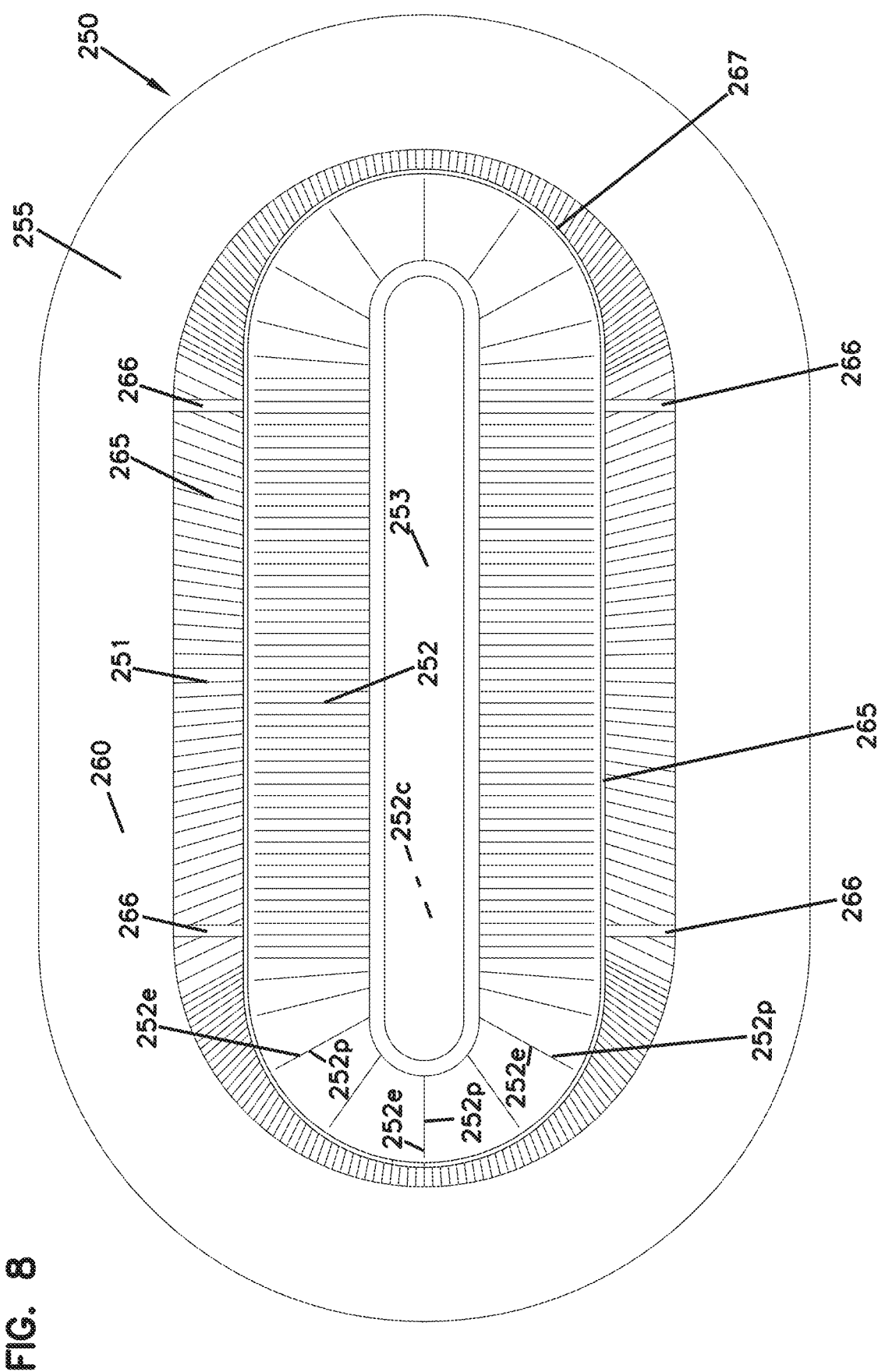
FIG. 8 is a schematic flow end view of a filter media pack using an alternate media to the media of FIG. 1, and alternately usable in selected filter cartridges in accord with the present disclosure.

C. Selected Media or Media Pack Arrangements Comprising Multiple Spaced Coils of Fluted Media; FIGS. 8-8B Alternate types of media arrangements or packs that involve flown between opposite ends extending between can be used with selected principles according to the present disclosure. An example of such alternate media arrangement or pack is depicted in FIGS. 8-8B. The media of FIGS. 8-8B is analogous to one depicted and described in DE 20 2008 017 059 U1; and as can sometimes found in arrangements available under the mark "IQORON" from Mann & Hummel.

Referring to FIG. 8, the media or media pack is indicated generally at 250. The media or media pack 250 comprises a first outer pleated (ridged) media loop 251 and a second, inner, pleated (ridged) media loop 252, each with pleat tips (or ridges) extending between opposite flow ends. The view of FIG. 8 is toward a media pack (flow) end 255. The end 255 depicted, can be an inlet (flow) end or an outlet (flow) end, depending on selected flow direction. For many arrangements using principles characterized having the media pack 250 would be configured in a filter cartridge such that end 255 is an inlet flow end.

Still referring to FIG. 8, the outer pleated (ridged) media loop 251 is configured in an oval shape, though alternatives are possible. At 260, a pleat end closure, for example molded in place, is depicted closing ends of the pleats or ridges 251 at media pack end 255.

Pleats, or ridges 252 (and the related pleat tips) are positioned surrounded by and spaced from loop 251, and thus pleated media loop 252 is also depicted in a somewhat oval configuration. In this instance, ends 252e of individual pleats or ridges 252p in a loop 252 are sealed closed. Also, loop 252 surrounds the center 252c that is closed by a center strip 253 of material, typically molded-in-place.

During filtering, when end 255 is an inlet flow end, air enters gap 265 between the two loops of media 251, 252. The air then flows either through loop 251 or loop 252, as it moves through the media pack 250, with filtering.

In the example depicted, loop 251 is configured slanting inwardly toward loop 252, in extension away from end 255. Also spacers 266 are shown supporting a centering ring 267 that surrounds an end of the loop 252, for structural integrity.

Figure 8A:
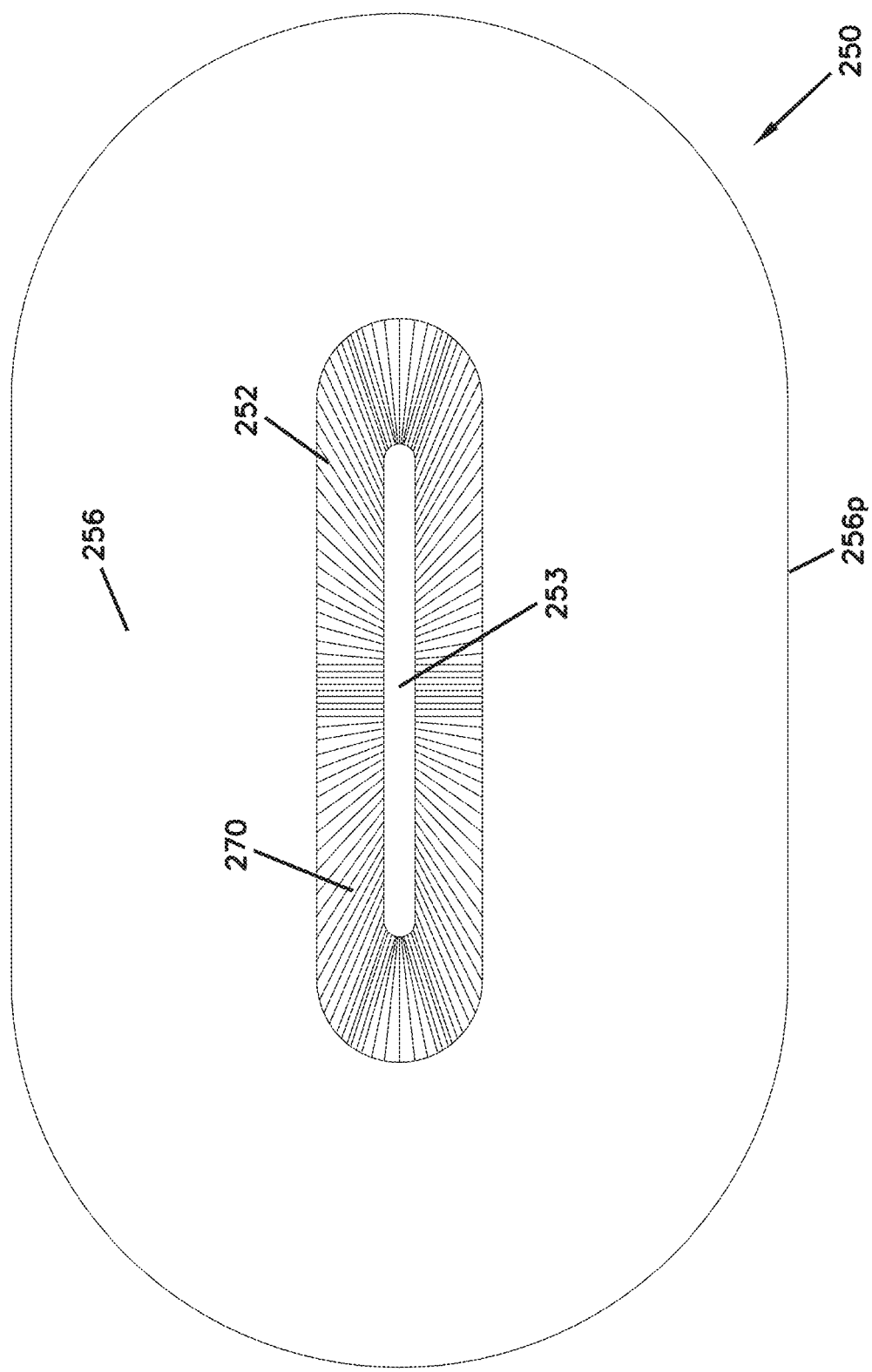
FIG. 8A is a schematic opposite flow end view to the view of FIG. 8.

In FIG. 8A, an end 256 of the cartridge 250, opposite end 255 is viewable. Here, an interior of loop 252 can be seen, surrounding an open gas flow region 270. When air is directed through cartridge 250 in a general direction toward end 256 and away from end 255, the portion of the air that passes through loop 252 will enter central region 270 and exit therefrom at end 256. Of course air that has entered media loop 251, FIG. 8, during filtering would generally pass around (over) an outer perimeter 256p of end 256.

In FIG. 8B a schematic cross sectional view of cartridge 250 is provided. Selected identified and described features are indicated by like reference numerals It will be understood from a review of FIGS. 8-8B, the above description, that the cartridge 250 described, is generally a cartridge which has media tips extending in a longitudinal direction between opposite flow ends 255, 256.

In the arrangement of FIGS. 8-8B, the media pack 250 is depicted with an oval, in particular racetrack, shaped perimeter. It is depicted in this manner, since the air filter cartridges in many examples below also have an oval or racetrack shaped configuration. However, the principles can be embodied in a variety of alternate peripheral shapes.

D. Other Media Variations, FIGS. 9-12

Herein, in FIGS. 9-12, some schematic, fragmentary, cross-sectional views are provided of still further alternate variations of media types that can be used in selected applications of the principles characterized herein. Certain examples are described in U.S. Ser. No. 62/077,749, filed Nov. 10, 2014 and owned by the Assignee of the present disclosure, Donaldson Company, Inc. In general, each of the arrangements of FIGS. 9-12 represents a media type that can be stacked or coiled into an arrangement that has opposite inlet and outlet flow ends (or faces), with straight through flow.

Figure 9:
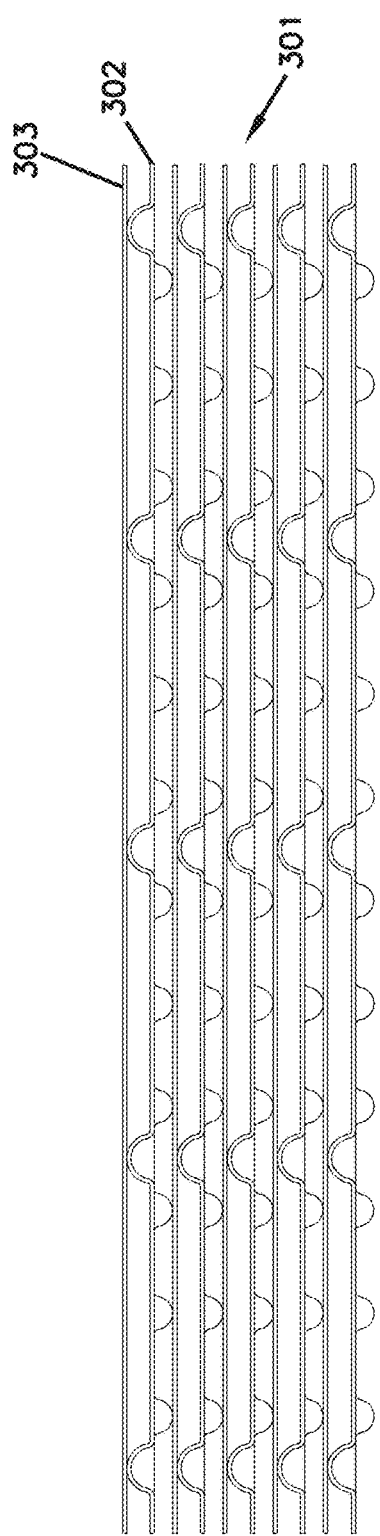
FIG. 9 is a schematic, fragmentary, cross-sectional view of a further alternate media type usable in a media pack of a filter cartridge having features in accord with the present disclosure.

In FIG. 9, an example media arrangement 301 from U.S. Ser. No. 62/077,749 is depicted, in which an embossed sheet 302 is secured to a non-embossed sheet 303, then stacked and coiled into a media pack, with seals along opposite edges of the type previously described for FIG. 1 herein.

Figure 10:
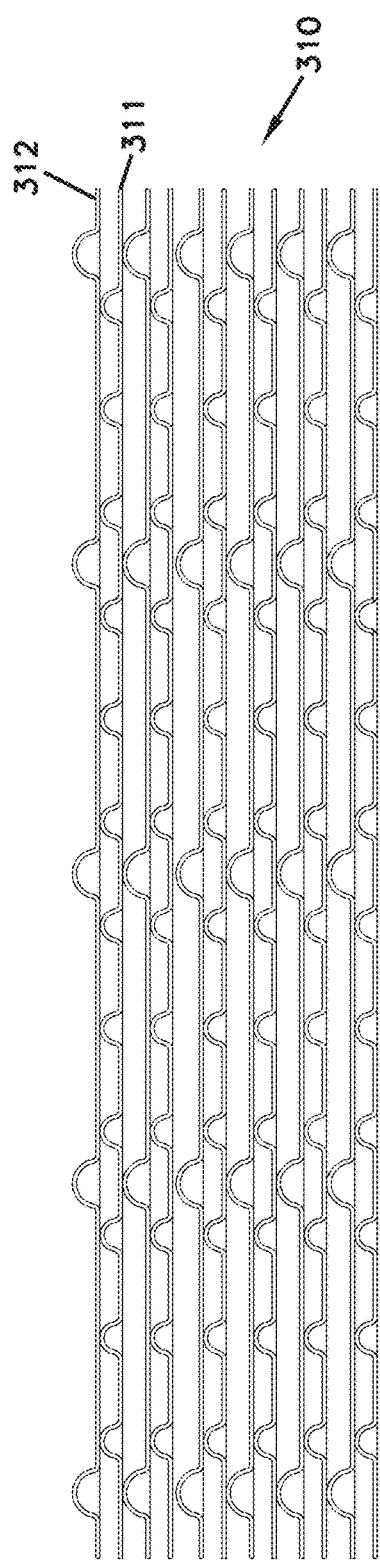
FIG. 10 is a schematic, fragmentary cross-sectional view, of a first variation of the media type of FIG. 9.

In FIG. 10, an alternate example media pack 310 from U.S. Ser. No. 62/077,749 is depicted, in which a first embossed sheet 311 is secured to a second embossed sheet 312 and then formed into a stacked or coiled media pack arrangement, having edge seals generally in accord with FIG. 1 herein.

Edge seals can be conducted in either the upstream end or the downstream end, or in some instances both. Especially when the media is likely to encounter chemical material during filtering, it may be desirable to avoid a typical adhesive or sealant.

Figure 11A:
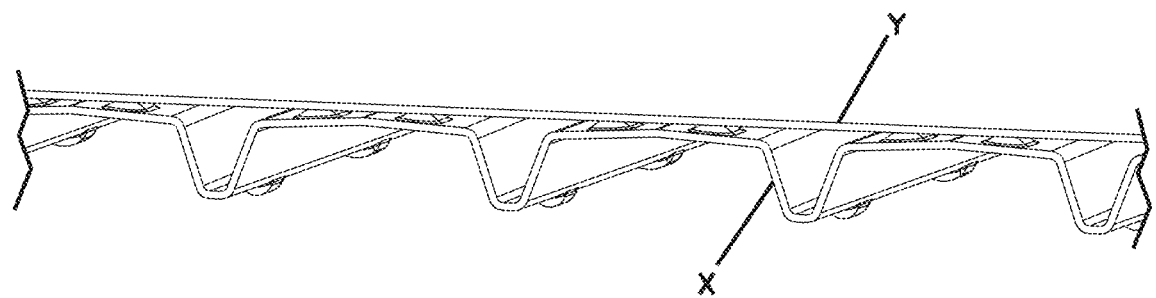
FIG. 11A is a schematic depiction of another usable fluted sheet/facing sheet combination in accord with the present disclosure.

In FIG. 11A, a cross-section is depicted in which the fluted sheet X has various embossments on it for engagement with the facing sheet Y. Again these can be separate, or sections of the same media sheet.

Figure 11B:
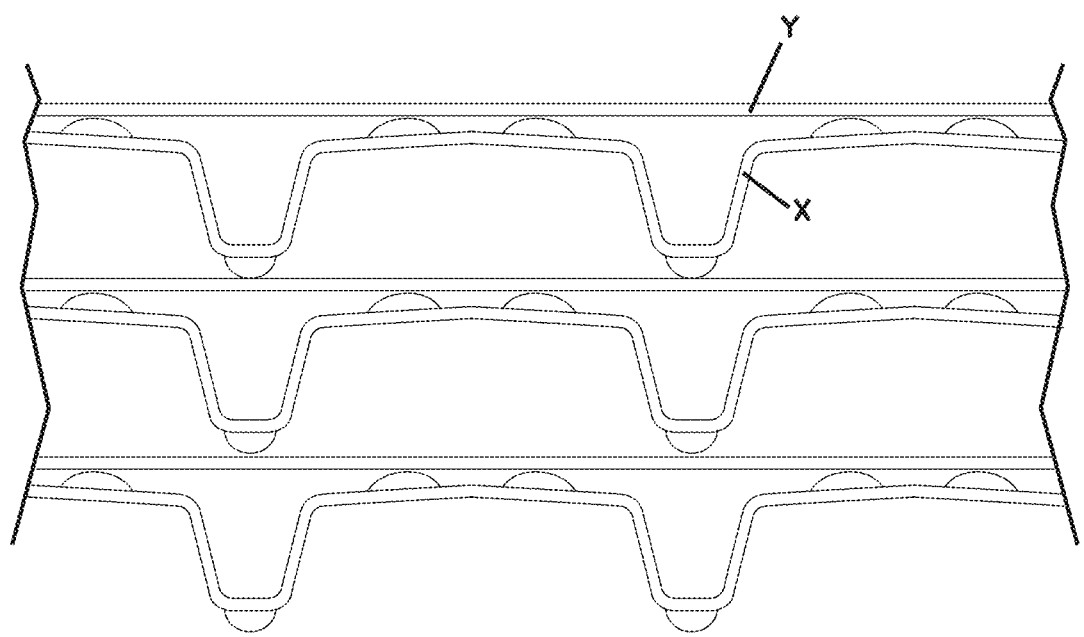
FIG. 11B is a second schematic view of the type of media in FIG. 11A.

In FIG. 11B, a schematic depiction of such an arrangement between the fluted sheet X and facing sheet Y is also shown.

Figure 11C:
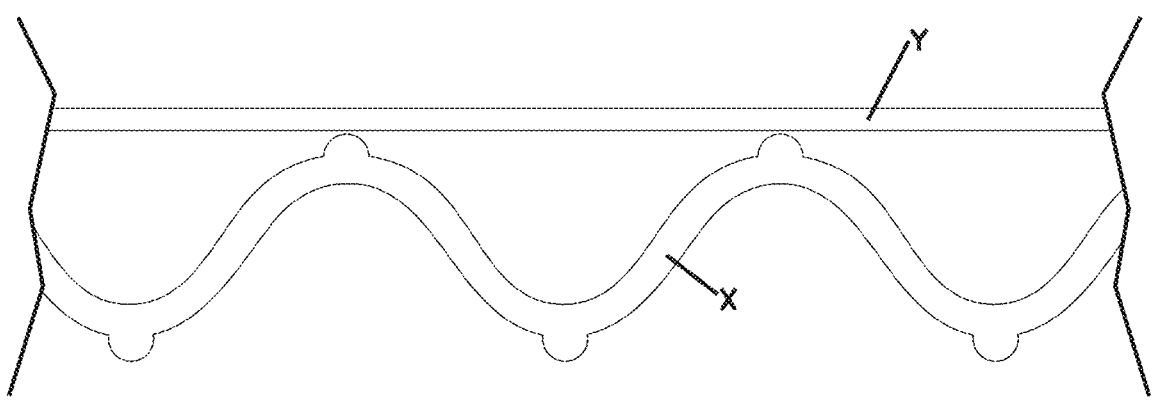
FIG. 11C is a schematic, fragmentary, plan view of still another variation of the media.

In FIG. 11C, a still further variation of such a principle is shown between a fluted sheet X and a facing sheet Y. These are meant to help understand how a wide variety of approaches are possible.

Figure 12:
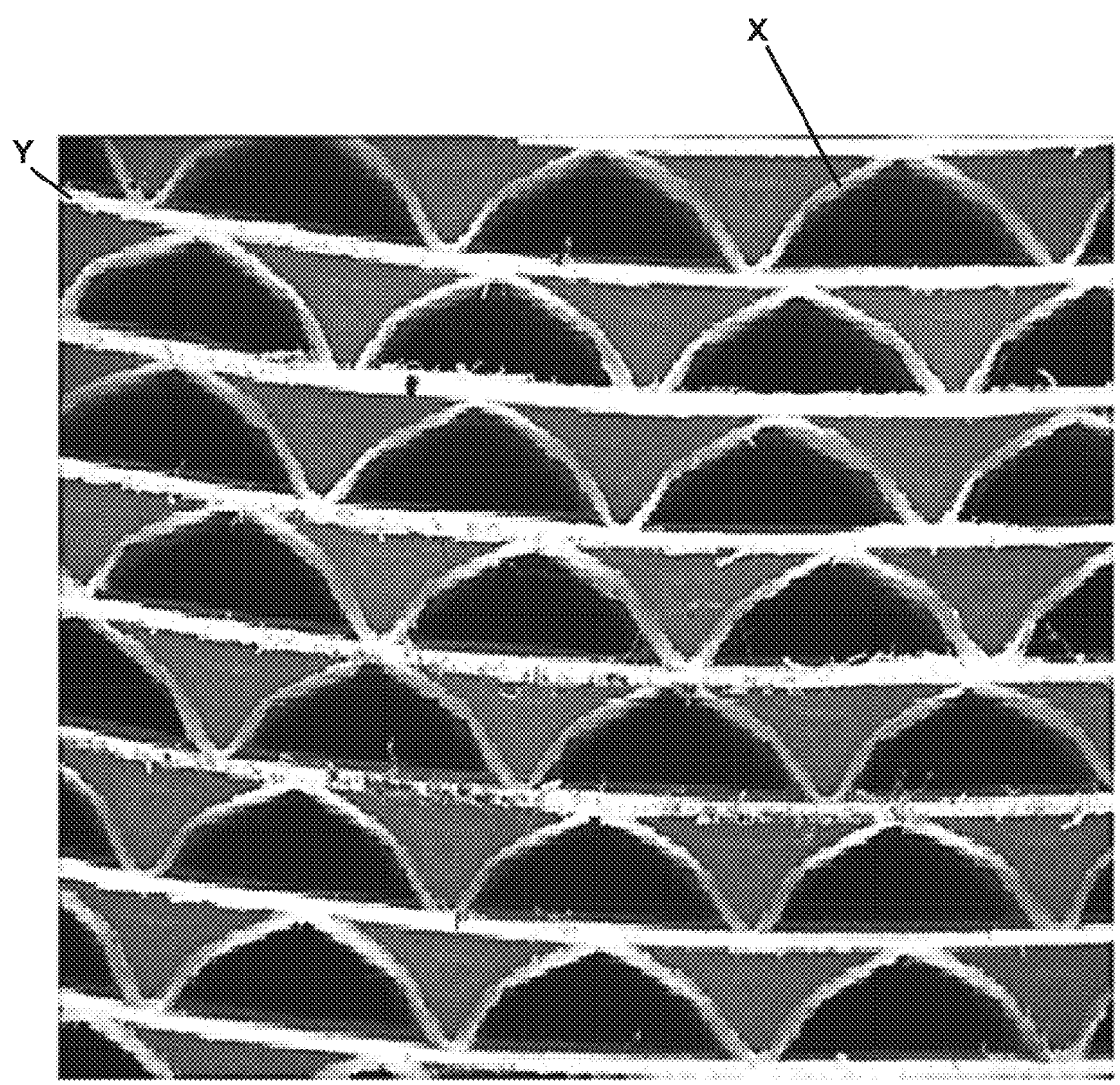
FIG. 12 is a schematic view of another variation of usable media in accord with the present disclosure.

In FIG. 12, still another possible variation in fluted sheet X and facing sheet Y is shown.

It is noted that there is no specific requirement that the same media be used for the fluted sheet section and the facing sheet section. A different media can be desirable in each, to obtain different effects. For example, one may be a cellulose media, while the other is a media containing some non-cellulose fiber. They may be provided with different porosity or different structural characteristics, to achieve desired results.

The examples of FIGS. 9-12 are meant to indicate generally that a variety alternate media packs can be used in accord with the principles herein. Attention is also directed to U.S. Ser. No. 62/077,749 incorporated herein by reference, with respect to the general principles of construction and application of some alternates media types.

E. Still Further Media Types

Many of the techniques characterized herein will preferably be applied when the media is oriented for filtering between opposite flow ends of the cartridge is media having flutes or pleat tips that extend in a direction between those opposite ends. However, alternatives are possible. The techniques characterized herein with respect to seal arrangement definition can be applied in filter cartridges that have opposite flow ends, with media positioned to filter fluid flow between those ends, even when the media does not include flutes or pleat tips extending in a direction between those ends. The media, for example, can be depth media, can be pleated in an alternate direction, or it can be a non-pleated material.

It is indeed the case, however, that the techniques characterized herein are particularly advantageous for use with cartridges that are relatively deep in extension between flow ends, usually at least 100 mm, typically at least 150 mm, often at least 200 mm, sometimes at least 250 mm, and in some instances 300 mm or more, and are configured for large loading volume during use. These types of systems will typically be ones in which the media is configured with pleat tips or flutes extending in a direction between opposite flow ends.

II. Selected Identified Issues with Various Air Cleaners

A. General

Air cleaner designs, especially assemblies that use relatively deep filter media packs, for example using media in general accord with one or more of FIGS. 6-12, have proliferated. As to example actual products in the marketplace, attention is directed to the air cleaners of Donaldson Company, Inc. the Assignee of the present disclosure sold under the trade designation "Powercore;" and, also, to the products of Mann & Hummel provided under the designation "IQORON."

In addition, air cleaner assemblies using such media packs can be incorporated in a wide variety of original equipment (on road trucks, buses; off road construction equipment, agriculture and mining equipment, etc.) on a global basis. Service parts and servicing are provided by a wide range of suppliers and service companies.

B. Identification of Appropriate Filter Cartridges

It is very important that the filter cartridge selected for servicing be an appropriate one for the air cleaner of concern. The air cleaner is a critical component in the overall equipment. If servicing is required to occur more frequently than intended, the result can be added expense, downtime for the equipment involved and lost productivity. If the servicing is not done with a proper part, there may be risk of equipment failure or other problems.

The proper cartridge for the air cleaner of concern and equipment of concern, is generally a product of: product engineering/testing by the air cleaner manufacturer; and, specification/direction/testing and qualification by the equipment manufacturer and/or engine manufacturer. Servicing in the field may involve personnel selecting a part that appears to be similar to the one previously installed, but which is not a proper, rigorously qualified, component for the system involved.

It is desirable to provide the air cleaner assembly, regardless of media specific type, with features that will help readily identify to the service provider that an effort to service the assembly is being made with a proper (or improper) filter cartridge. Optional features and techniques described herein can be provided to obtain this benefit as described below.

In addition, assembly features and techniques which are advantageous with respect to manufacture and/or filter component integrity are described. These can be implemented with features and techniques of the type relating to helping ensure that the proper cartridge is installed in an assembly, or in alternate applications.

C. Mass Air Flow Sensor Issues In many systems, a mass air flow sensor is provided downstream from the filter cartridge and upstream from the engine, to monitor air flow characteristics and contaminant characteristics. In some instances, minor modifications in media pack configuration and orientation, can lead to fluctuations in mass air flow sensor operation. It is therefore sometimes desirable to provide the air cleaner assembly with features in the filter cartridge and air cleaner, such that variation in air flow from the filter cartridge is managed to a relative minimum. This can facilitate mass air flow sensor use and operation. The features and techniques described herein can be provided to advantageously obtain this benefit.

D. Stable Filter Cartridge Installation

In many instances, the equipment on which the air cleaner is positioned is subject to substantial vibration and shock during operation. The types of media packs described above in connection with FIGS. 6-12, are often constructed relatively deep, i.e. with having depth of extension in the air flow direction of at least 50 mm and often at least 80 mm more, in many instances more than 100 mm. Such deep filter cartridges can load with substantial amounts of contaminant during use, and gain substantially in weight. Thus, they can be subject to significant vibration momenta during operation. It is desirable to provide features in the filter cartridge that help ensure stable positioning of the cartridge, avoidance of damage to the media (or media pack) in the event of movement, and avoidance of seal failure during such vibration and shock.

Similarly, the equipment may be subject to a wide variety of temperature ranges during storage and use. These can lead to expansion/contraction of materials relative to one another. It is desirable to ensure that the filter cartridge and air cleaner are constructed in such a manner that seal integrity is not compromised under these circumstances. The features and techniques described herein can be applied to address these concerns, as discussed below.

E. Protection against Faulty Insertion

A variety of arrangements have been developed to address concerns of the type recited above, see, for example, WO 2006/076479; WO 2006/076456; WO 2007/133635; WO 2014/210541 and 62/097,060 each of which is incorporated herein by reference. Another issue that sometimes can rise with filter cartridge arrangements, however, is that a cartridge that does not have features for secure sealing can still be installed, in some instances, with the housing still being able to close even though an installed cartridge is not a proper one, properly sealed, for the housing of concern. It is desirable to address those issues.

More generally, it is desirable to provide a filter cartridge which solves the issues characterized herein above, but which also is configured such that the air cleaner housing will not properly close, if such a "faulty installation" has occurred, for example through use of a cartridge that appears to fit the housing, but does not have the proper sealing characteristics. The techniques described herein address this issue. They can be used in connection with the features of such arrangements as characterized in WO 2006/076479; WO 2006/076456; WO 2007/133635; WO 2014/210541 and/or 62/097,060, but they can be used independently as well. This will be understood from the following discussions.

F. Summary

The features characterized herein can be used to advantage to address one or more of the concerns described above. There is no specific requirement that the features be implemented in a manner that maximally addresses all concerns. However, selected embodiments are described in which all of the concerns identified above are addressed to a significant and desirable extent.

III. An Example Assembly, FIGS. 13-52

A. General Air Cleaner Features, FIG. 13-25

Figure 13:
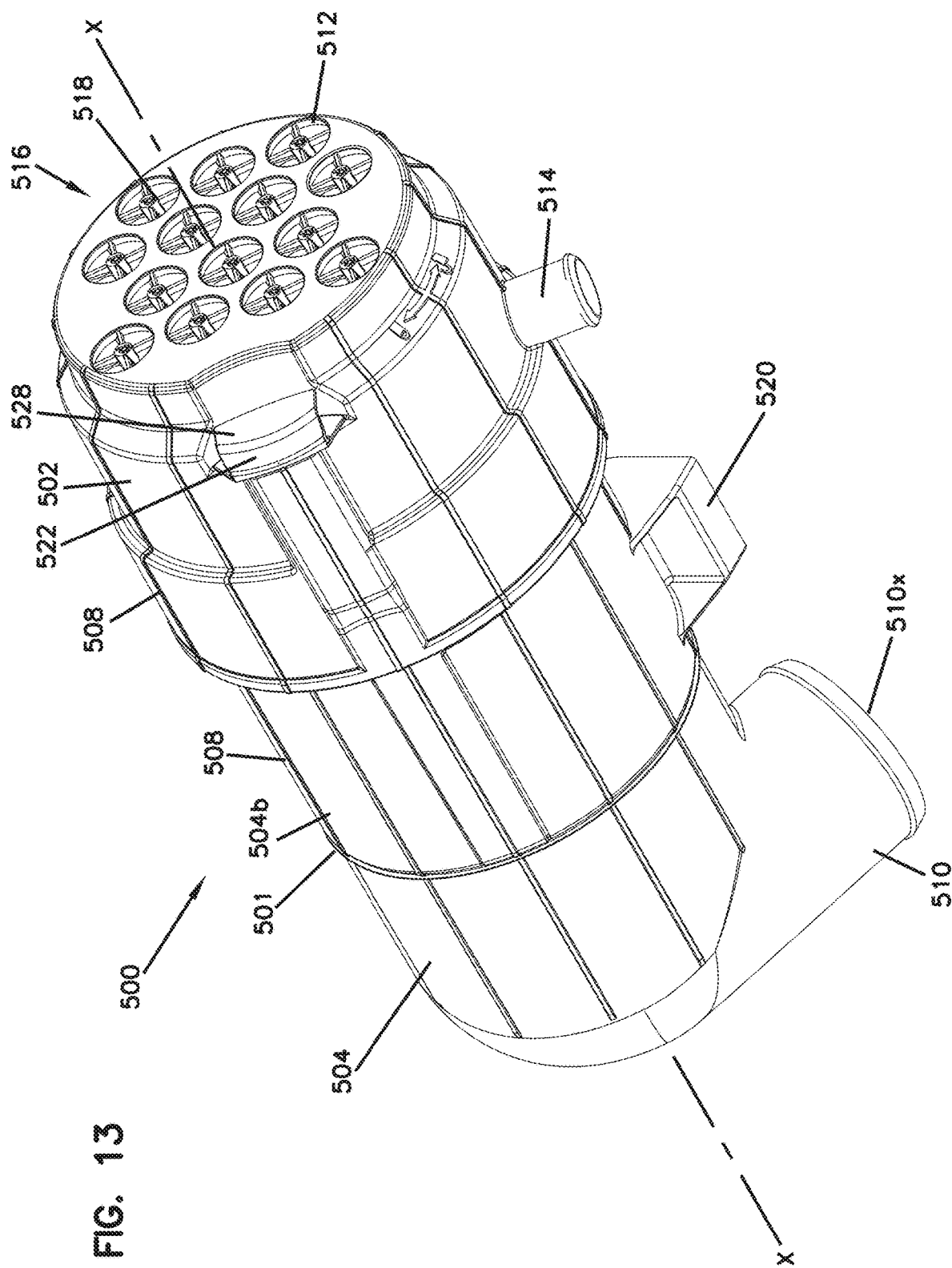
FIG. 13 is a schematic, top, perspective view of an air cleaner assembly including features and components in accord with the present disclosure.
Figure 14:
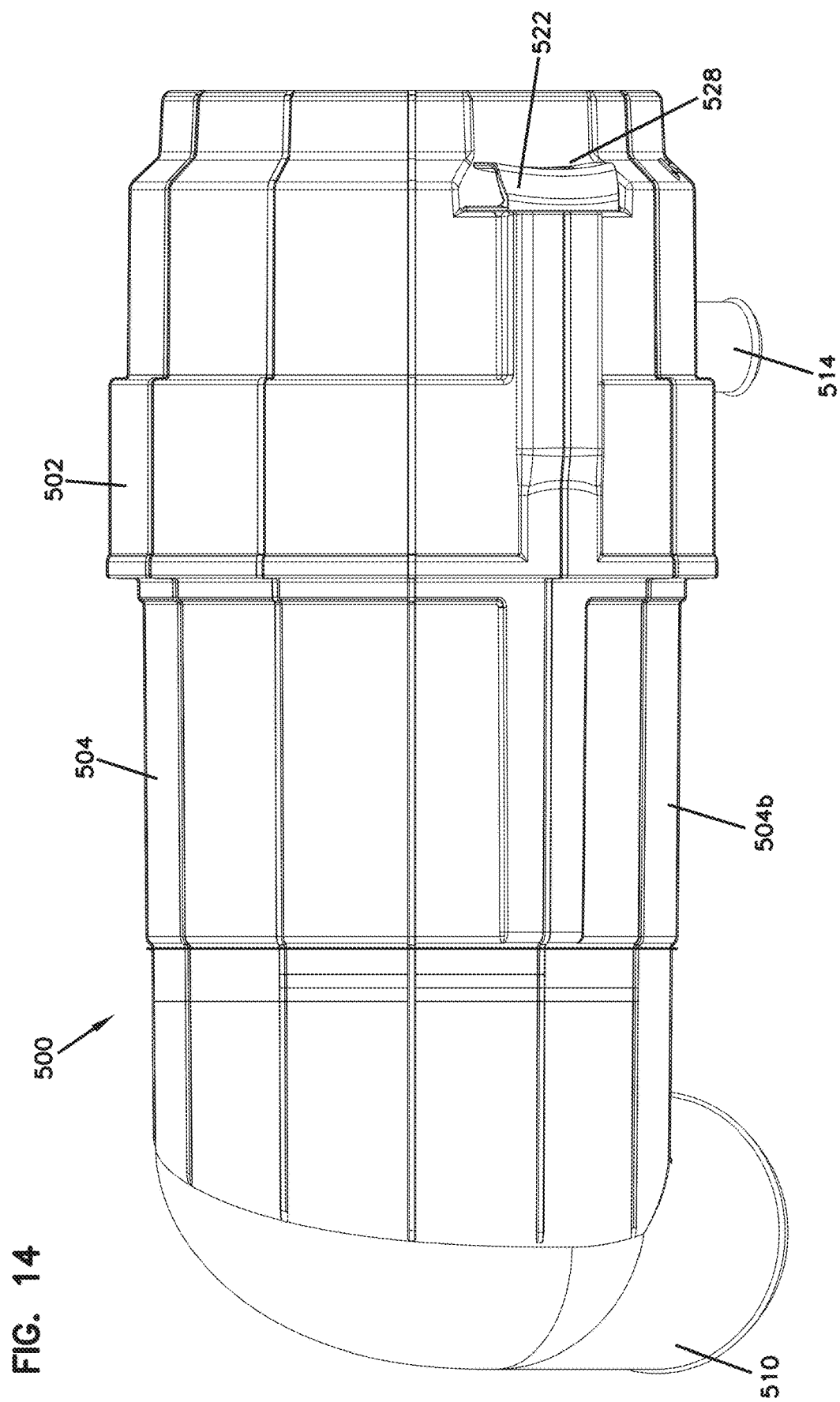
FIG. 14 is a schematic, side view of the air cleaner assembly of FIG. 13.

The reference numeral 500, FIG. 13, generally indicates an example air cleaner assembly according to the present disclosure. The air cleaner assembly 500 generally comprises a housing 501. The housing 501 includes a body 504 defining an internal cavity 505 (see FIGS. 19-20) with a removable service or access cover 502 thereon, by which access to internally received componentry such as filter cartridges can be obtained. The air cleaner assembly 500 extends along a longitudinal axis X about which the internal components (e.g. filter cartridges) are also aligned. Where references are made to an axial direction, it is meant to indicate a direction parallel to the longitudinal axis X. Where references are made to a radial direction, it is meant to indicate a direction extending orthogonally from the longitudinal axis X.

Referring to FIGS. 13-19, the air cleaner 500, includes, (in the example positioned on the body 402), an outlet arrangement 510. The outlet arrangement 510 is generally positioned for exit of filtered air, from the air cleaner assembly 500 through outlet 510x. The outlet arrangement or assembly 510 can be made separately from a remainder of the body 504 and be attached thereto, or it can be found integral with a remainder of the body 504. With arrangements in which the outlet arrangement 510 is separately made, modular assembly practices can be used, to provide alternate outlet arrangements 510 for different systems of use.

The housing 501 can be constructed with a variety of materials, when various principles according to the present disclosure are provided. The features characterized, are particularly well adapted for use with a housing that is primarily a molded plastic component, for example, ABS plastic. The housing 501 of FIG. 13 is generally such a component, and selected housing features, such as body 504, include various structural ribbing members thereon, see ribs 508, for strength and integrity. The housing 501 can also be provided with ribbing members that aid in limiting the passage of dust and contaminants into non-sealed portions of the assembly 500. For example, ribs 508 (see FIGS. 21 and 22) can be provided that help with visual alignment when installing the cover 502 onto the housing body 504 of the housing 501. The interior portion of the housing body 504 can also be provided with various members and contours to suit various purposes, such as material savings, strengthening of the shell, and/or ensuring that the filter cartridge is compatible with the housing. For example, the housing body 504 can be provided with ribs 507 and a recess or groove structure 541 (see FIGS. 19-20, 22).

In general, the housing 501 can be characterized as including an air flow inlet 512, through which air to be filtered enters the assembly 500. The particular assembly 500 depicted also includes a contaminant ejection port or port arrangement 514, discussed below.

The particular air cleaner assembly 500 depicted, is a two-stage air cleaner assembly, and includes a precleaner 516 thereon. The precleaner 516, in the example depicted, comprises a plurality of separator tube arrangements 518. The precleaner 516 is usable to prelcean selected material (contaminant) carried by an air stream into the air cleaner assembly 500, before the air reaches the filter cartridge positioned therein. Such precleaning generally leads to substantial removal of liquid particulate such as rain water or splashed water, etc. and/or various (especially larger) dust or other particles. It is noted that in the particular example precleaner 510 depicted, comprises a portion of the access cover 502.

Figure 23:
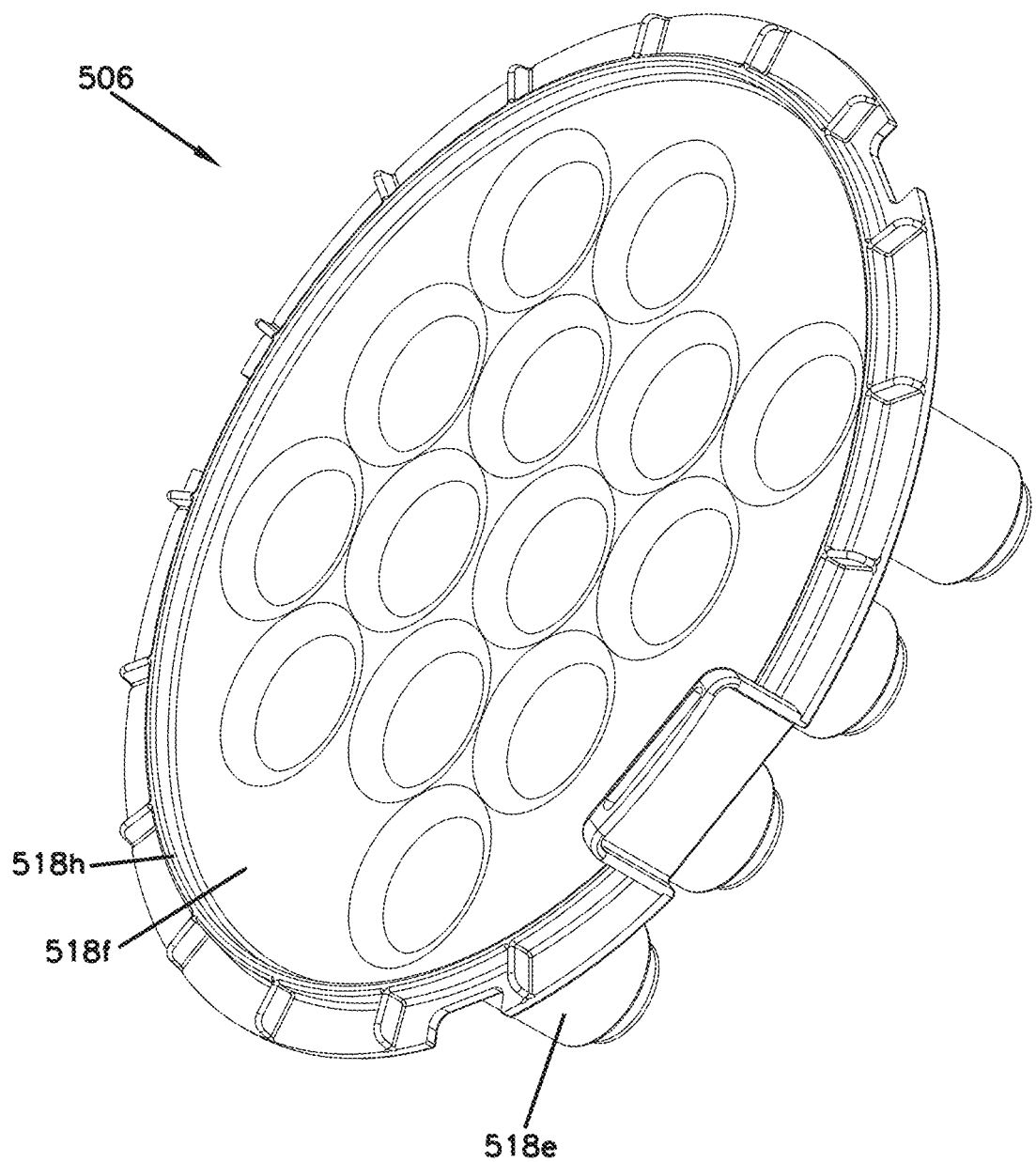
FIG. 23 is a schematic bottom perspective view of a pre cleaner inner portion of the air cleaner assembly of FIG. 13.
Figure 24:
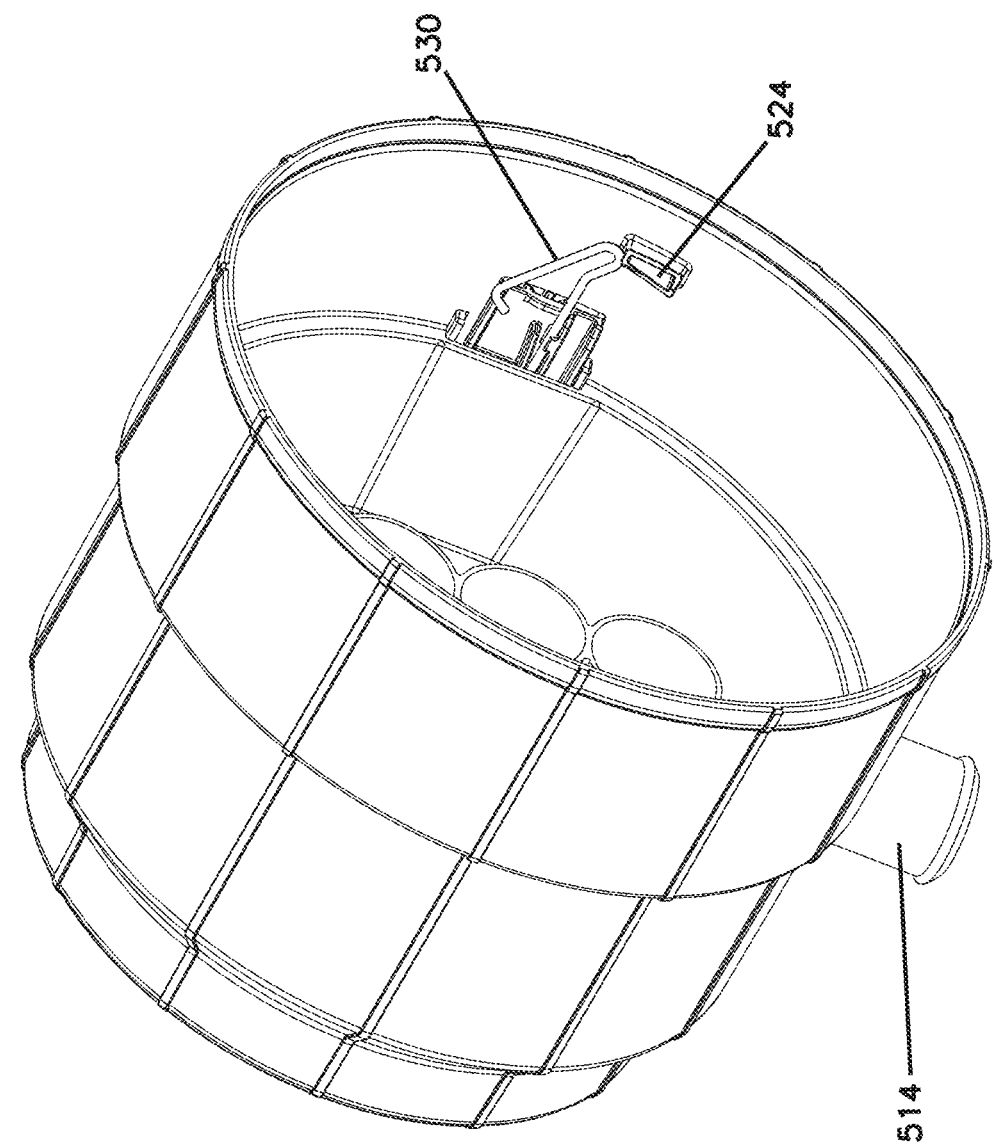
FIG. 24 is a schematic bottom view of a cover body of the air cleaner assembly of FIG. 13.
Figure 25:
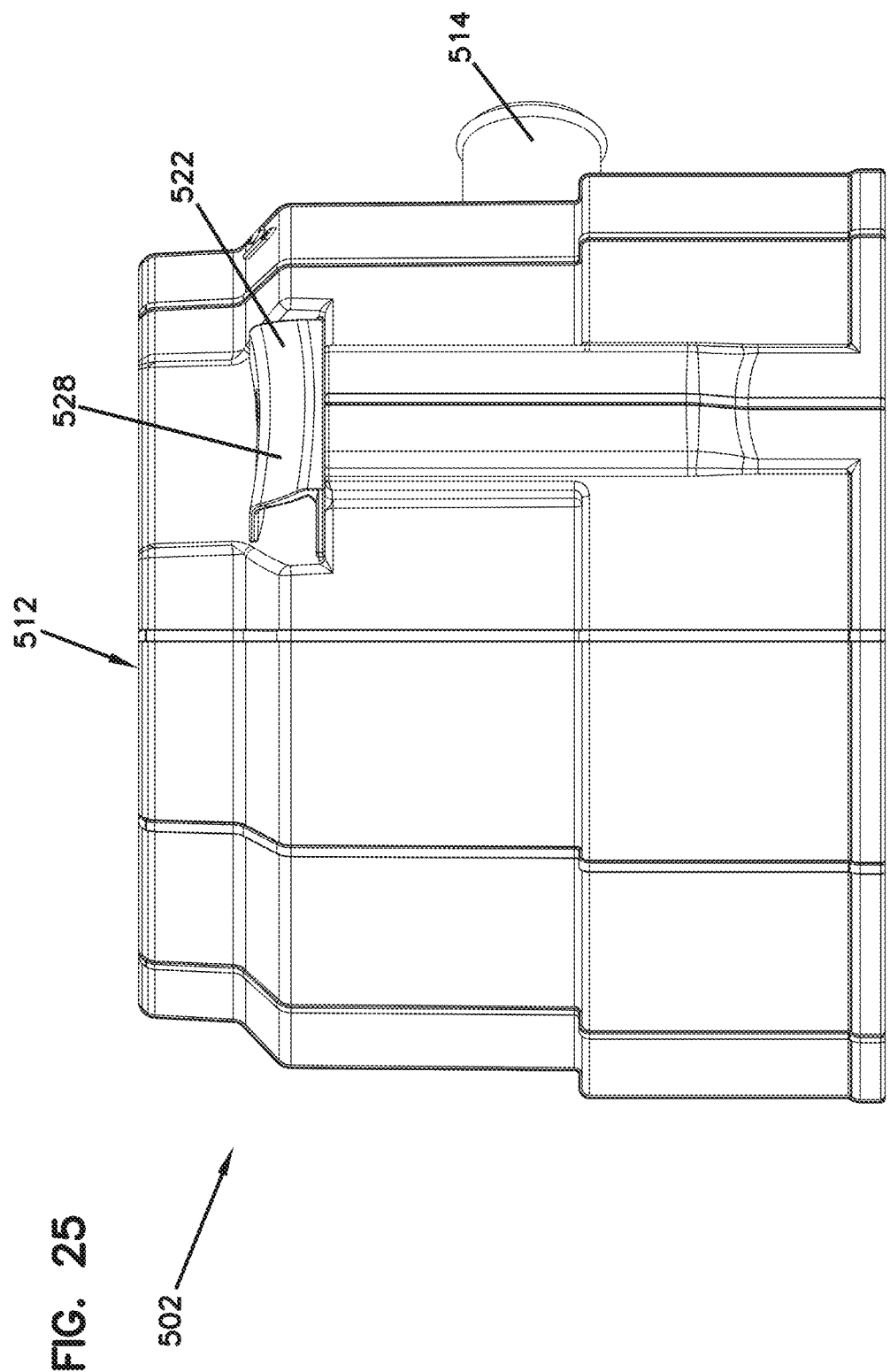
FIG. 25 is a schematic side view of the cover body of the air cleaner assembly of FIG. 13.

In the example shown, the precleaner 516 comprises two shell or cover components secured to one another: an outer (inlet) cover portion 502 and an inner (outlet tube) cover portion 506. The inner cover portion 506 is shown at FIG. 23. In some applications characterized herein, the components 502, 506 are snap-fit or otherwise secured together, but configured to be separable to facilitate cleaning. However, in some applications of the techniques characterized herein, the two covers or shell components 502, 506 can be secured together during assembly, and not be separable again.

As stated previously, the inlet cover 502 can be provided with a plurality of separator tube arrangements 518. As most easily seen at FIGS. 16 and 17, each of the separator tube arrangements 518 can be provided with an inlet end 518a and an outlet end 518b. Proximate the inlet end 502, each of the separator tube arrangements 518 is provided with a vane arrangement 518c located within an inlet flow tube 518d that extends in a direction towards the outlet end 518b. As presented, the vane arrangements 518c and inlet flow tubes 518d are integrally formed within the outer cover 502. However, these components may be alternatively provided separately and later attached to the outer cover 502, such as by press-fitting. In the example presented, the inlet inner cover 506 includes a plurality of outlet flow tubes 518e projecting from a tube sheet 518f. Each of the outlet flow tubes 518e projects towards the inlet end 518a and partially receives an inlet flow tube 518d, wherein an annulus or gap 518g exists between the inlet and outlet flow tubes 518d.

The general operation of the precleaner 516, again, is to separate material (contaminant) upon entering into the air cleaner to allow for evacuation through outlet port 514 in housing body 502. This pathway is most easily viewed at FIG. 16. This inhibits certain materials from ever reaching the internally received filter cartridge componentry. In general, each tube 518 operates with a centrifugal separation of contaminant conducted internally. To accomplish this, the air entering the inlet ends 518a, as generally directed into a cyclonic pattern by the vanes of the vane arrangement 518c. Due to this action, contaminants are forced against the inlet flow tubes 518d and are ultimately ejected through port 514. As the inlet ends of the outlet flow tubes 518e are located within the interiorly of the outlet ends of the inlet flow tubes 518c, the contaminants which are able to be separated and forced against the inner walls of the inlet flow tubes 518c are unable to enter the outlet flow tubes 518e. The tube sheet 518f blocks airflow between the inner cover 506 and the downstream portions of the air cleaner assembly 500 such that all air separated by the air separator 516 must be directed through the outlet flow tubes 518e. In the arrangement shown, 14 separator tube arrangements 518 are provided. However, more or fewer identical or different separator tube arrangements 518 may be provided. An exemplary separator tube arrangement usable with the disclosed systems herein is shown and described at U.S. Provisional Application 62/097,060, filed on Dec. 27, 2014, the entirety of which is incorporated by reference herein. Alternative arrangements exist. For example, the cover portion 502 could include two separate components wherein the first component includes the inlet flow tubes 518c and the second component includes integrally formed outlet flow tubes 518e and the tube sheet 518f. Such a design is essentially a combination of components 502 and 506 for the second component and the top portion of 502 forming the first component.

Figure 15:
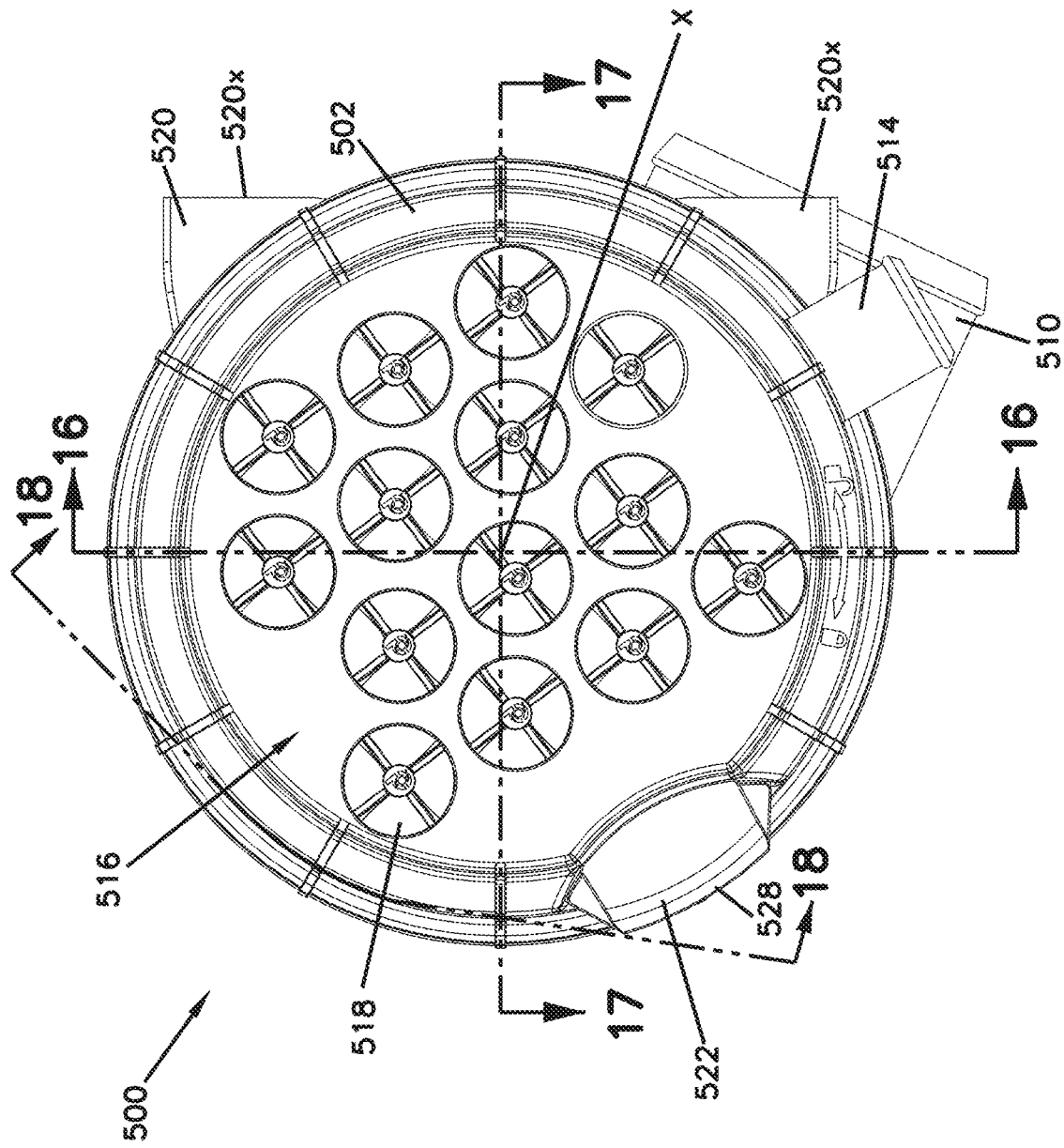
FIG. 15 is a schematic, top view of the air cleaner assembly of FIG. 13.
Figure 19:
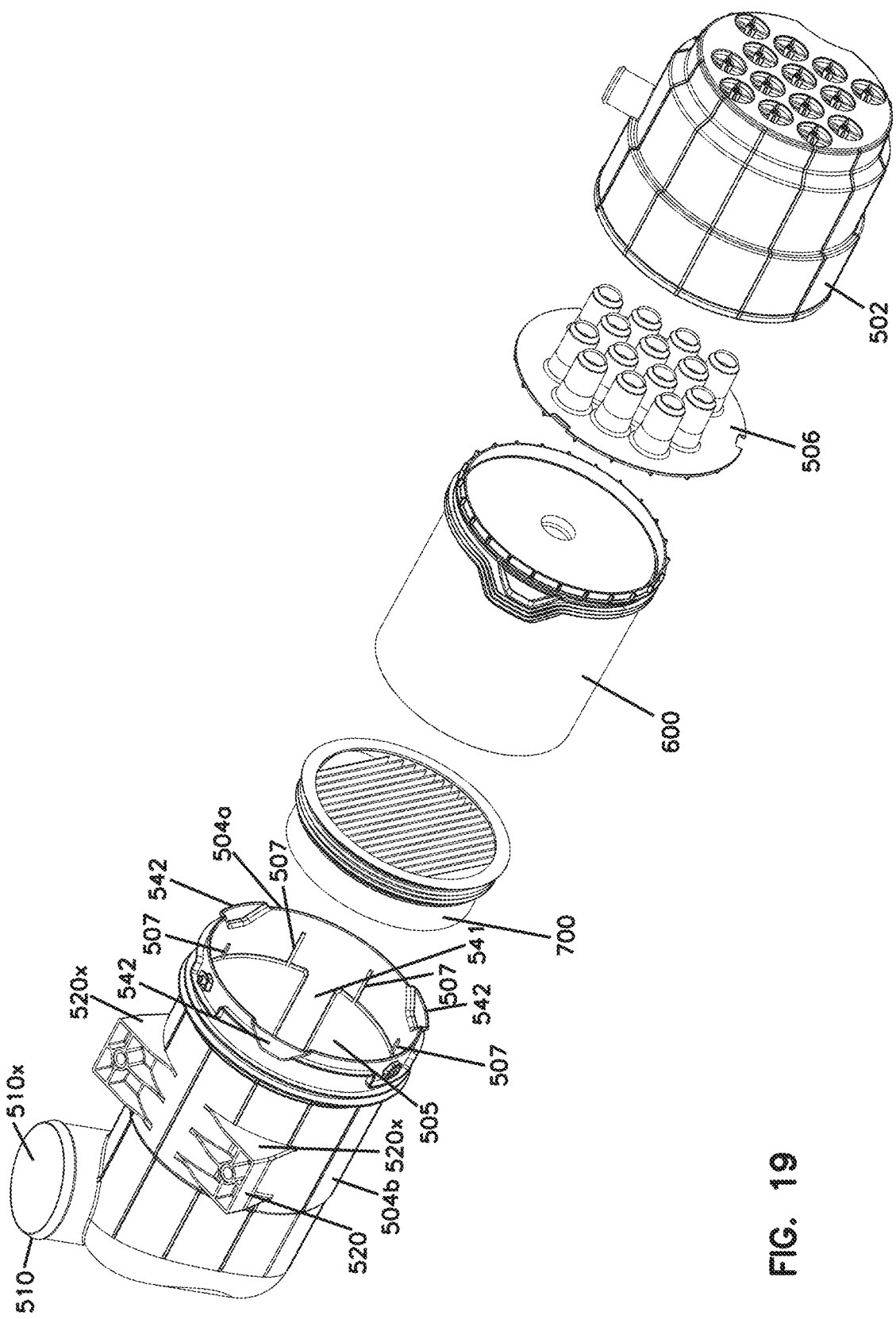
FIG. 19 is a schematic exploded top, perspective view of the air cleaner assembly of FIG. 13.

Referring to FIGS. 13, 15, and 19, at 520, a mounting pad arrangement is provided, by which the air cleaner assembly 500 can be secured to equipment for use. The example mounting pad arrangement 520 generally comprises a plurality of feet or pads 520x, in the example molded integral with housing body 504, and, in the example, appropriately fit with the receded metal connectors or other types of connector arrangements.

Figure 20:
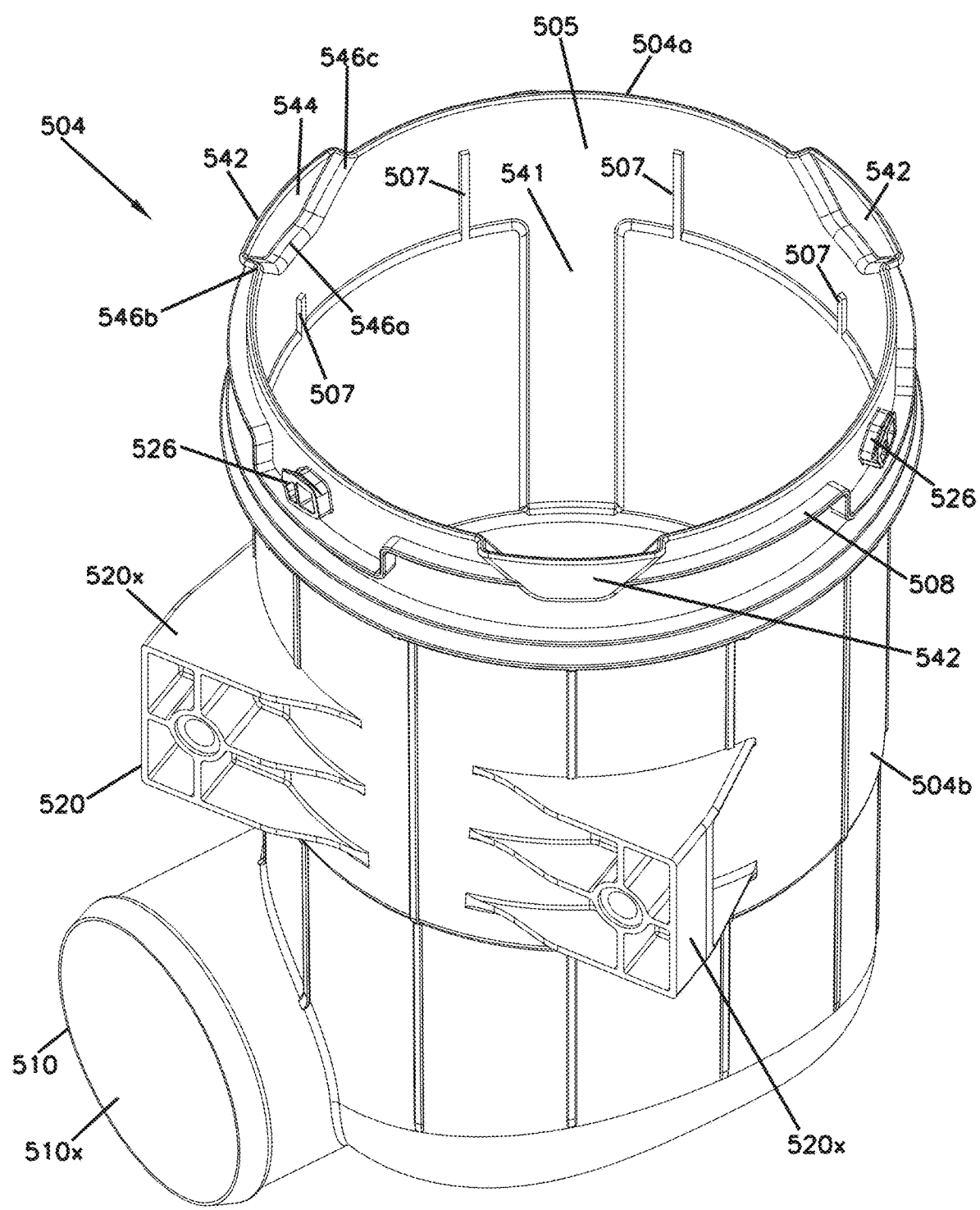
FIG. 20 is a schematic perspective view of a housing body of the air cleaner assembly of FIG. 13.
Figure 21:
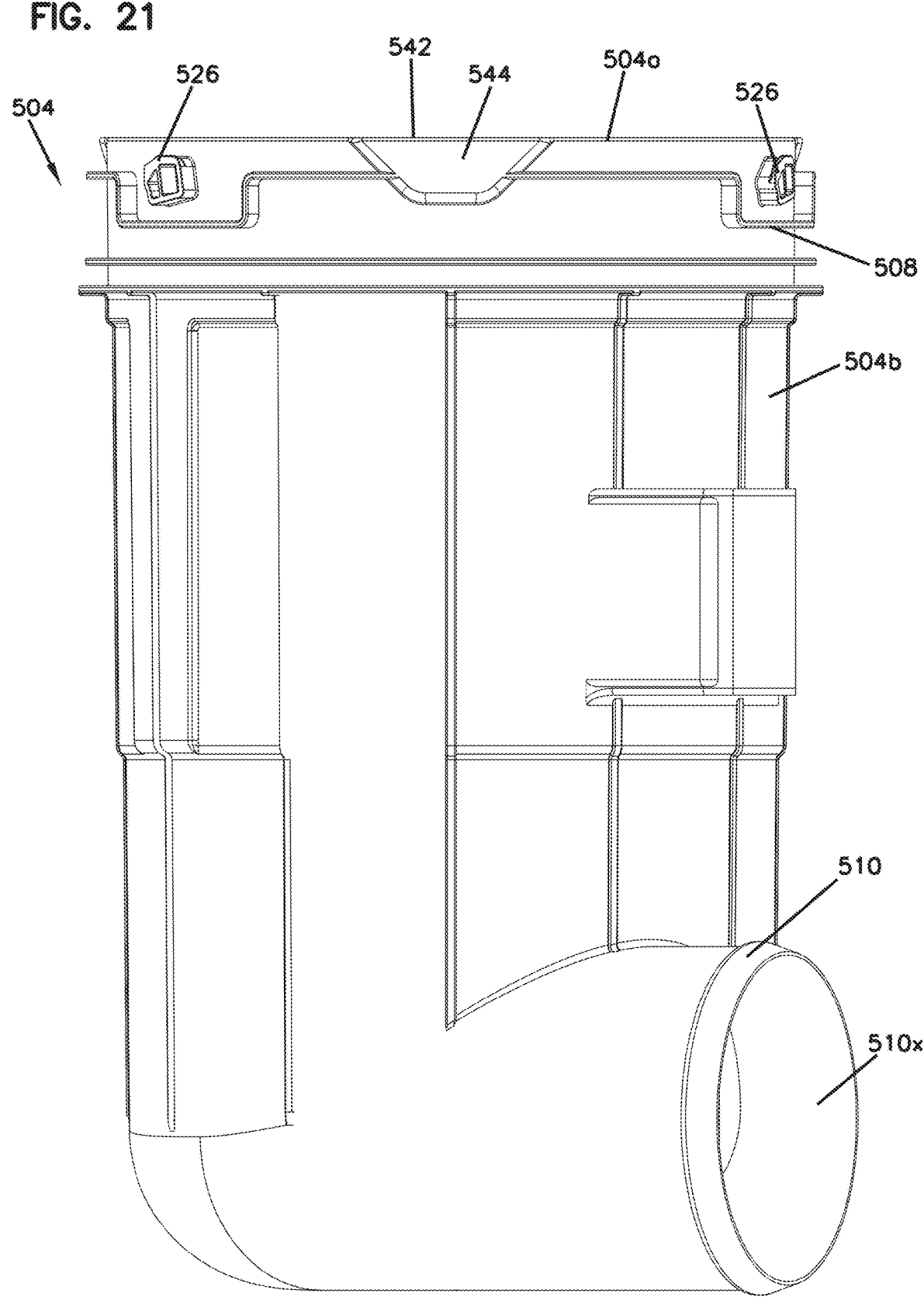
FIG. 21 is a schematic side view of the housing body shown in FIG. 20.
Figure 22:
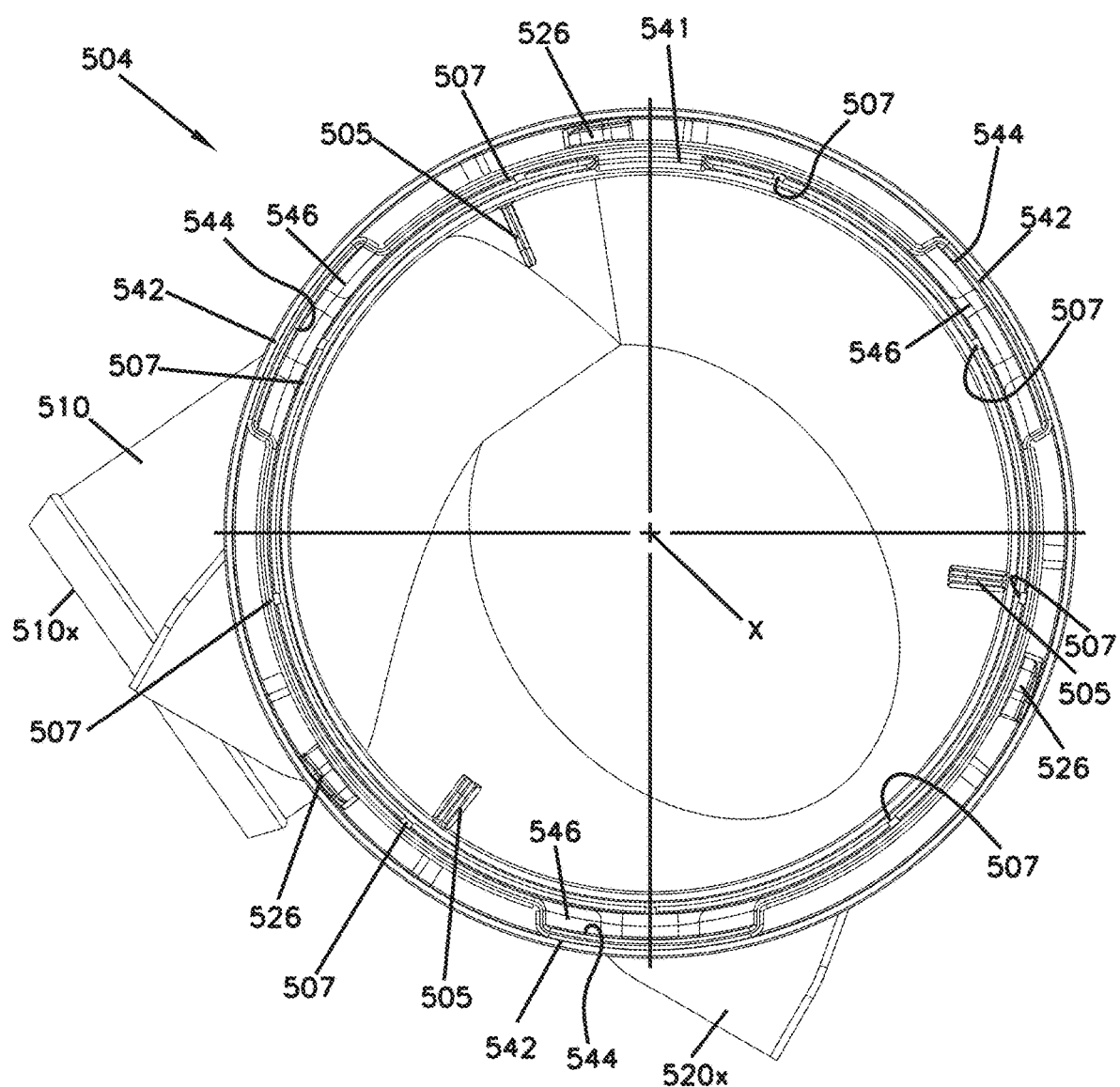
FIG. 22 is a schematic top view of the housing body shown in FIG. 21.

Referring to FIGS. 13-19, and additionally referring to FIGS. 20-22 and 24, the particular access cover 502 depicted, is secured in place by a connector arrangement 522, and in the example depicted, comprising a twist-lock arrangement including one or more lugs 524 on the cover 502 (see FIG. 24) that engage with one or more lugs 526 arranged on the housing body 504 (see FIGS. 20-22). To secure the cover 502 to the housing body 504, the cover 502 is placed onto the housing body 504 and rotated until the lugs 524, 526 engage each other in an overlapping arrangement to lock the cover 502 to the housing body 504. The connector arrangement 522 includes a handle 528 connected to a spring lock clip 530 that can be depressed to engage with one of the housing lugs such that the cover 502 cannot be rotated in the reverse direction to disengage the lugs 524, 526. The cover 520 can be unlocked by pulling the handle 528 in the axial direction away from the lugs 524, 526. In the example, three lugs 524 and three lugs 526 are shown. Of course, the number and location of lugs 524, 526 may vary. With such an arrangement, the cover 502 can be mounted to the housing body 504 in various orientations such that the ejection port 514 can be directed as desired. Additionally, the twist-lock arrangement can be configured such that the cover is rotated either in a clockwise direction or a counterclockwise direction to initially secure the cover to the housing body. An exemplary twist-lock arrangement usable with the disclosed systems herein is shown and described at U.S. Provisional Application 62/184,567, filed on Jun. 25, 2015, the entirety of which is incorporated by reference herein. Other securement arrangements can also be utilized, for example an over-center latch arrangement, bolts, or other fasteners.

Referring to FIGS. 16-22, the housing body 504 is shown as being provided with a plurality of first members 542 of a projection-receiver arrangement 540. As can be viewed at FIG. 18, each first member 542 is configured to interact with a second member 608 of the receiving-projection arrangement 540. The second member 608 can be associated with the filter cartridge 600, the features of both being discussed in detail below. In one aspect, the first members 542 are located within a circumferential sidewall 504b of the housing body 504 proximate an open end 504a (see FIGS. 19-21) of the housing body 504. The features of the projection-receiver arrangement first member 542 are detailed in a later section.

Referring to FIGS. 13-19, the particular air cleaner housing 501 depicted, generally has a cross-sectional shape with a long axis X (in a plane perpendicular to an axis or general direction of air flow when) and a shorter axis perpendicular to the longer axis X; and, the air cleaner assembly 500 is configured so that in use it could be mounted in virtually any orientation, for example, with the longer cross-sectional axis X generally vertical, horizontal, or any angle in between. The principles described herein can be applied in alternate arrangements, as will be apparent from discussions below.

In the example shown, the internal cavity 505 of the housing body 504 has a generally round cross-sectional shape. However, other shapes are possible. For example, rectangular, obround, and other essentially geometric shapes with rounded or non-rounded corners may be utilized. Some examples of obround include an oval shape with opposite curved ends attached by a pair of opposite sides. In some oval shapes, the opposite sides are also curved. In other oval shapes, sometimes called racetrack shapes, the opposite sides are generally straight.

C. Air Filter Cartridge 600, FIGS. 26-40

In FIGS. 26-29, at 600a filter cartridge is depicted. The filter cartridge 600 is generally a main or primary filter cartridge, and in use to selectively separate particulate or containment material not separated by the precleaner 516. Cartridge 600 is generally a service part (or removable component), i.e. periodically during the lifetime of the air cleaner 600, the filter cartridge 600 would be removed and be refurbished or be replaced. The filter cartridge 600 comprises filter or filtration media 602 which may be any of a variety of types, for example various ones of these characterized herein above, including circular and non-circular cross-sectional shapes. Accordingly, the filter cartridge 600, including the surrounding shell 610 and seal arrangement 630 (discussed below) in addition to the media 602, may also be provided in many different shapes, for example, circular, rectangular, obround, and other essentially geometric shapes with rounded or non-rounded corners to match a similarly shaped housing body 504. Some examples of obround include an oval shape with opposite curved ends attached by a pair of opposite sides. In some oval shapes, the opposite sides are also curved. In other oval shapes, sometimes called racetrack shapes, the opposite sides are generally straight.

The typical cartridge 600 used with principles according to the present disclosure, is a "straight through flow" arrangement, which has a first (inlet) flow face or end 604 and opposite outlet (flow) face or end 606, with filtering flow of air through the filter cartridge 600 generally being from the inlet end 604 to the outlet end 606.

Still referring to FIGS. 26-29, in the example shown, the cartridge 600 includes a shell 610 surrounding the filtration media 602. The shell 610 protects the outer perimeter of the media 602 from damage that could otherwise be caused to the media 602 by the housing body 504 or during handling. Accordingly, the shell 610 may be referred to as a protective covering. The shell 610 can be formed from many impermeable and permeable materials, for example, ABS plastic and paper-based materials. The shell can also be provided with a solid impermeable construction, such as a solid ABS plastic wall, or with a permeable construction in which openings are provided within the sidewall. In the example shown, the shell 610 extends across the entire length of the media 602. In other examples, the shell 610 can extend along only a portion of the media length.

Referring to FIGS. 30-35, the shell 610 is shown independently from the remaining features of the filter cartridge 600. In one aspect, the shell 610 includes a circumferential sidewall 612 extending from a first end 614 to a second end 616 and defining an interior space 618. The sidewall 612 has an interior face 612*a* which faces towards the interior space 618 and an opposite exterior face 612*b*. When the media 602 is installed within the interior space 618, the interior face 612*a* is adjacent the outer perimeter of the media 602.

Figure 32:
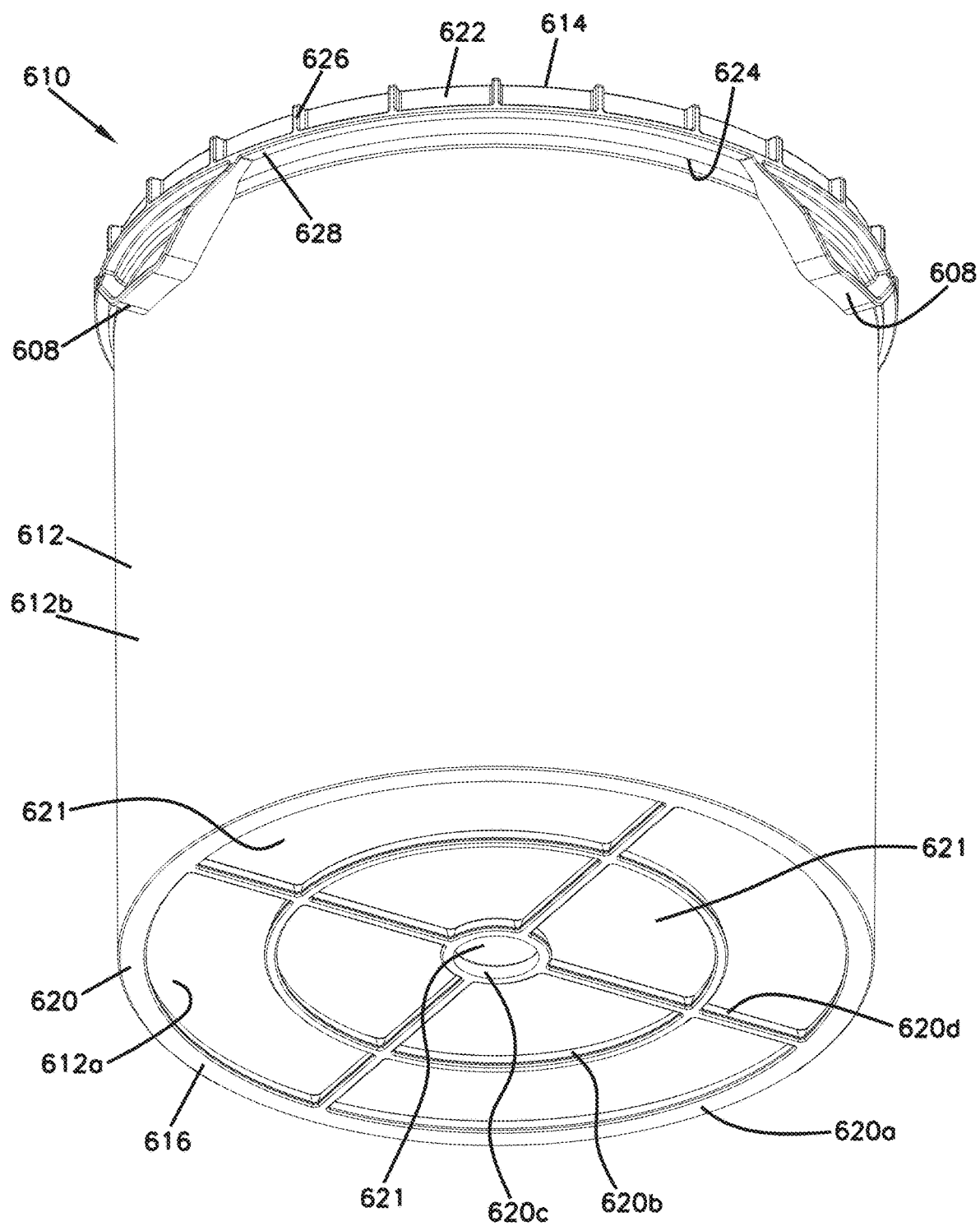
FIG. 32 is a schematic second perspective view of the shell shown in FIG. 31.
Figure 33:
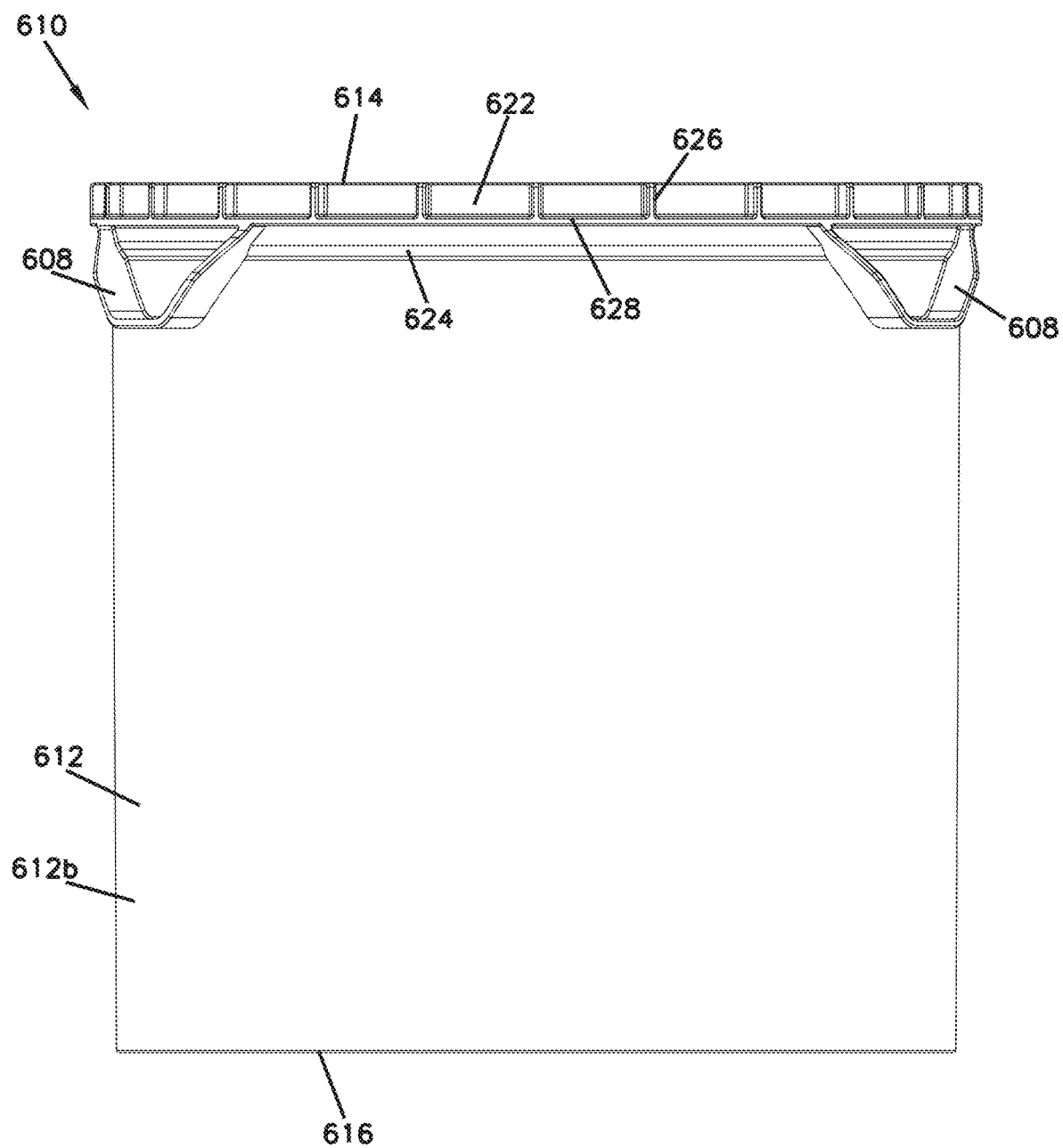
FIG. 33 is a schematic side view of the shell shown in FIG. 31.
Figure 34:
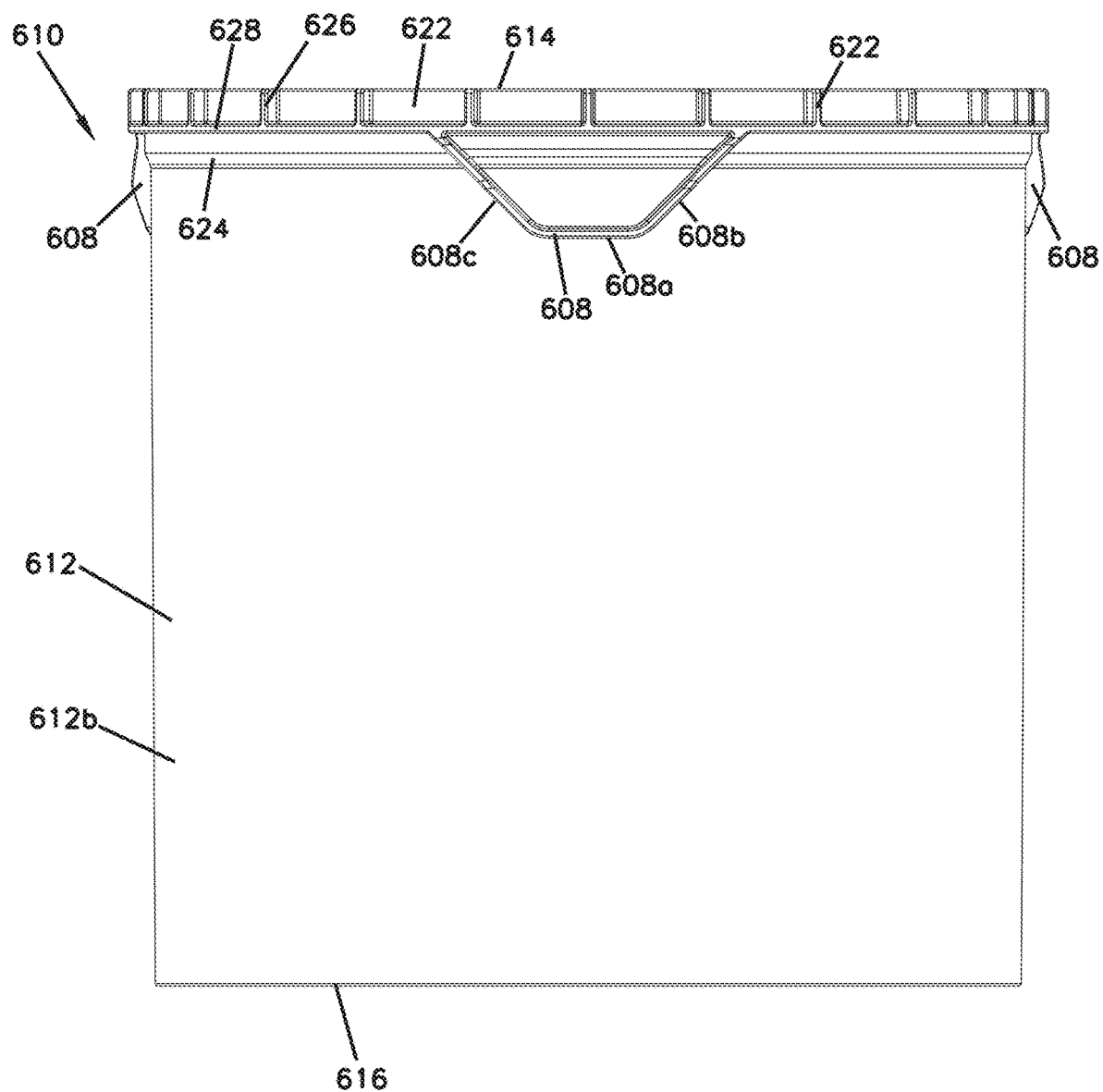
FIG. 34 is a schematic second side view of the shell shown in FIG. 31.
Figure 35:
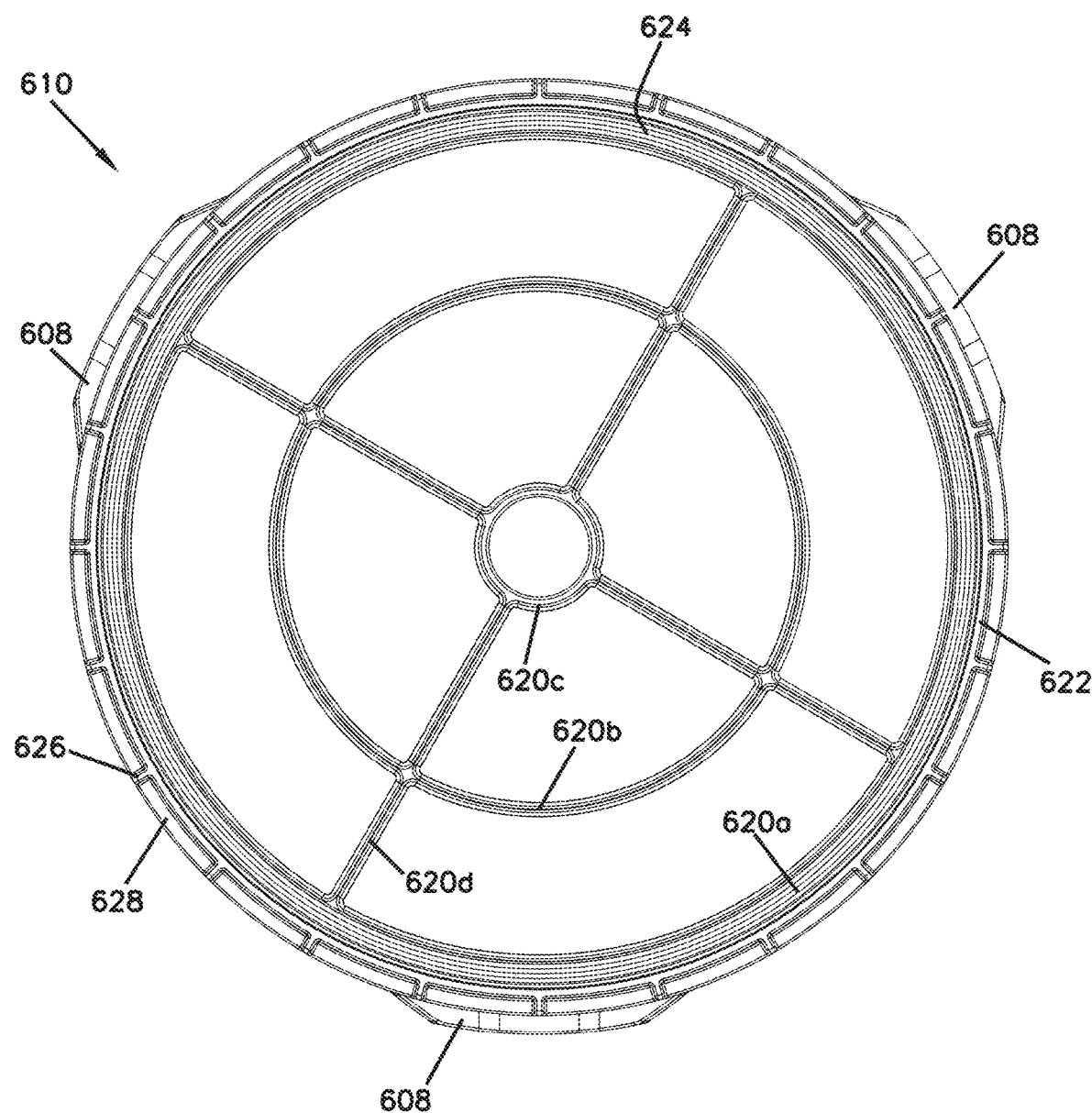
FIG. 35 is a schematic top view of the shell shown in FIG. 31.
Figure 36:
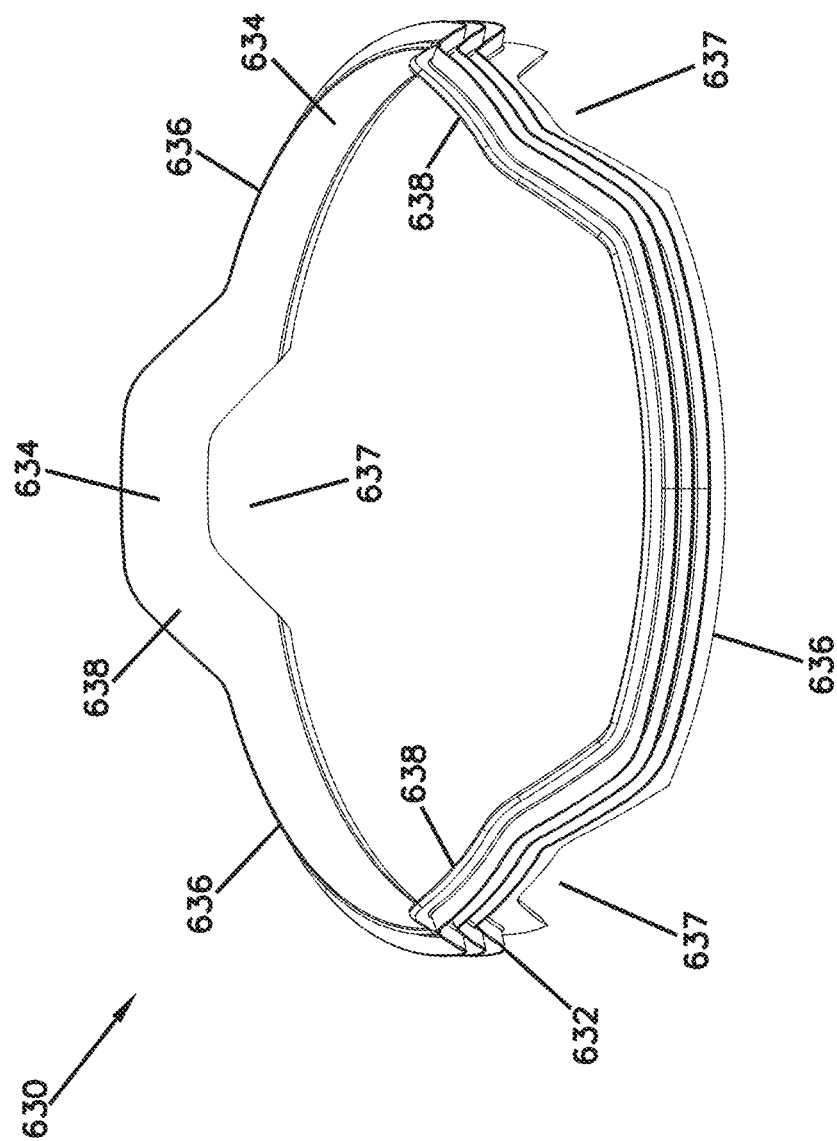
FIG. 36 is a schematic perspective view of a seal arrangement of the filter cartridge shown in FIG. 26.

With reference to FIG. 32, in the example shown, the shell 610 also includes a support structure 620 located proximate the second end 616. The support structure 620 is for securing the media 602 within the interior space 618 of the shell 610 such that the media 602 cannot pass beyond the support structure 620 and exit the shell 610 via the second end 616. The media 602 may be further secured into the shell 610 with adhesive materials between the outer perimeter of the media 602 and the interior face 612*a* and/or the media first end 614 and the interior face 612*a*.

In the example shown, the support structure 620 is provided as a grid extending across the open end of the shell 610 proximate the second end 616, wherein the grid 620 includes an inwardly extending flange portion 620*a*, an intermediate ring 620*b*, a central portion 620*c* that supports the central core of the media 602, and a plurality of radially extending ribs 620*d* supporting the intermediate ring 620*b* and central portion 620*c*. The grid structure 620 defines a plurality of open spaces 621 between the features 620*a*-620*d* to allow filtered air to flow through the media 602 without undue restriction. Other support structure configurations may be provided that support the media 602, yet allow for sufficient flow through the structure. For example, the support structure 620 can be configured as an inwardly extending ledge or flange, for example, a configuration in which only portion 620*a* is provided. In some examples, the shell 610 can be provided without the support structure 620.

Referring to FIGS. 32-35, the filter cartridge 600 is provided with a plurality of second members 608 of the projection-receiver arrangement 540. The features of the second members 608 are discussed in the following section. In the example shown, the second members 608 are formed integrally with the shell 610 and are nearer the first end 614 than they are the second end 616. Other arrangements are possible.

Figure 16A:
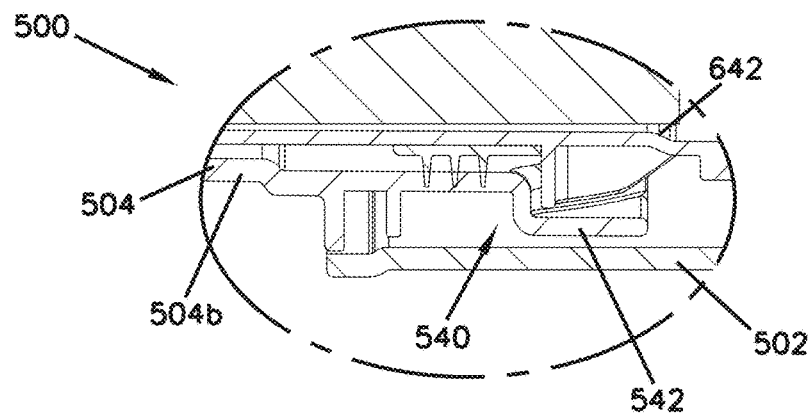
FIG. 16A is an enlarged schematic cross-sectional view of a portion of the air cleaner assembly shown at FIG. 16, as indicated by the encircled portion labeled FIG. 16A at FIG. 16.
Figure 16B:
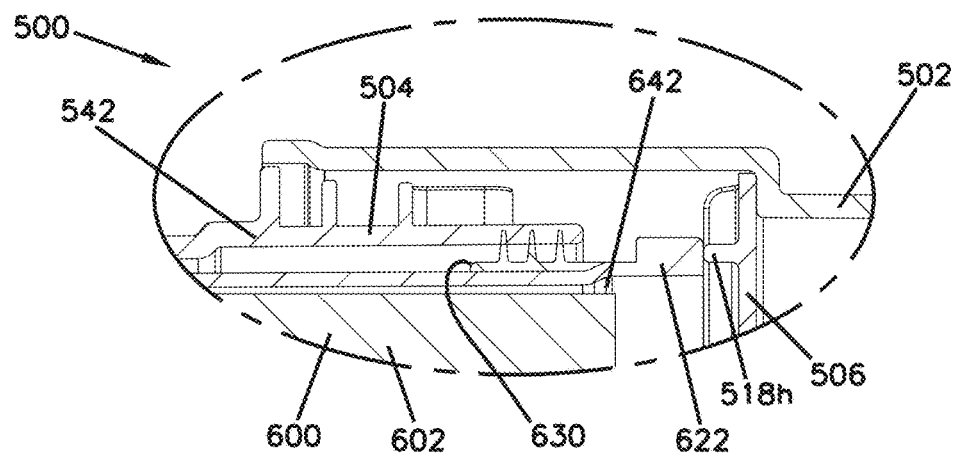
FIG. 16B is an enlarged schematic cross-sectional view of a portion of the air cleaner assembly shown at FIG. 16, as indicated by the encircled portion labeled FIG. 16B at FIG. 16.
Figure 16C:
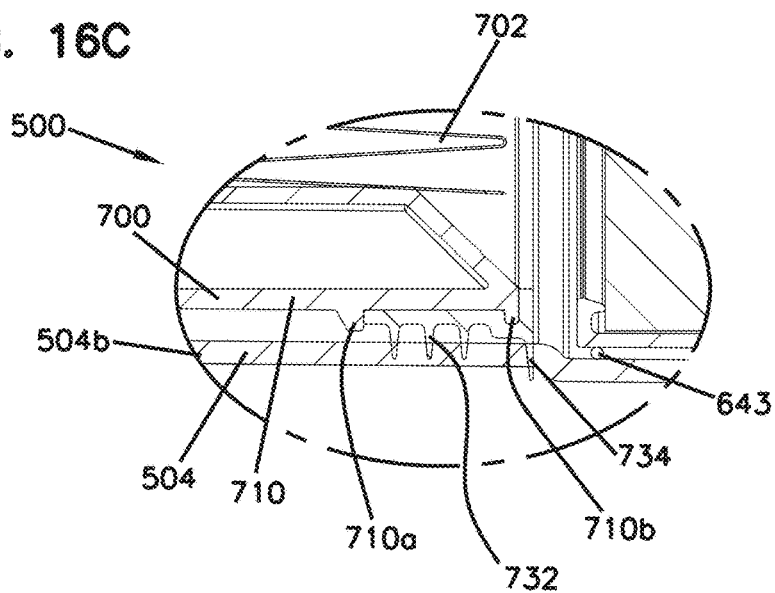
FIG. 16C is an enlarged schematic cross-sectional view of a portion of the air cleaner assembly shown at FIG. 16, as indicated by the encircled portion labeled FIG. 16C at FIG. 16.
Figure 17:
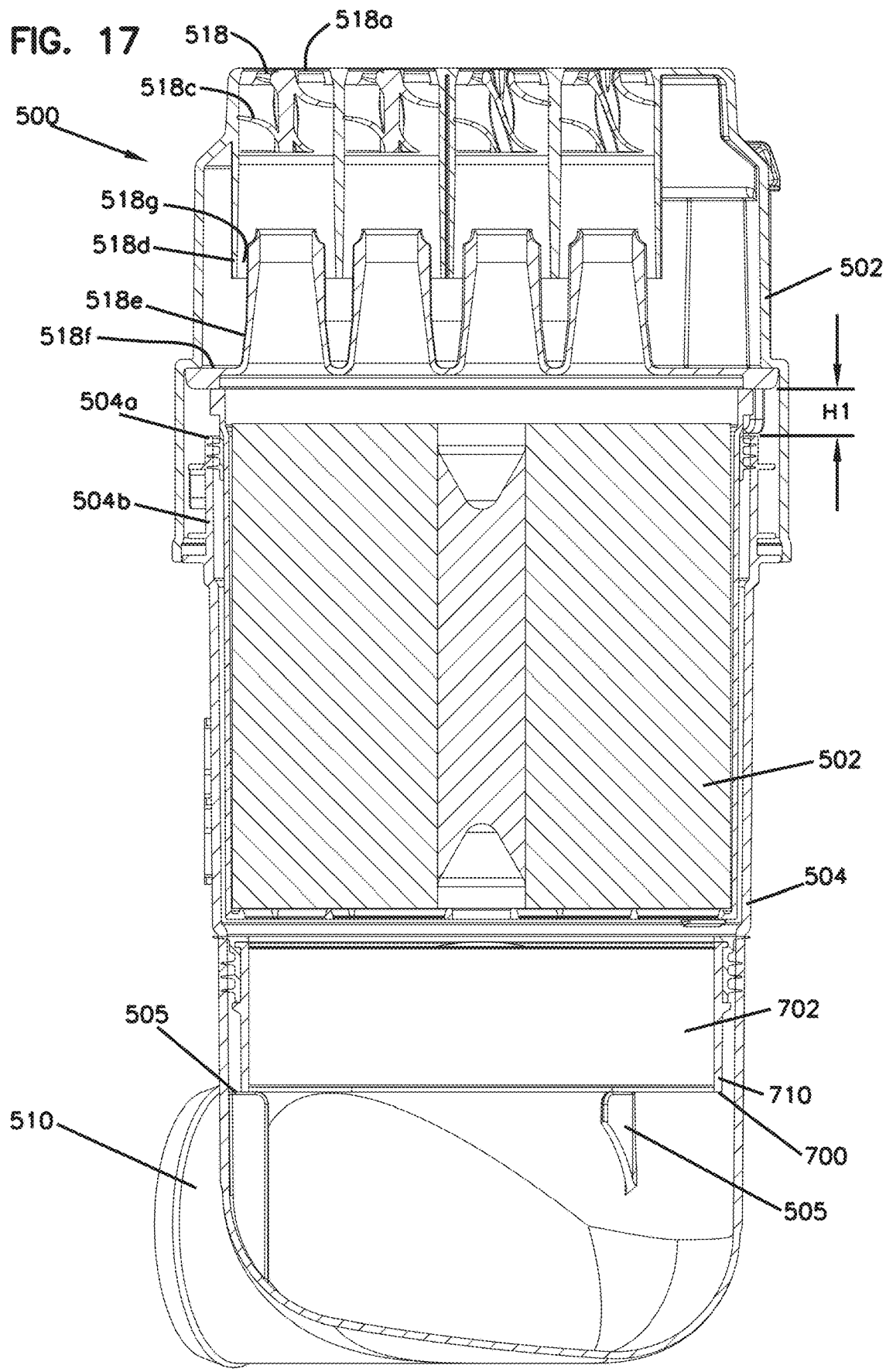
FIG. 17 is a schematic, cross-sectional view of the air cleaner assembly of FIG. 13, taken along the line 17-17 shown in FIG. 15.

Referring to FIGS. 30-35, the shell 610 is also shown as including an end portion 622 proximate the first end 614 of the shell 610. The end portion 622 extends past the end of the media 602 and transitions at a transition structure 624 to a larger internal diameter, as compared to the internal diameter defined at the location where the media 602 is installed in the interior space 618. In one example, and as viewed at FIGS. 16, 16A, 16B, an adhesive 642 can be applied at or near the transition structure 624 to secure the media 602 within the shell 610. Referring to FIGS. 16B, the filter cartridge 600 is shown as being optionally secured in the axial direction by contact between the end portion 622 and a circumferential rib 518*h* of the precleaner inner portion 506. Referring to FIGS. 16 and 16C, a member 643 is shown that can be provided that is mounted to either the housing body 504 or the shell 612 to aid in securing the filter cartridge 600 at the opposite end. The member 643 is preferably an elastomeric material that stabilizes the cartridge 600 and prevents hard-to-hard contact between the shell 610 and the interior of the housing body 504.

Referring back to FIGS. 30-35, the shell 610 also includes a plurality of axially extending, circumferentially spaced ribs 626 located about the end portion 622 and extending from a circumferential rib 628. The ribs 626, 628 function to strengthen the shell 610, and in particular the shell at the first end 614 and end portion 622. The circumferential rib 628 also provides support to the second members 608 of the projection-receiver arrangement 540.

The filter cartridge 600 is also provided with a seal arrangement 630. The seal arrangement 630 can be found on the filter cartridge at FIGS. 26-29 and isolated from the shell at FIGS. 36-40. The seal arrangement 630 is for forming a seal between the filter cartridge 600 and the interior of the second housing part 504 to ensure that air flowing from the intake 512 must flow through the filter cartridge 600 before reaching the outlet 510. As such, the seal arrangement 630 prevents bypassing of air around the filter cartridge 600 from the intake 512 to the outlet 510. In the example shown, the seal arrangement 630 is formed as a continuous band around the exterior face 612*b* of the shell sidewall 612 and extends radially outward from the exterior face 612*b*. The seal arrangement 630 can be provided about the outer perimeter of the media 602, where a shell 610 is not provided. In some examples, the seal arrangement 630 could be a discontinuous band, or have discontinuous portions, as long as effective sealing is provided. This could be accomplished by providing multiple, overlapping seal portions or seal portions with staggered gaps to form a labyrinth-type seal.

As most easily viewed at FIGS. 36-40, in the example shown, the seal arrangement 630 is formed with a plurality of seal lips 632 extending radially from a base portion 634. The base portion 634 is shown as being adhered to the shell exterior face 612*b* at FIGS. 26-29. As shown, each of the seal lips 632 is a flexible, elongate radial extension that tapers or narrows slightly as it extends from the base portion 634 to its free distal end. The outer diameter defined by the seal lips 632 is greater than the internal diameter defined by the sidewall 504*b* of the housing body 504. When the filter cartridge 600 is installed into the housing body 504, the seal lips 632 deflect in a direction opposite the insertion direction, which is also opposite the direction of the airflow through the cartridge 600. The elasticity of the seal lips 632 causes the seal lips 632 to rest against the interior of the housing body sidewall 504*b* to form an outwardly directed radial seal. As the seal lips 632 are deflected in a direction against that of the airflow, airflow through the air cleaner assembly 500 exerts a force against the seal lips 632 which increases the sealing effect of the seal lips 632 against the housing body sidewall 504*b*.

Figure 28:
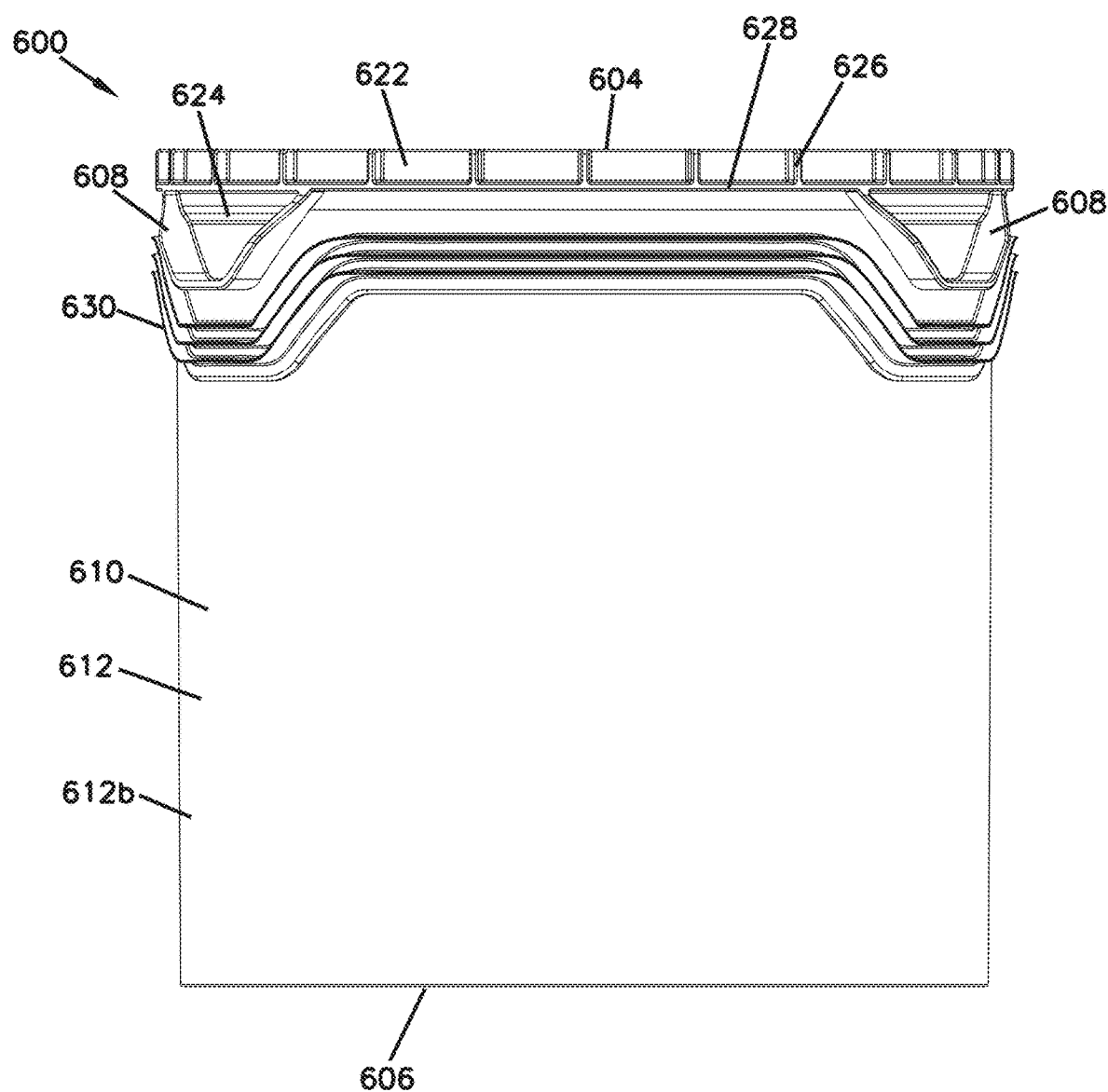
FIG. 28 is a schematic side view of the filter cartridge shown in FIG. 26.
Figure 28A:
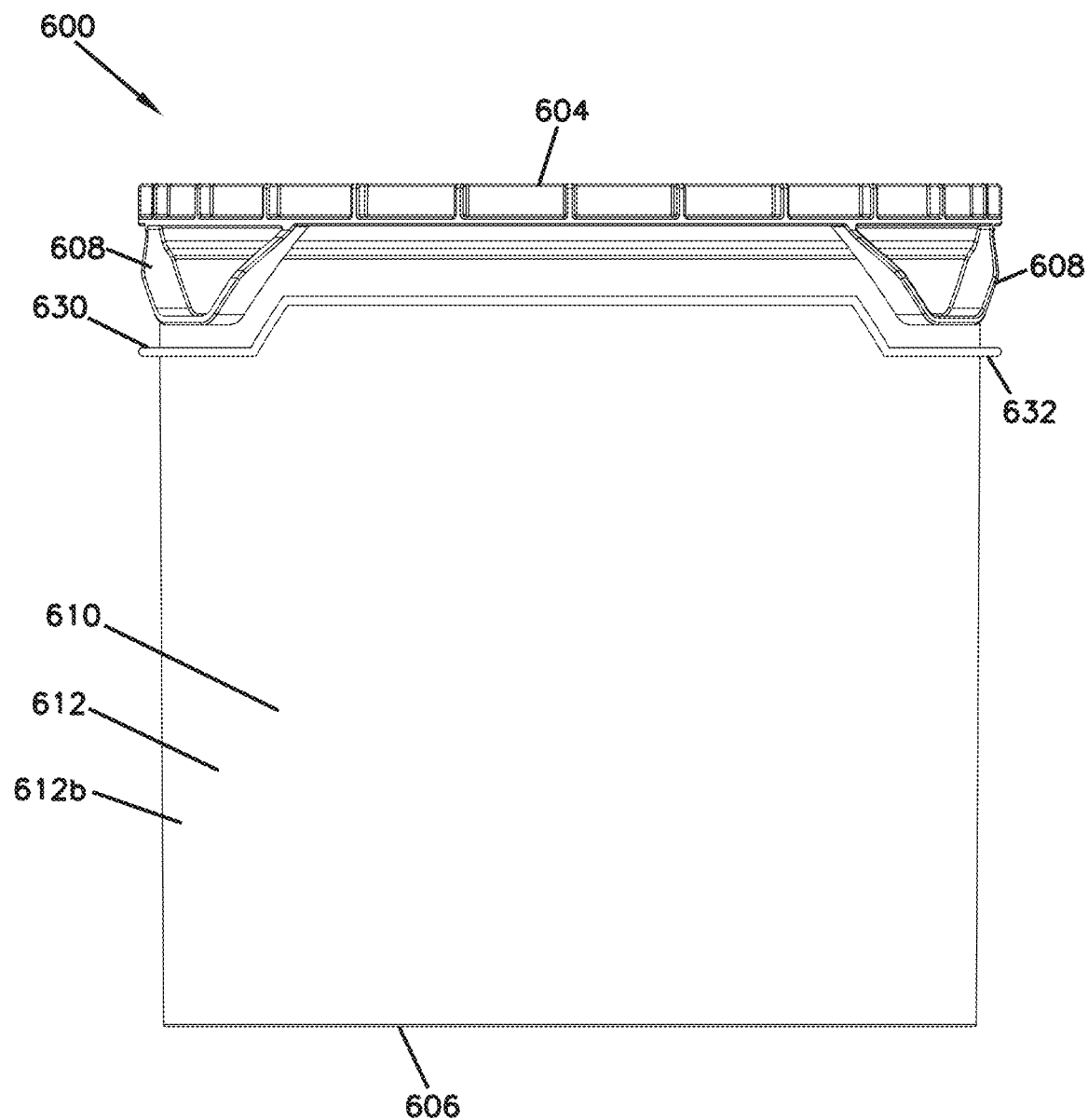
FIG. 28A is a schematic side view of the filter cartridge shown in FIG. 26, but with only one lip seal provided for the seal arrangement.
Figure 29:
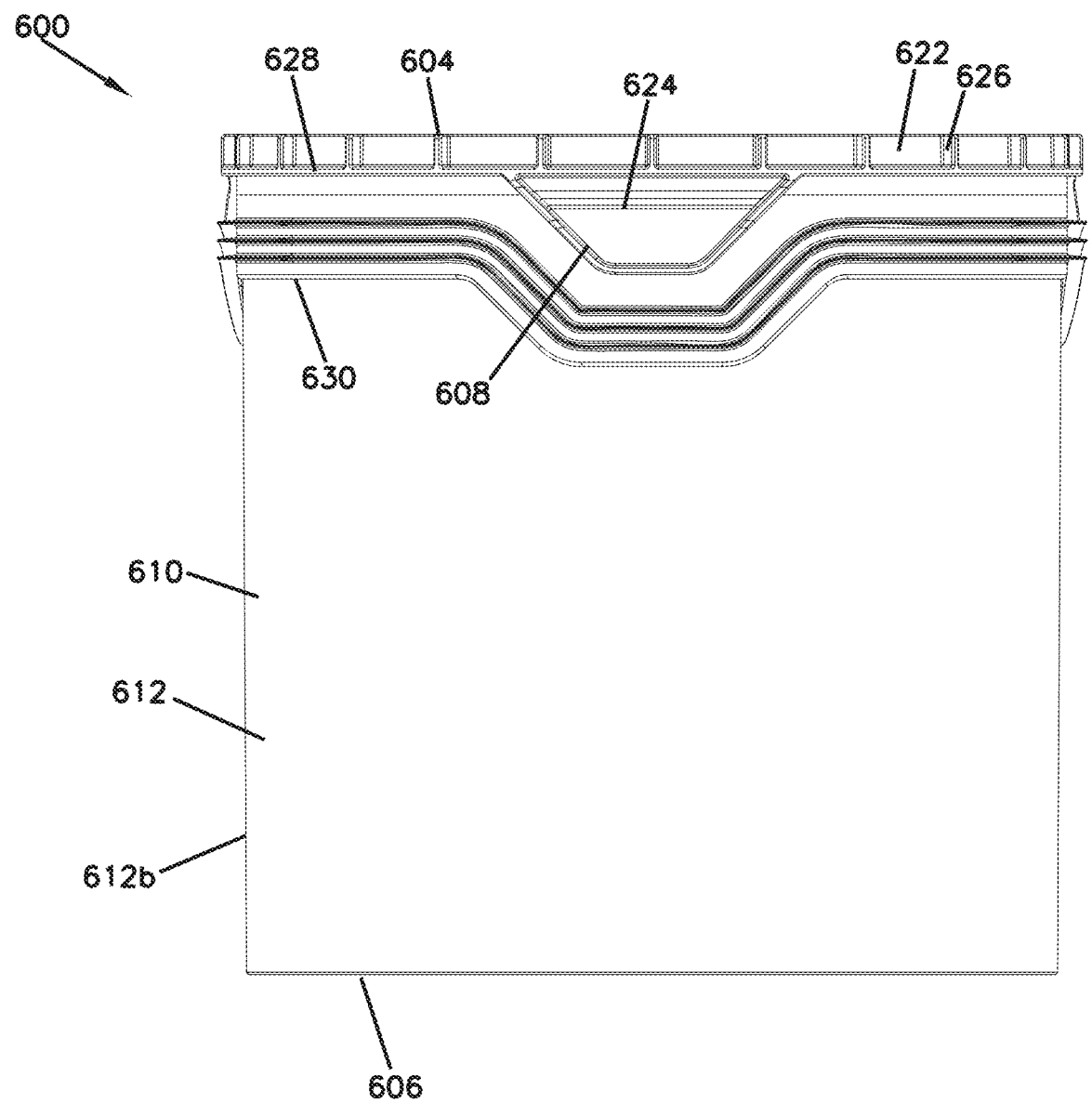
FIG. 29 is a second schematic side view of the filter cartridge shown in FIG. 26.
Figure 30:
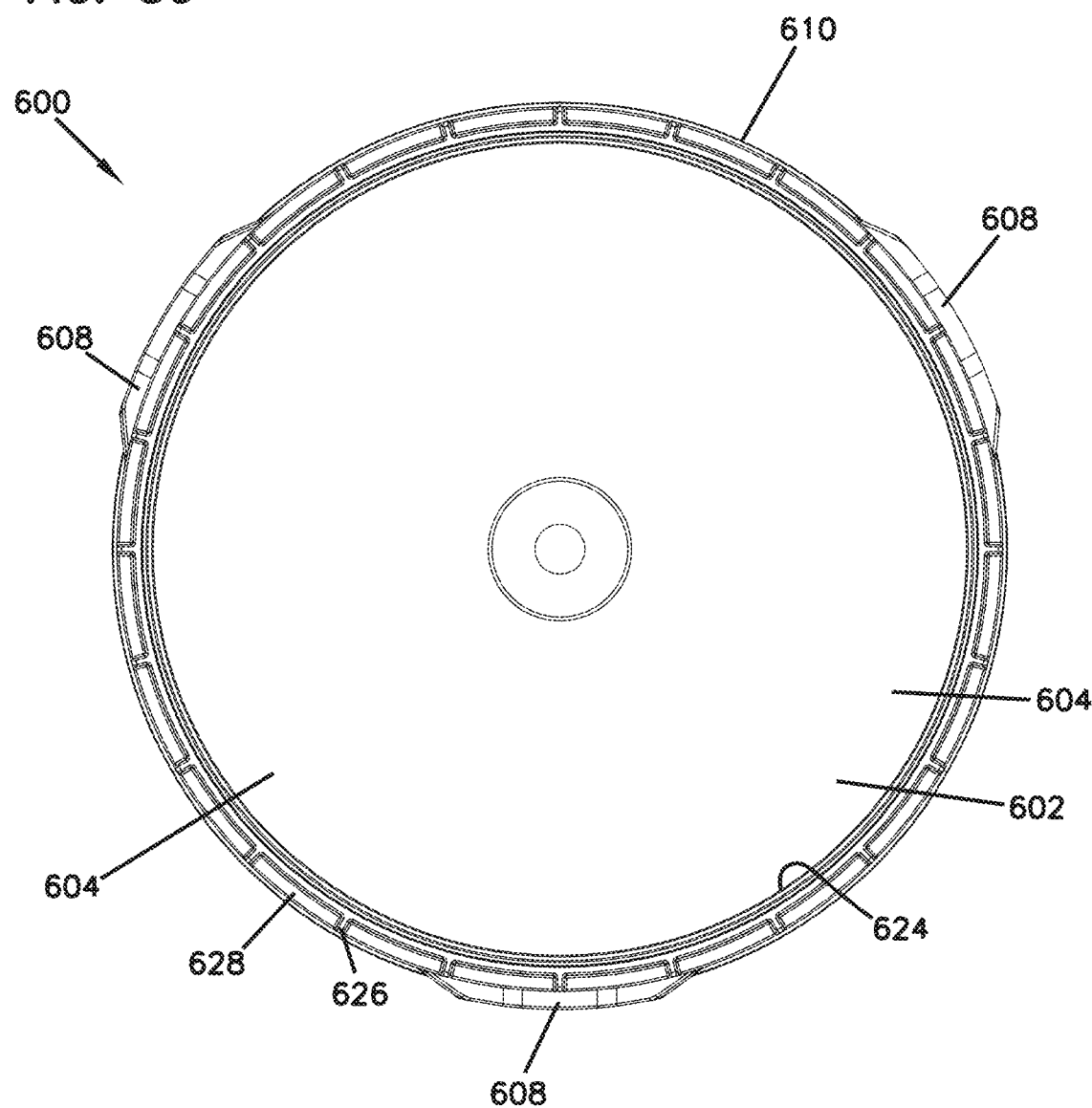
FIG. 30 is a schematic top view of the filter cartridge shown in FIG. 26.
Figure 31:
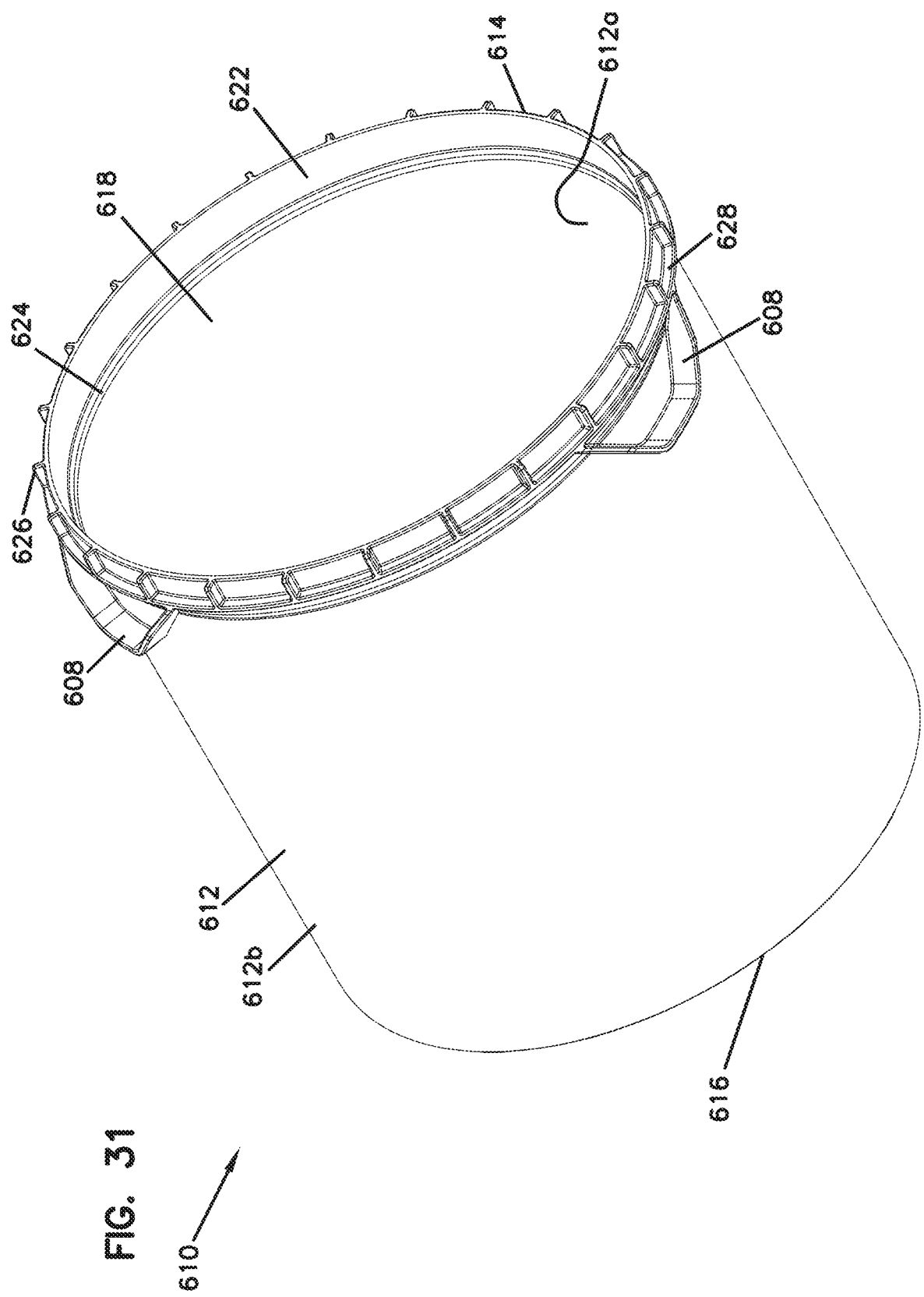
FIG. 31 is a schematic perspective view of a shell of the filter cartridge shown in FIG. 26.

Still referring to FIGS. 36-40, three axially spaced seal lips 632 are provided, each of which continuously extends about the entire outer circumference of the shell 610. More or fewer seal lips 632 may be used, for example, one, two, four, and five seal lips. An example of a single lip seal embodiment is shown at FIG. 28. Additionally, the seal lips 632 are shown as being equally spaced apart, however, the seal arrangement 630 could be provided with variable spacing between the seal lips 632. In one approach, the shell 610 can be formed via injection molding, and subsequently placed into a second mold wherein the seal arrangement 630 can be injection molded onto the shell 610. One class of materials suitable for injection molding of the seal arrangement 630 are thermoplastic elastomers (TPE). TPE materials allow for injection molding of highly flexible parts with detailed profiles, and are thus advantageous for the formation of the seal lips 632. Other formation processes may also be used. For example, the seal arrangement 630 could be independently molded from TPE or another material and later attached to the shell 610 or media 602 with an adhesive and/or sealant, or mechanically or frictionally secured in place without the use of an adhesive. As the seal arrangement 630 is disposed about the shell 610, the seal arrangement 630 will naturally have the same perimeter shape as the shell 610. Accordingly, the seal arrangement can also be provided in many shapes, such as round or circular, rectangular, obround, ovular, and other essentially geometric shapes with rounded or non-rounded corners.

With continued reference to FIGS. 36-40, the seal arrangement 630 can be formed with a plurality of alternating first and second adjoining segments 636, 638, including at least one first segment 636 and at least one second segment 638. By use of the term "segment", it is simply meant to indicate a portion of the seal arrangement without regard to the shape of the seal and does not require that the portion be entirely linear, planar, curved, or particularly shaped unless otherwise further specified. In the example shown, three first segments 636 and three second segments 638 are provided to form a continuous band about the shell 610. The first segments 636 are shown as being generally planar and extending about the circumference of the shell 610 such that each part of the first segment 636 is the same distance from the first and second ends 614, 616 as every other corresponding part of the first segment 636 (i.e. first segment 636 is oriented parallel to the inlet and outlet flow faces 604, 606). However, the first segments 636 can be nonplanar in other embodiments.

The second segments 638 are each shown as deviating away from the interconnected first segments 636 in a direction towards the shell second end 616. As such, the second segments 638 are closer to the shell second end 616 than are corresponding portions of the first segments 636. The resulting void space 637 (see FIGS. 36-39) created by the second segments 638 allows for accommodation of the second members 608 of the shell 610. Although the example presented in the drawings shows the second segments 638 as being equally spaced apart, identically shaped, and deviating away from the first segments 638 the same distance towards the second end 616, the second segments can be alternatively arranged. For example, second segments 638 can be provided that are shaped differently from each other, that extend different distances away from the first segments 638 towards the second end 616, and/or that have different radial spacing between them (i.e. the lengths of at least two of the first member 636 are unequal).

Figure 37:
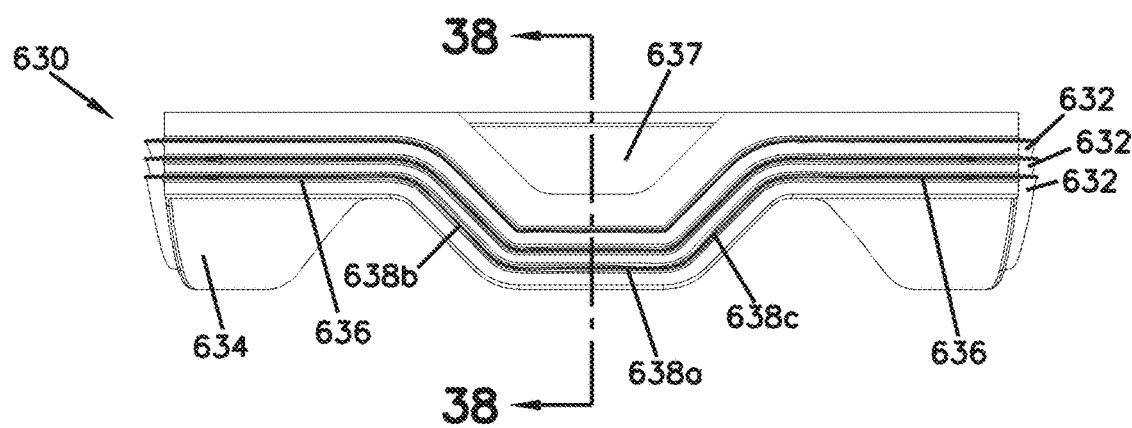
FIG. 37 is a schematic side view of the seal arrangement shown in FIG. 36.
Figure 38:
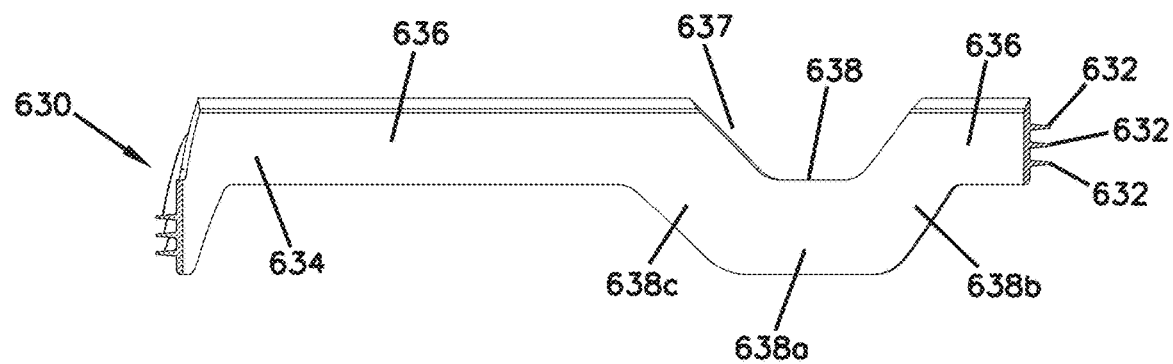
FIG. 38 is a schematic cross-sectional view of the seal arrangement shown in FIG. 36, taken along the line 38-38 in FIG. 37.
Figure 39:
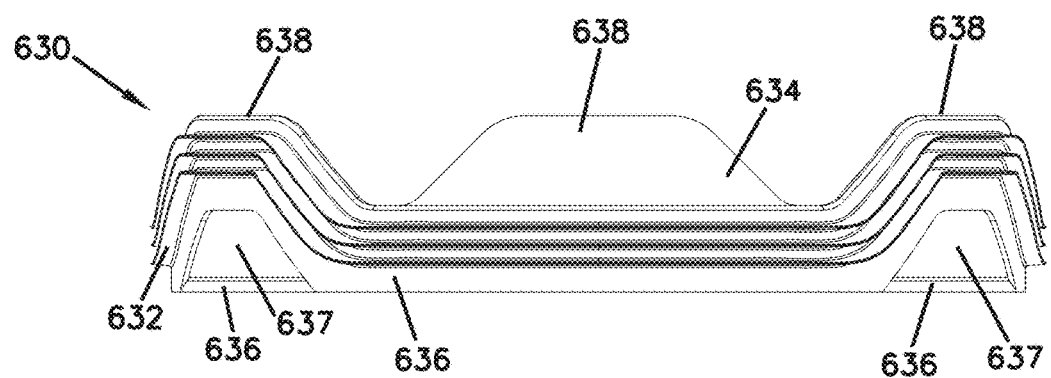
FIG. 39 is a schematic second side view of the seal arrangement shown in FIG. 36.
Figure 40:
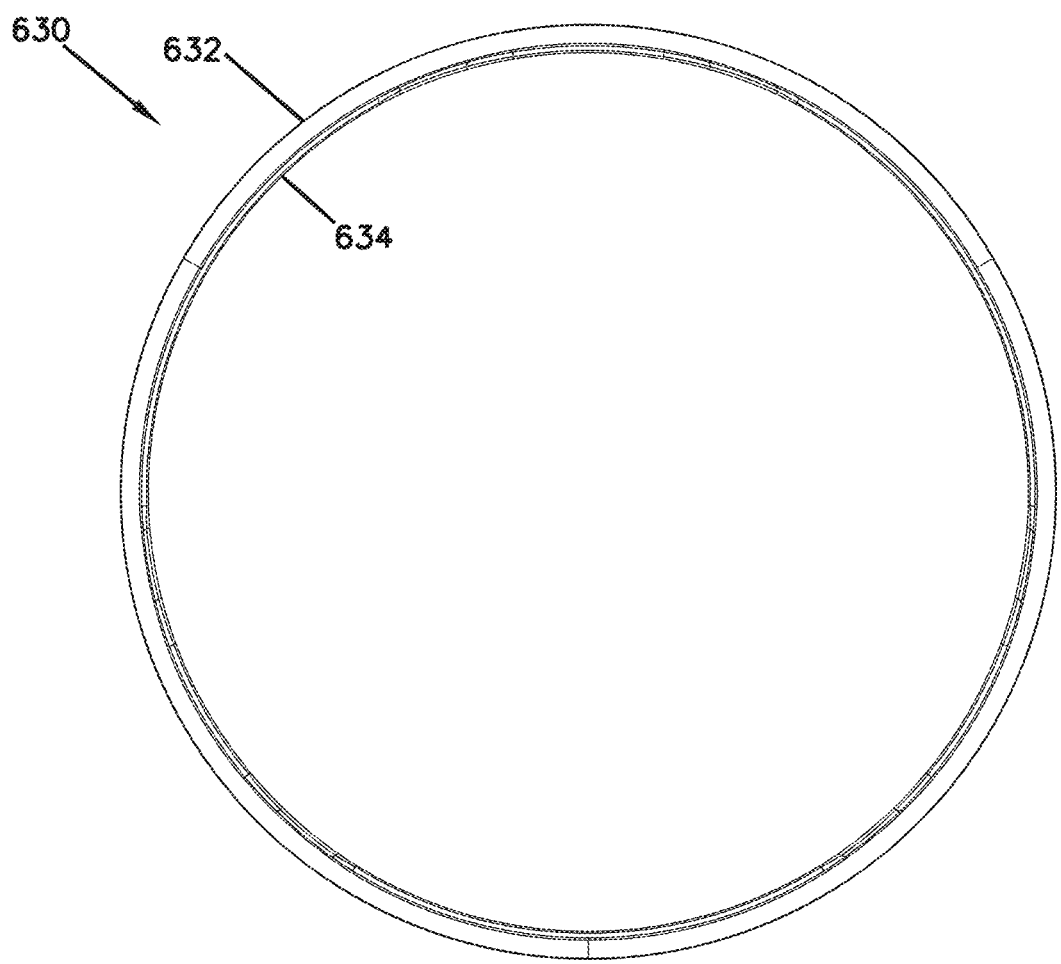
FIG. 40 is a schematic top view of the seal arrangement shown in FIG. 36.
Figure 41:
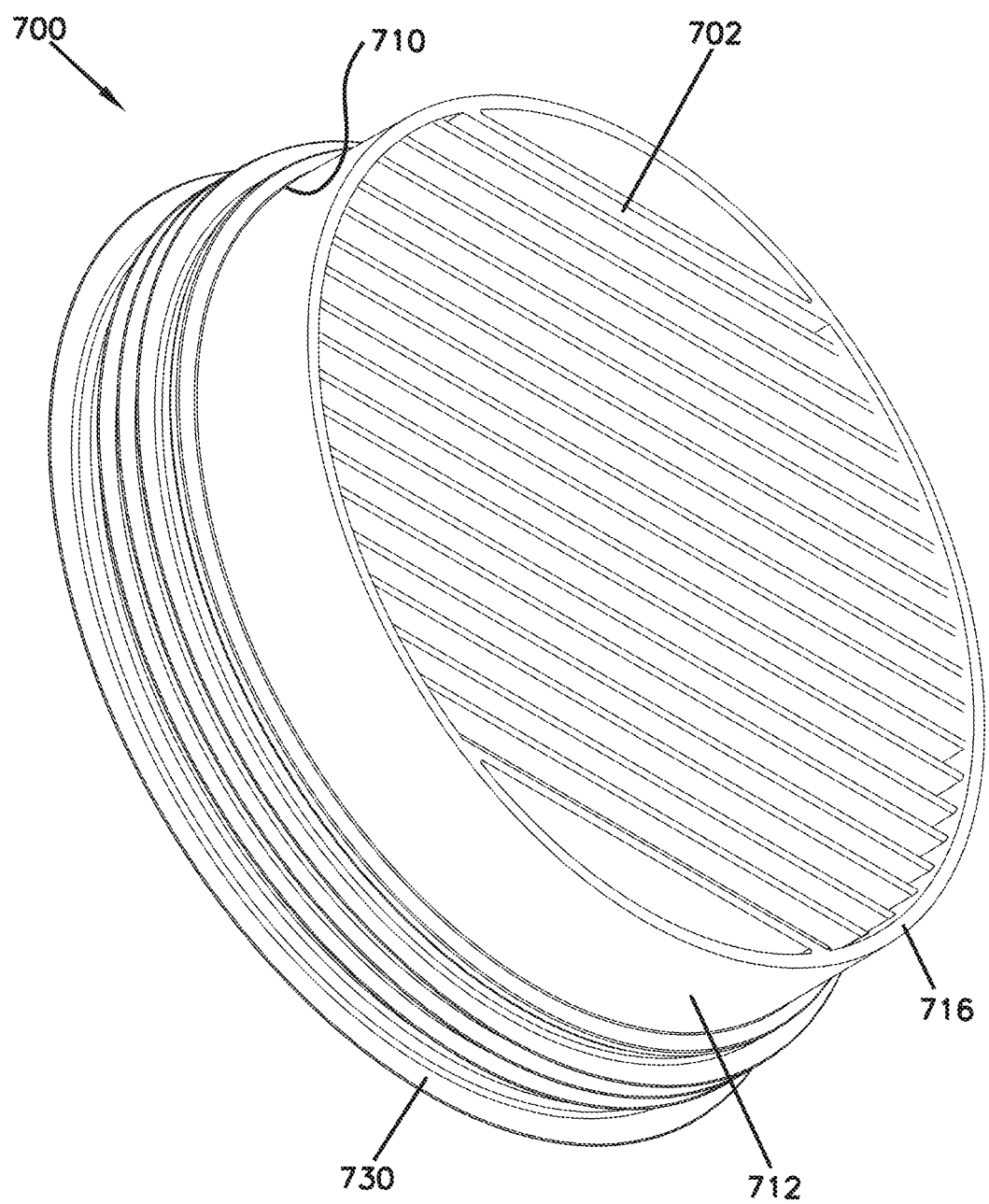
FIG. 41 is a schematic perspective view of a secondary or safety filter cartridge component installable in the air cleaner assembly of FIG. 13.
Figure 42:
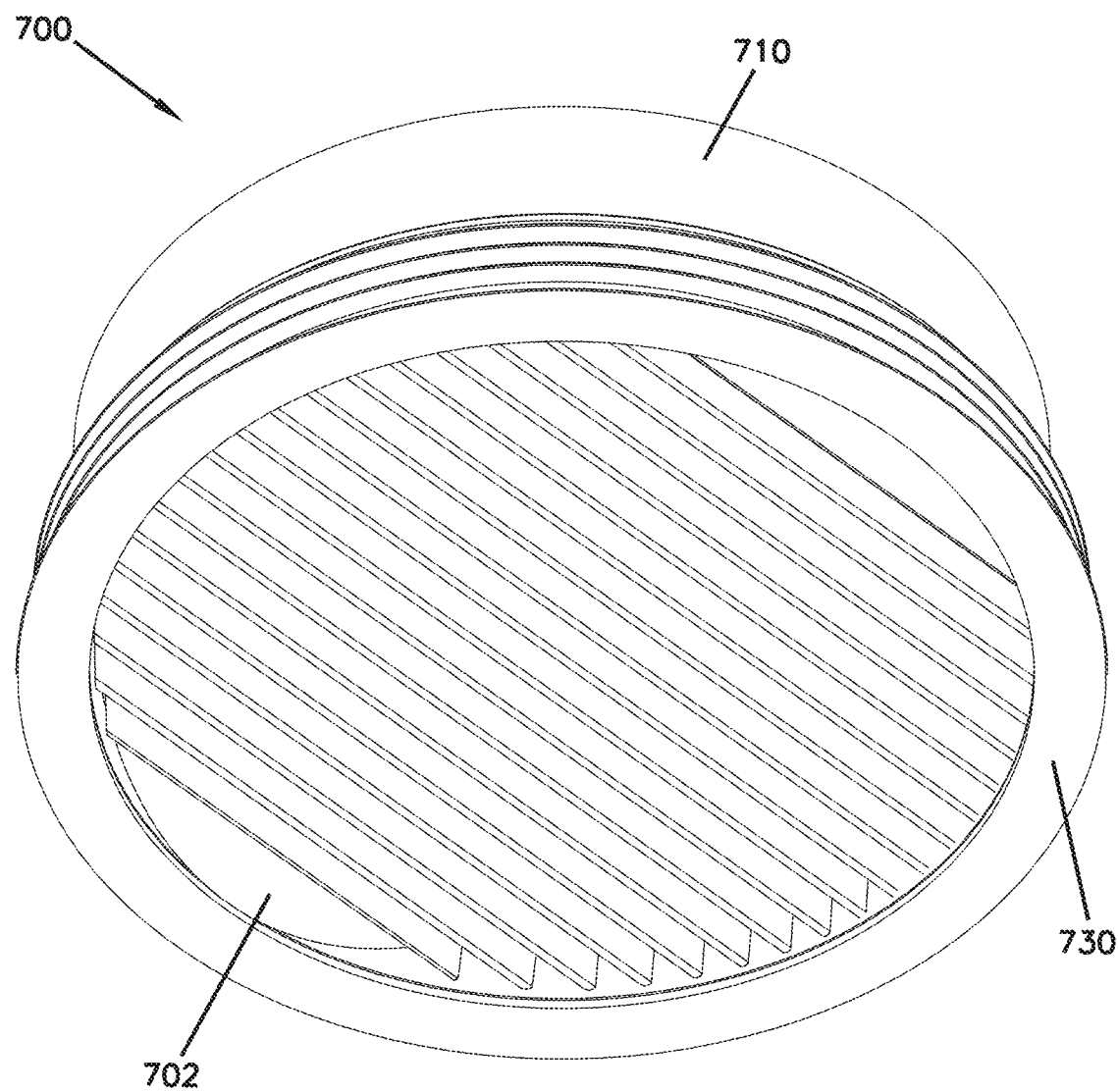
FIG. 42 is a second schematic perspective view of the filter cartridge shown in FIG. 41.
Figure 43:
FIG. 43 is a schematic side view of the filter cartridge shown in FIG. 41.
Figure 44:
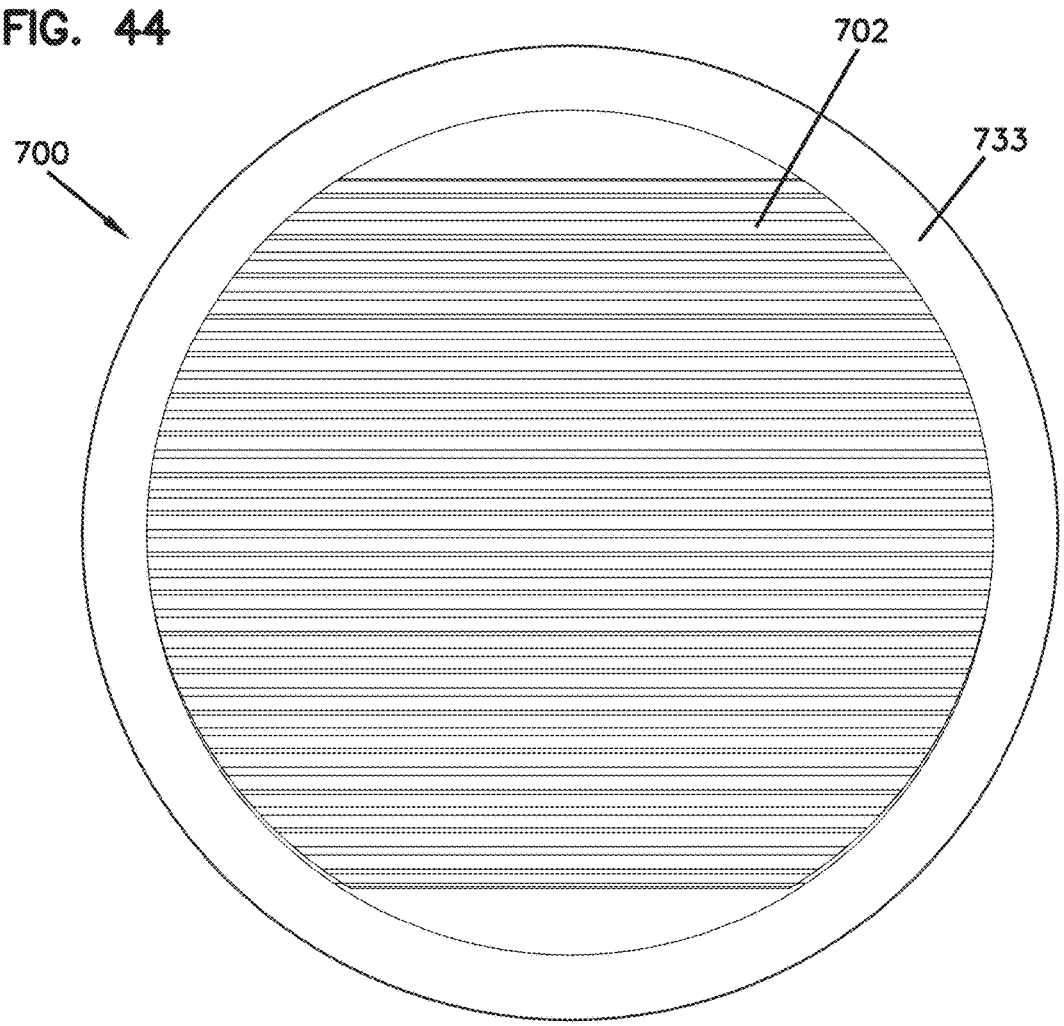
FIG. 44 is a schematic top view of the filter cartridge shown in FIG. 41.
Figure 45:
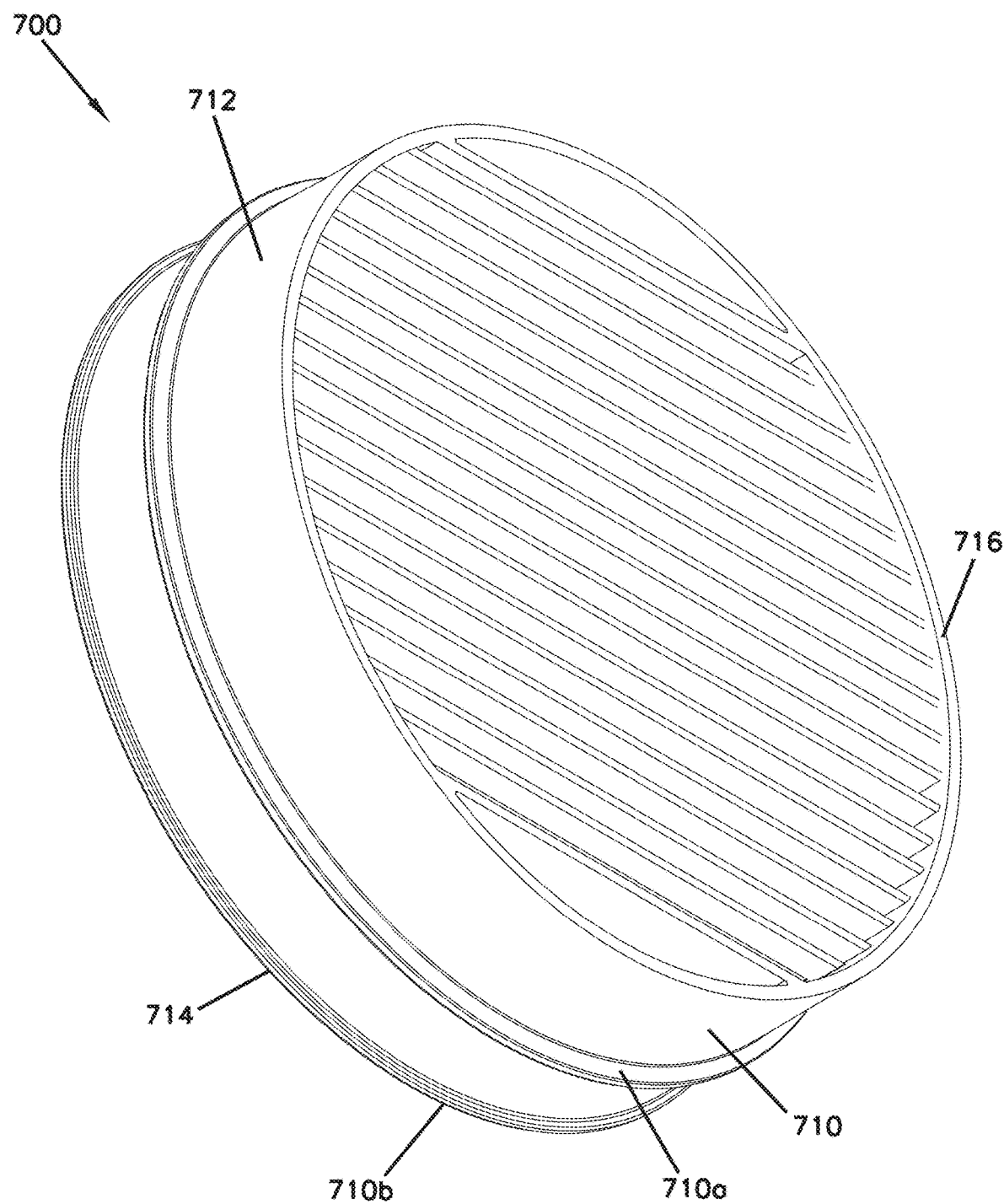
FIG. 45 is a schematic perspective view of a shell of the filter cartridge shown in FIG. 41 with the media installed.
Figure 46:
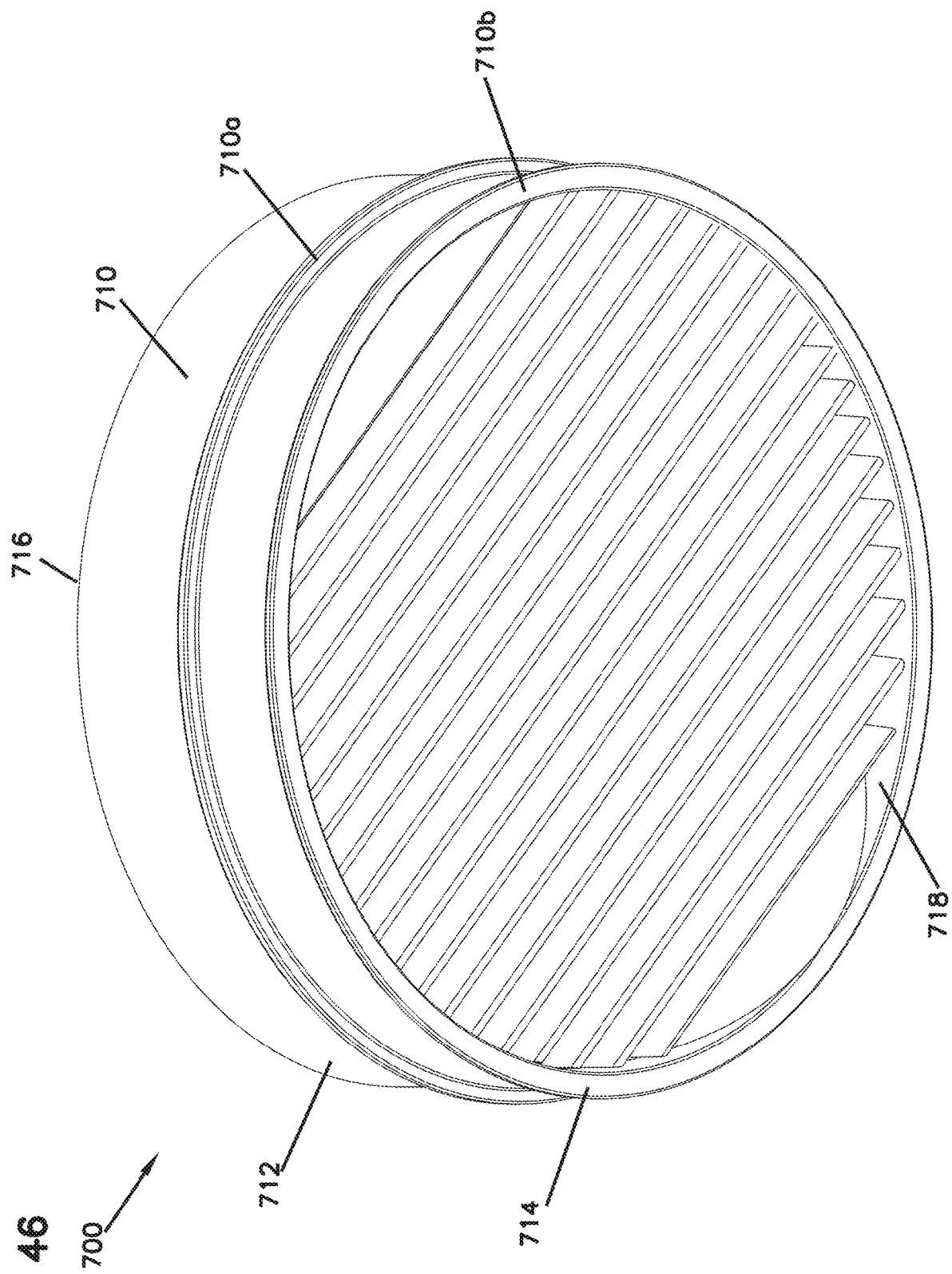
FIG. 46 is a schematic second perspective view of the shell shown in FIG. 45.
Figure 47:
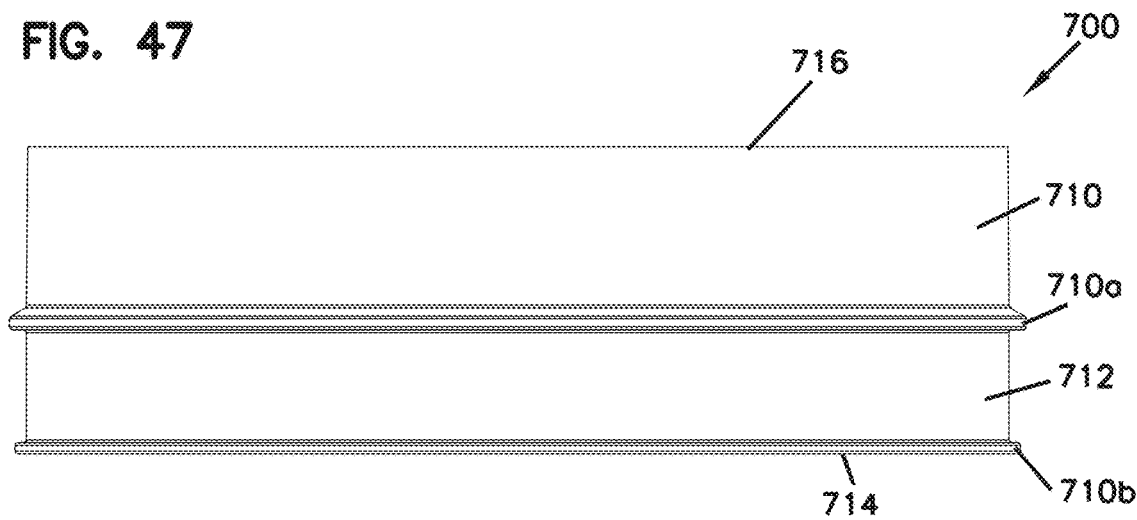
FIG. 47 is a schematic side view of the shell shown in FIG. 45.
Figure 48:
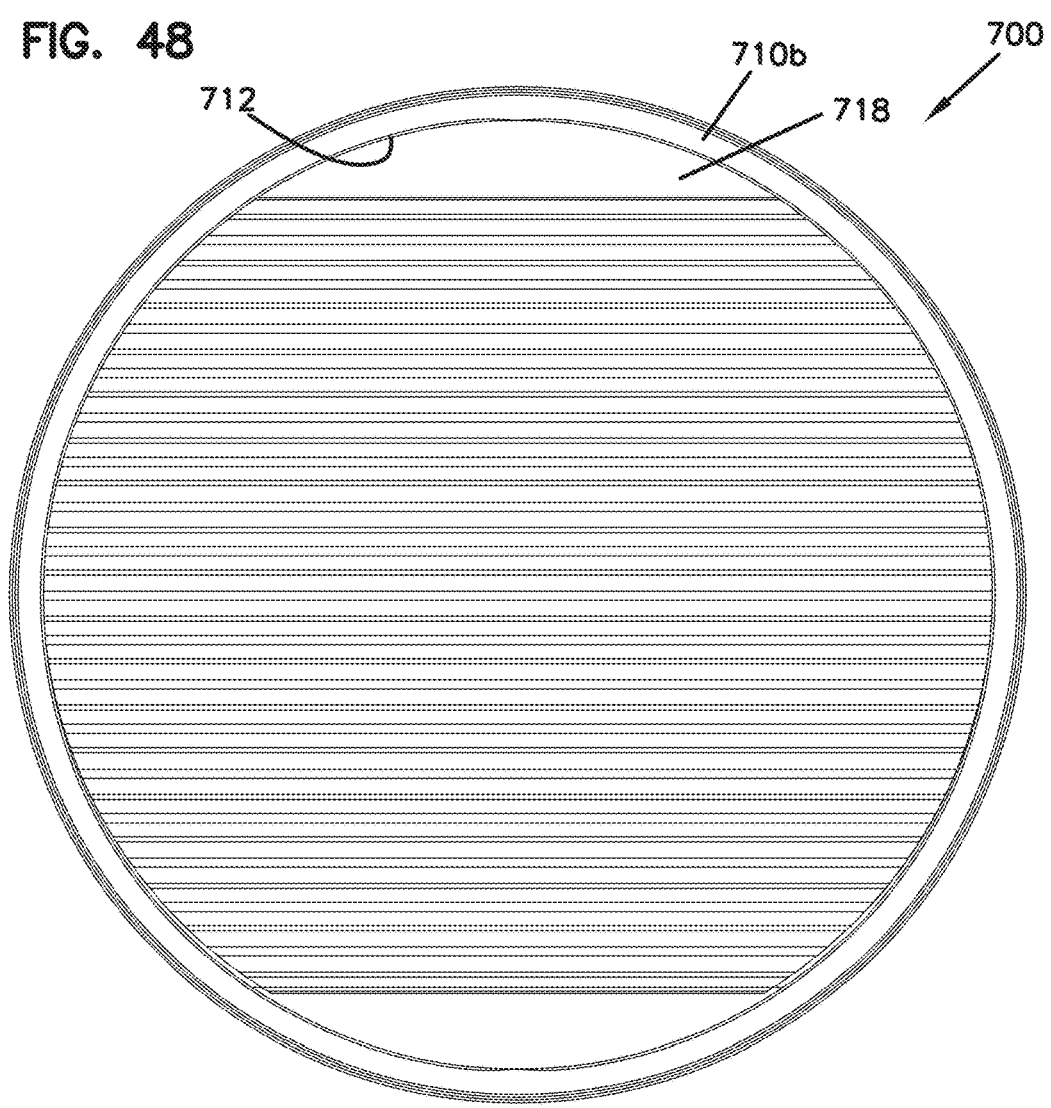
FIG. 48 is a schematic top view of the shell shown in FIG. 45.
Figure 49:
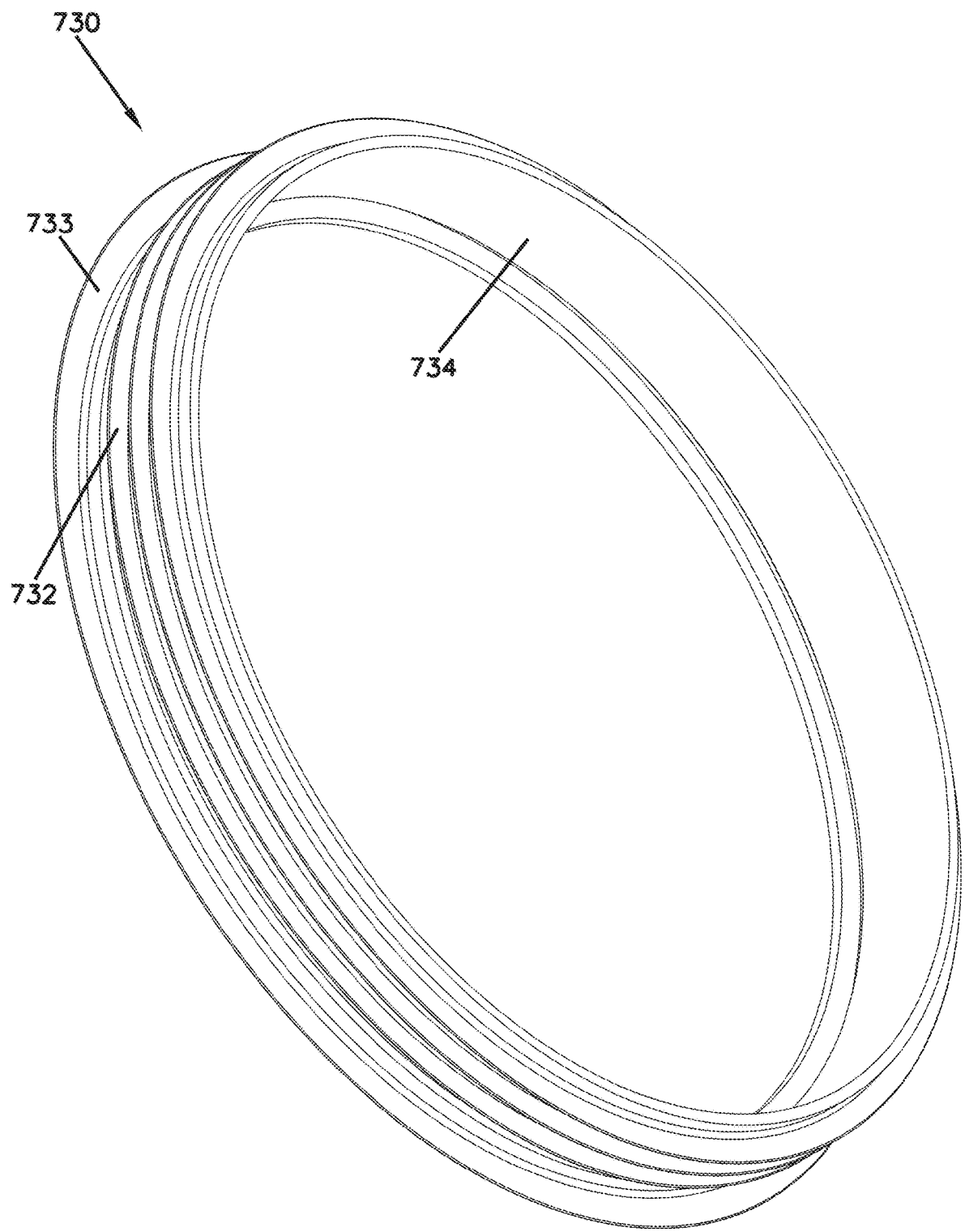
FIG. 49 is a schematic perspective view of a seal arrangement of the filter cartridge shown in FIG. 41.
Figure 52:
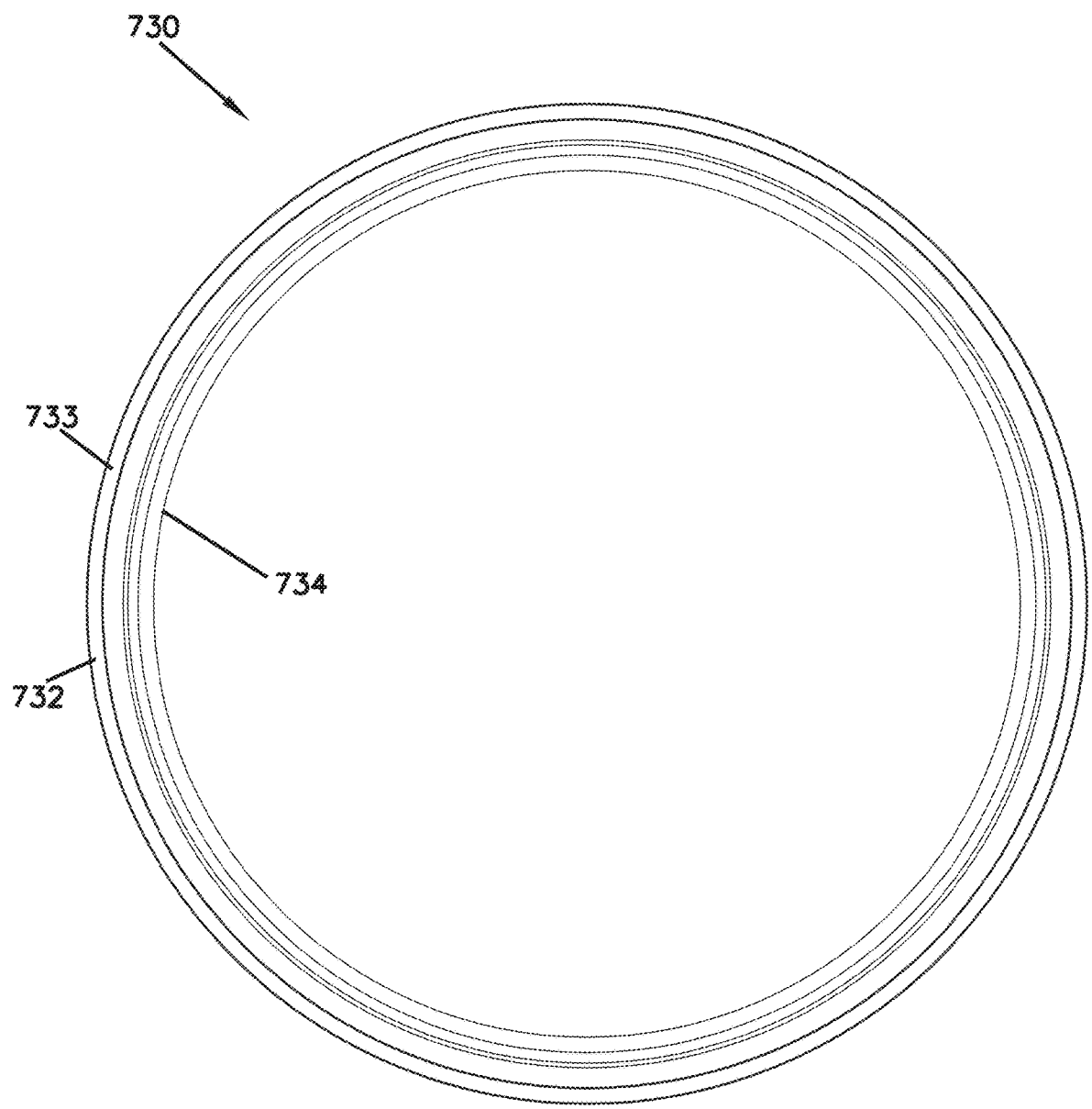
FIG. 52 is a schematic top view of the seal arrangement shown in FIG. 49.
Figure 53:
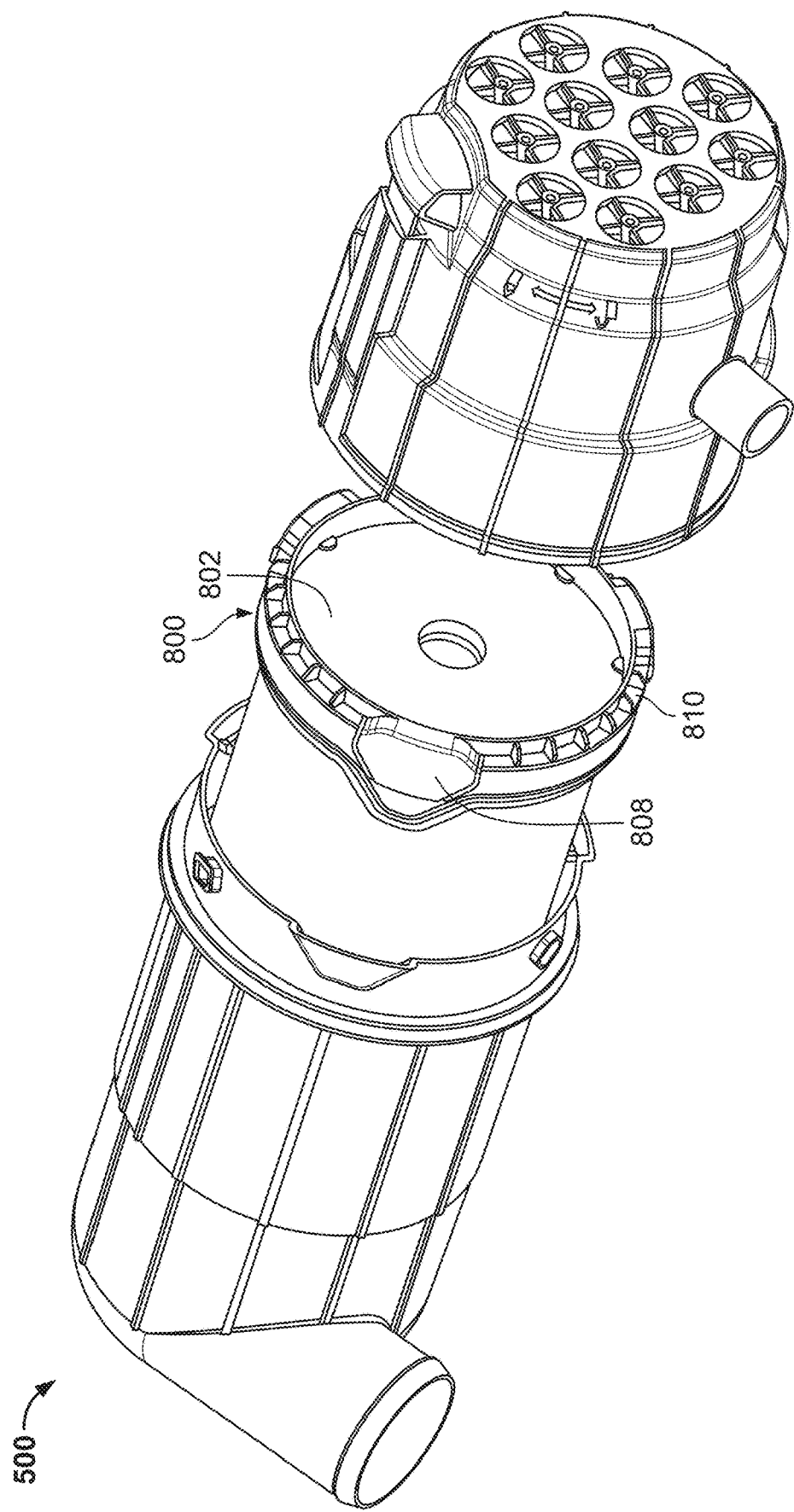
FIG. 53 is a schematic perspective view of a filter cartridge component installed in the air cleaner assembly of FIG. 13, with the cover removed.
Figure 54:
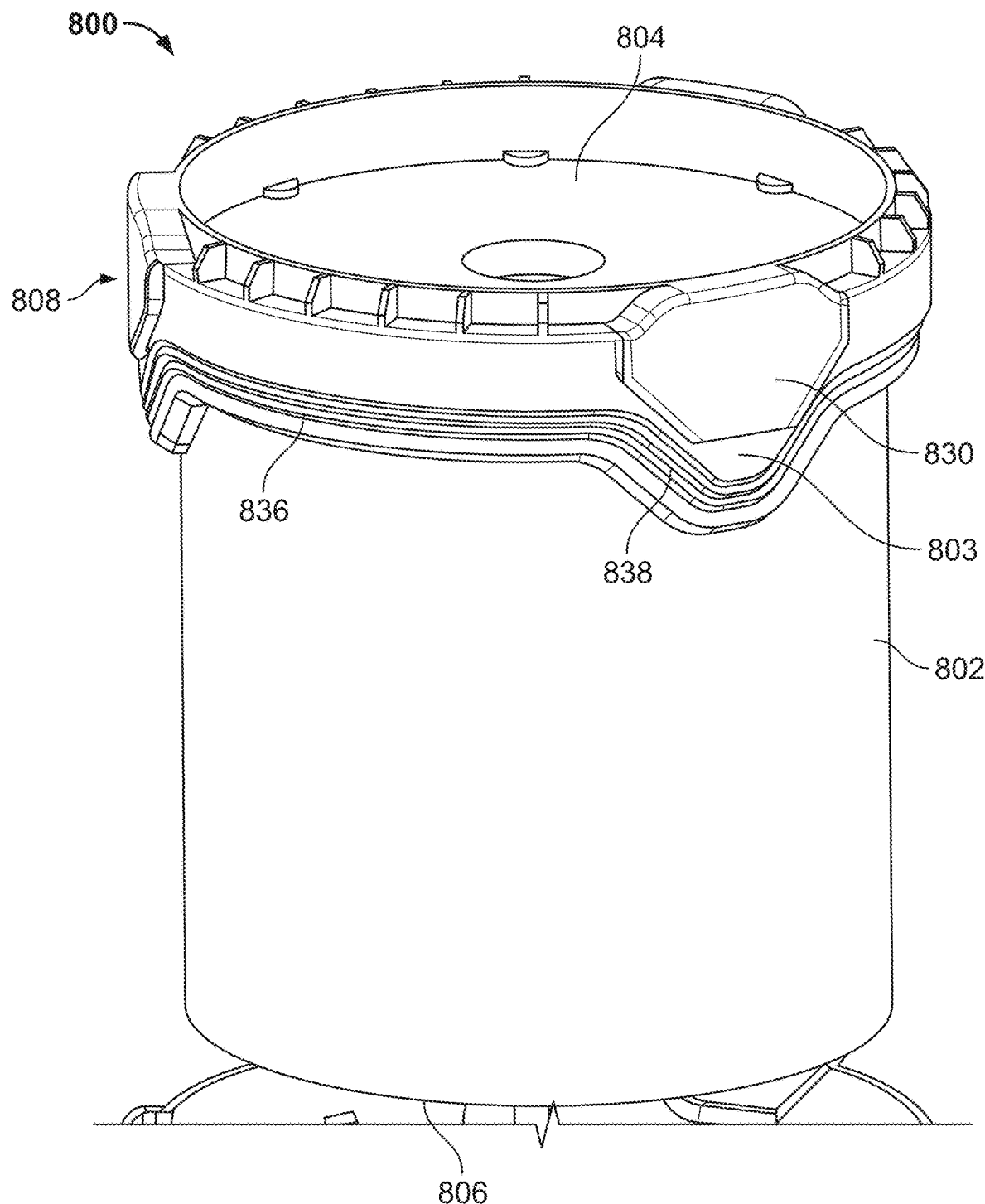
FIG. 54 is a schematic perspective view of the filter cartridge shown in FIG. 53.

As detailed at FIGS. 37-39, the second segments 638 are shown as being generally formed from three interconnected planar portions 638a, 638b, 638c, wherein the portion 638a is generally parallel to the inlet flow face 604 and the portions 638b, 638c extend at an oblique angle from the portion 638a and towards the first segments 636. In this manner, portions 638b, 638c serve as transition segments between the portion 638c and the first segment(s) 636. As shown, portions 638a and 638b each extend from the portion 638c at about a 45 degree angle, wherein the portion 638c is generally parallel to the first segments 636 and to the inlet flow face of the cartridge 600. Of course, other angles and variations are possible. The second segments 638 could be formed to be entirely curved to have, for example, a semi-circular shape, a semi-ovular shape, or a semi-elliptical shape. The second segments 638 could also be formed to have a slot or notched shape (e.g. portions 638a, 63b are orthogonal to portion 638c), wherein the resulting opening space is square or rectangular. By incorporating the second segments 638 into the seal arrangement 630, instead of simply having a single, planar circumferential segment 636, the seal arrangement 630 can be constructed to avoid features on the housing (e.g. ribs 507 and groove/recess 541) that would otherwise prevent a seal from forming between the seal arrangement 630 and the housing body 504, as noted previously.

The number of second segments 638 is shown as being the same in number to the second members 608, wherein three of each is provided. However, the number of second segments 638 may be greater than the number of second members 608, if desired. In the example shown, the second members 608 are spaced about 120 degrees apart from each other and have an arc angle of between about 30 degrees and about 45 degrees, and most closely to about 36 degrees. The arc angle is defined as the angle through which a line passes from one end of the member 608a to the other end of the member 608b. Accordingly, the shell surface between the projections 608 is shown as being between about 75 degrees and about 90 degrees, and most closely to about 84 degrees. The segments 638 can have generally the same arc angles as described above for the members 608 while the seal arrangement segments 636 can have the same general arc angles as described above for the space between the members 608, although it should be appreciated that the angles may vary due to the point of measurement. The members 608 and seal arrangement 630 may be configured to have many other arc angles which may or may not be equal.

In the example shown, and as can be seen at FIGS. 26-29, the shape of the second segments 638 is generally complementary to the shape of the second members 608 of the projection-receiver arrangement 540 that extend from the shell 610. By use of the term "complementary" it is meant to indicate that the two parts have the same shape or outline and trace generally parallel to each other along their most proximate boundaries. By providing second segments 638 that deviate towards the shell second end 616 or filter outlet flow face 606, the first segments 636 can be axially located about the shell 610 or media 602 at a location that is coplanar and circumferentially aligned to the second members 608, meaning that at least portions of the second members 608 and the second segments lie along a common plane about the circumference of the media 602/shell 610. In this case, the common plane is parallel to the inlet and outlet flow faces 604, 606 (i.e. orthogonal to axis X). Such an arrangement also allows for the second members 608 to be located between the seal arrangement 630, and the shell first end 614, and also allows for as much of the seal arrangement as possible to be located proximate the shell first end 614. Where ribs 507, or other similar features, are provided on the housing, the deviating shape of the seal arrangement 630 allows for the seal arrangement 630 to weave between the ribs 507 on the housing body 504 and the projections 608 to ensure a proper seal is formed between the seal arrangement 630 and the housing body 504.

Referring back to FIGS. 36-40, the seal arrangement 630 is also shown as being rotationally symmetric, meaning that the seal arrangement can be rotated about the longitudinal axis X to align with itself. In the example presented, the seal arrangement 630 has three orders of rotational symmetry such that the seal arrangement appears the same through every 120 degrees of rotation. The same is true for the filter cartridge 600 as a whole. Where additional second members 608 and second segments 638 are provided, the rotational symmetry will increase provided equal spacing is provided between the second members 608 and 638. As noted above, the second members 608 and second segments 638 need not be provided with equal radial spacing in all implementations.

C. Projection-receiver Arrangement

Referring to FIGS. 16-19, it can be seen that the housing body 504 receives the filter cartridge 600 within cavity 505. The housing body 504 and filter cartridge 600 together form the previously referenced projection-receiver arrangement 540, wherein one or more first members 542 located on the housing body 504 interact with one or more second members 608 located on the filter cartridge 600. In the example shown, the housing body 504 is provided with a plurality first members 542 configured as receiving structures 542. The receiving structures 542 receive corresponding second members 608 configured as projections 608 of the filter cartridge 600. Although the receiving structures 542 are shown on the housing body 504 and the projections 608 are shown on the filter cartridge 600, they may be oppositely arranged such that the filter cartridge 600 is provided with receiving structures and the housing body 504 is provided with projections. The projection-receiver arrangement 540 operates to secure the filter cartridge 600 in a rotationally fixed position within the housing body 504 such that the filter cartridge is constrained from rotating about the longer cross-sectional axis (i.e. axis X) of the housing body 504 and filter cartridge 600. The projection-receiver arrangement 540 also operates to ensure that the filter cartridge 600 is properly oriented before being fully inserted into the housing body 504. Other functions of the projection-receiver arrangement 540 and the deviating shape of the seal arrangement 630 are to minimize seal contact with the housing body 504 during rotational alignment during insertion of the cartridge 600. Configured otherwise, the contact line between the seal and housing body 540 would be longer, thereby potentially making the cartridge 600 harder to rotate into the correct rotational position before final axial engagement.

As most easily seen at FIGS. 19-22, in the example shown, the receiving structures 542 are located proximate the open end 504a of the housing body 504 and are radially spaced between the lugs 526. At this end, the housing body 504 has a circumferential sidewall 504b extending to the open end 504a. Each of the receiving structures includes an end wall 544 radially spaced from the sidewall 504b. The end wall 544 can be formed with a curved or arc shape to match the curvature of the sidewall 504b, or can be formed as a planar, straight segment. A shown, the end wall 544 has a curved shape along an arc that is parallel to an arc defined by the sidewall 504b. The end wall 544 is also shown as being generally parallel to the sidewall 504a along the height of the end wall 544. However, the end wall 544 could be angled to provide a taper such that the end wall 544 is disposed at a greater distance from the sidewall 504b at the open end 504a than at the opposite end of the end wall 544 further into the interior of the housing body 504.

A radially extending sidewall 546 connects the sidewall 504b to the end wall 544 at a bottom portion of the end wall 544 such that the top of the receiving structure 542 is also open at the open end 504a. The sidewall 546 includes a first portion 546a which is disposed generally parallel to the housing open end 504a, and includes second and third portions 546b, 546c extending from the ends of the first portion 546a to the open end 504a. In the example shown, the second and third portions 546b, 546c extend from the first portion 546a at an oblique angle to the first portion 546a and the open end 504a. In the example shown, the oblique angle is about 45 degrees. This configuration enables the receiving structure 542 to have a wide acceptance opening area for initially receiving the projections 608 without requiring exact alignment of the cartridge 600. As the projections 608 are further received into the receiving structures 542, the second and third portions 546b, 546c narrow to ultimately retain the projections 608 in a fixed position such that the cartridge 600 is constrained from rotating relative to the housing body 504.

In other examples, the second and third portions 546b, 546c can also extend generally orthogonally from the first portion 546a to the open end 504a. In other arrangements, the sidewall 546 is formed as a curved wall having, for example, a semicircular shape, a semi-ovular shape, or a semi-elliptical shape. The sidewall 546 is shown as having a generally constant width in the radial direction, but may be provided with a varying width. For example, the sidewall 546 may be wider at the housing open end 504a than at the first portion 546a so that the end wall 544 is tapered inwardly relative to the housing sidewall 504b.

In some examples, the end wall 544 need not be provided such that the housing sidewall 504b is simply open at the location where the end wall 544 would otherwise be present. In such a configuration, the sidewall 546 can still be provided so as to provide a flat surface against which the projections 608 can rest. Alternatively, the receiving structure 542 can be formed without either the end wall 544 or the sidewall 546 such that the receiving structure 542 is simply defined as an opening in the housing sidewall 504. In such a configuration, the projection 608 would simply rest against the resulting edge formed by the opening in the sidewall 504.

Referring back to FIGS. 18 and 31-34, the projections 608 are complementarily shaped to the receiving structures 540 and include a base portion 608a with portions 608b, 608c extending obliquely from the base portion 608a towards the shell first end 614 to the rib 628. Each of the portions 608a, 608b, and 608c extends radially from the shell outer surface 612b to create generally flat surfaces with an orthographic projection when viewed from the axial ends of the shell 610. The base portion 608a is shown as being parallel to the inlet and outlet flow faces 604, 606 and to the openings defined at the first and second ends 614, 616 of the shell 610. As configured, the projection portions 608b, 608c are disposed at the same angle as the receiving structure portions 546b, 546c such that portion 608c is parallel to portion 546c and such that portion 608b is parallel to portion 546b. Accordingly, in the example shown, portions 608a and 608b each extends from the portion 608c at about a 45 degree angle, wherein each portion 608c is generally parallel to the first segments 636 and to the inlet flow face of the cartridge 600.

Figure 18:
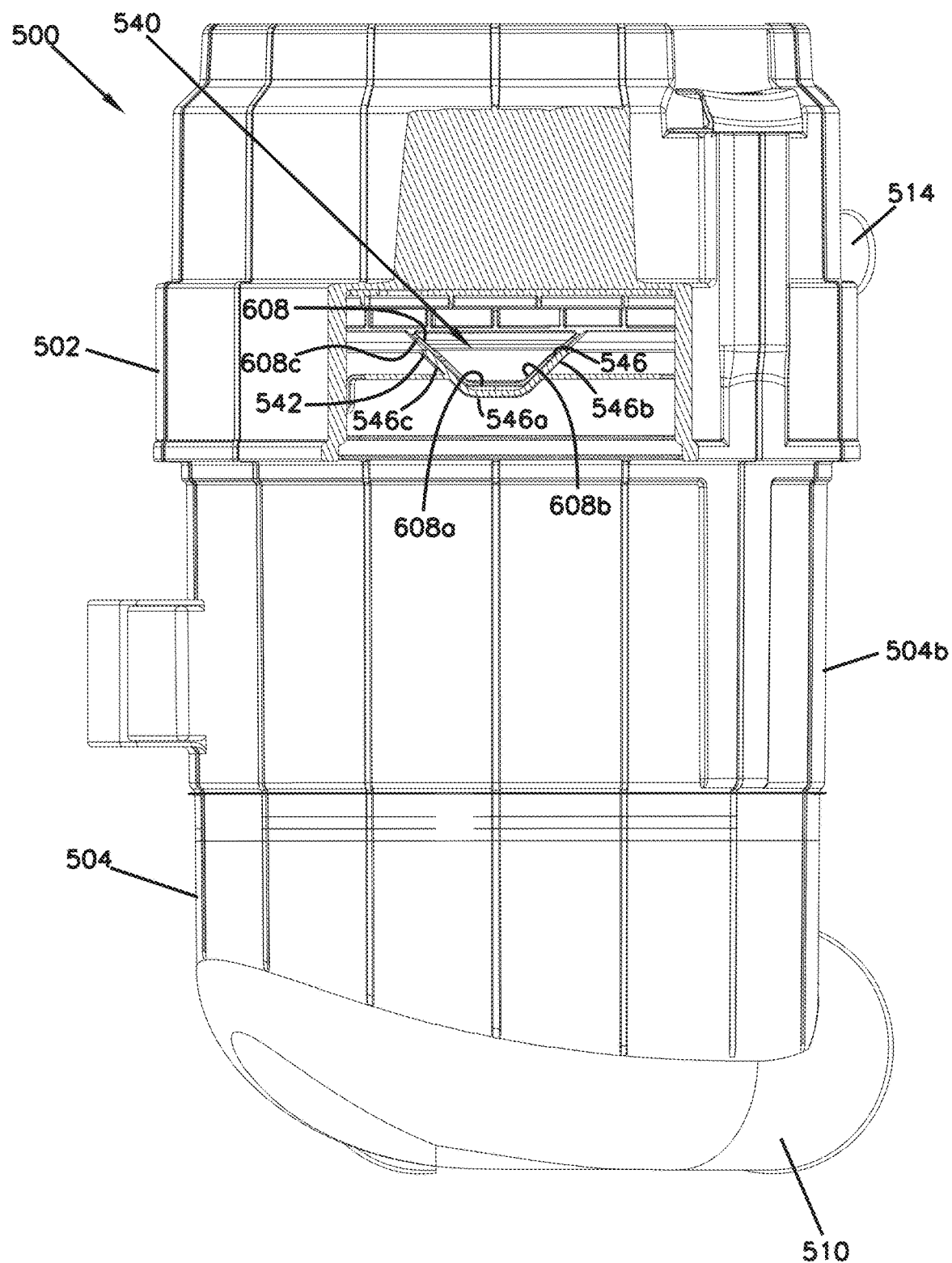
FIG. 18 is a schematic, cross-sectional view of the air cleaner assembly of FIG. 13, taken along the line 18-18 shown in FIG. 15.

As can be most easily seen at FIG. 18, the projection 608 is received into the receiving structure 546. Once fully received, the flat sides of the portions 608b and 546b are in contact with each other as are the flat sides of the portions 608c and 546c. This engagement rotationally constrains the filter cartridge 600 with respect to the housing body 504. As shown at FIG. 18, the portions 608a and 546a are spaced apart and not in contact with each other. With such a configuration, it can be ensured that potential contact between the portions 608a and 546a is avoided that might otherwise prevent the portions 546b/608b and 546c/608c from being brought into contact with each other to result in a tighter fit between the projections 608 and receiving structures 546. However, the projections 608 and receiving structures 608 could be shaped such that all three portions are brought into contact with each other.

As discussed previously, many other complementary and non-complementary shapes are possible for the first members/receiving structures 546 and the second members/projections 608. Additionally, the first members 546 and/or the second members 608 may be provided or coated with a soft material to prevent hard plastic-to-plastic contact between the members. For example, TPE material could be overmolded onto the portions 608*b*, 608*c* at the same time the seal arrangement 630 is overmolded onto the shell 610.

Figure 26:
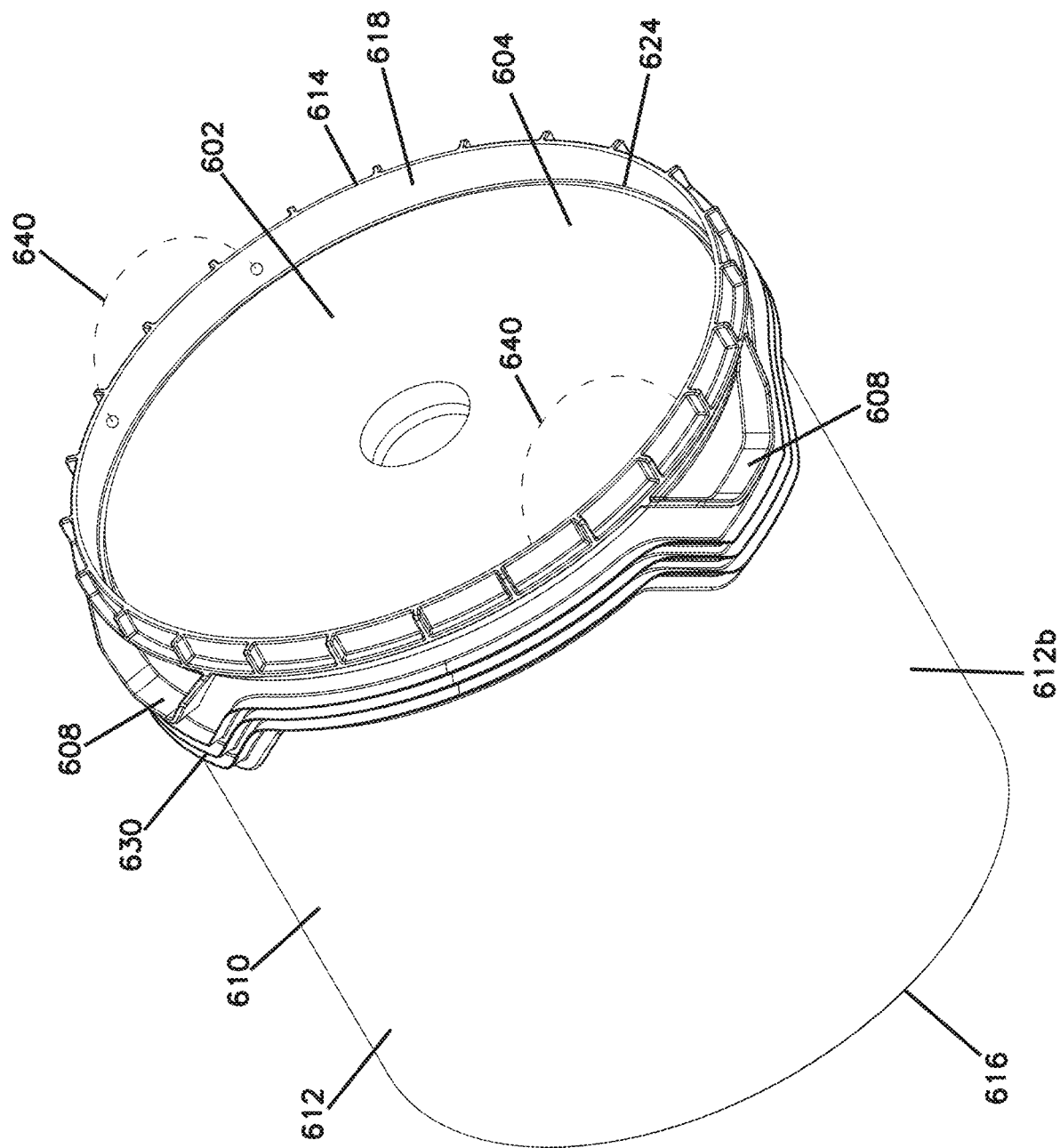
FIG. 26 is a schematic perspective view of a filter cartridge component installable in the air cleaner assembly of FIG. 13.
Figure 27:
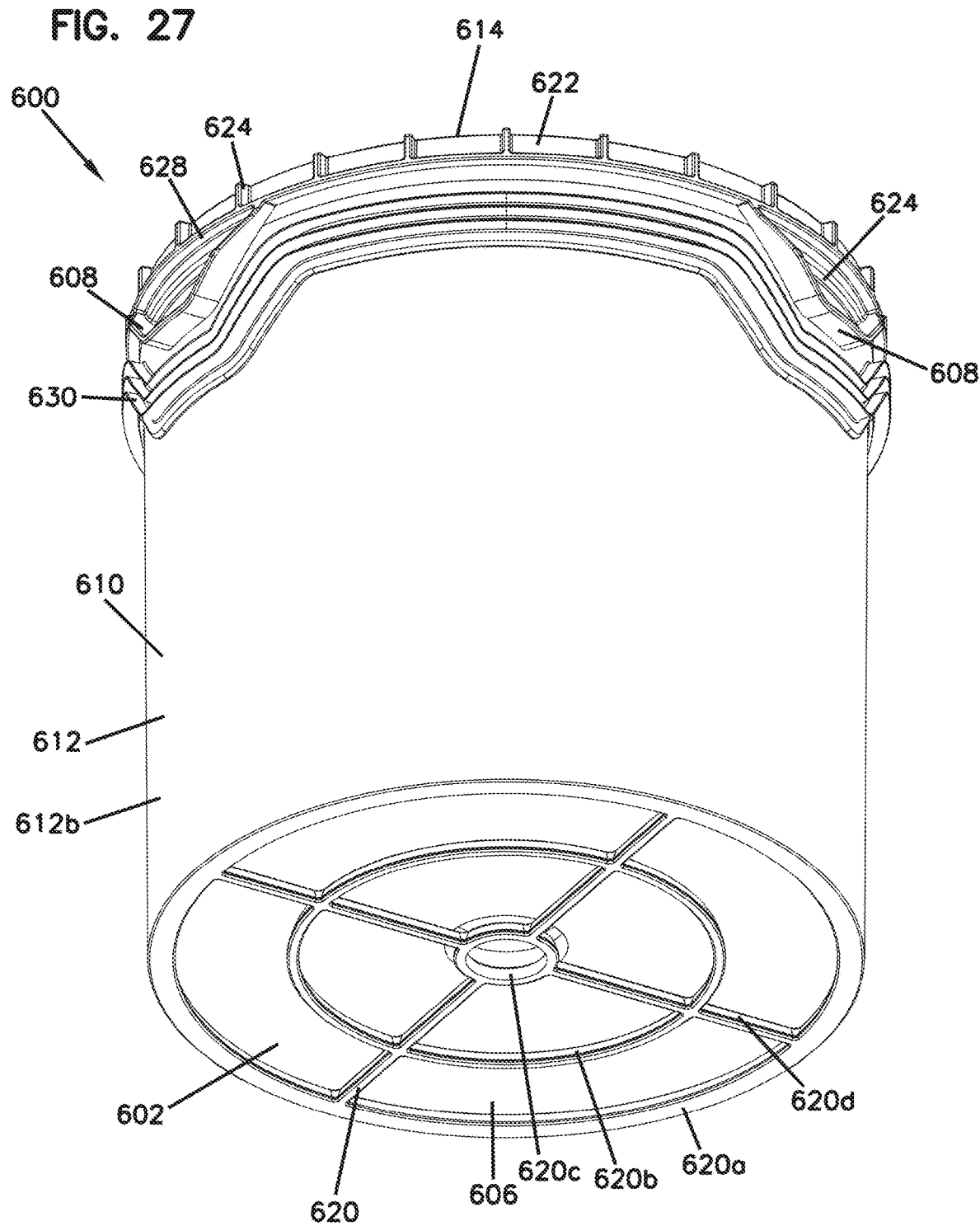
FIG. 27 is a second schematic perspective view of the filter cartridge shown in FIG. 26.

Still referring to FIG. 18, it is noted that the entirety of each projection 608 is not entirely received within the receiving structure 546. Rather, the projection portions 608*b* and 608*c* extend beyond the receiving structure 546. This configuration results in a portion of the filter cartridge 600 resting beyond the open end 504*a* of the housing body 504. As more easily seen at FIG. 17, the first end 614 of the shell 610 extends a height H1 above the open end 504*a* of the housing body 504. This resulting height allows for a user to more easily grasp the features (projections 608, end portion 622, rib 628, transition structure 624 at projection 608, etc.) at the first end 614 of the shell 610 when removing and installing the cartridge 600. To further aid in installation and removal of the filter cartridge 600, a separate handle feature 640 may also be provided, as schematically shown at FIG. 26.

In the example shown, three projection-receiver arrangements 540 are shown, including three receiving structures 542 and three corresponding projections 608. However, more or fewer receiving structures 540 may be provided without departing from the concepts herein. It is noted that the number of receiving structures 542 provided directly corresponds to the number of filter cartridge orientations that will be accepted by the housing body 504, provided the receiving structures are rotationally symmetric (i.e. the receiving structures have an equal radial spacing; e.g. three receiving structures 540 spaced 120 degrees apart). This is true regardless of the number of projections 608, provided the projections 608 are not greater in number than the receiving structure 540 which would result in a non-insertable filter cartridge. Accordingly, the filter cartridge 600 can be rotated into three different positions that can be accepted into the housing body 504 shown in the drawings. In other examples: where only one receiving structure 542 is provided, only one filter cartridge insertion orientation exists; where two receiving structures 542 are provided with two orders of rotational symmetry, two filter cartridge insertion orientations exist; and so on. Where an oblong or racetrack shaped filter cartridge and housing body are provided, the provision of one projection-receiver arrangement 540 will ensure that only one orientation of the filter cartridge into the housing body exists while the provision of two projection-receiver arrangements will enable for both of the inherent rotational orientations of the filter cartridge to be available, provided the projection-receiver arrangements are rotationally symmetric.

D. Air Filter Cartridge 600, FIGS. 58-64C

Figure 64A:
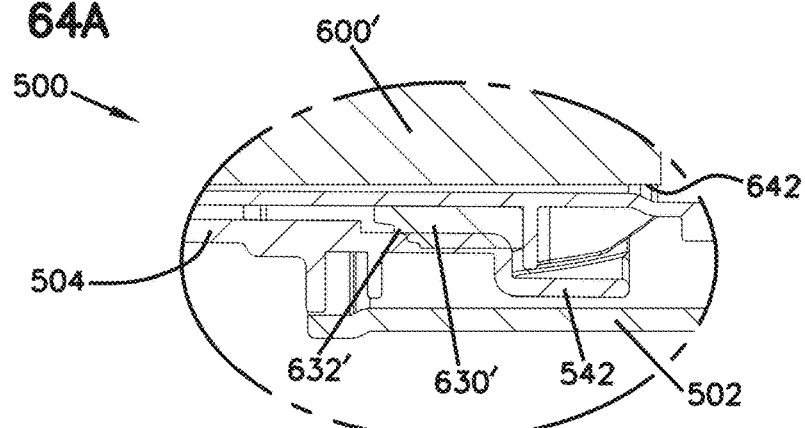
FIG. 64A is an enlarged schematic cross-sectional view of a portion of the air cleaner assembly shown at FIG. 64, as indicated by the encircled portion labeled FIG. 64A at FIG. 64.
Figure 64B:
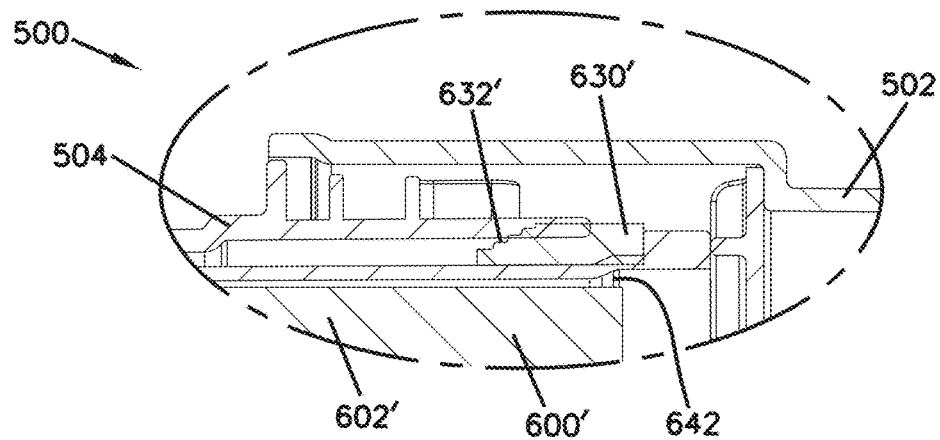
FIG. 64B is an enlarged schematic cross-sectional view of a portion of the air cleaner assembly shown at FIG. 64, as indicated by the encircled portion labeled FIG. 64B at FIG. 64.
Figure 64C:
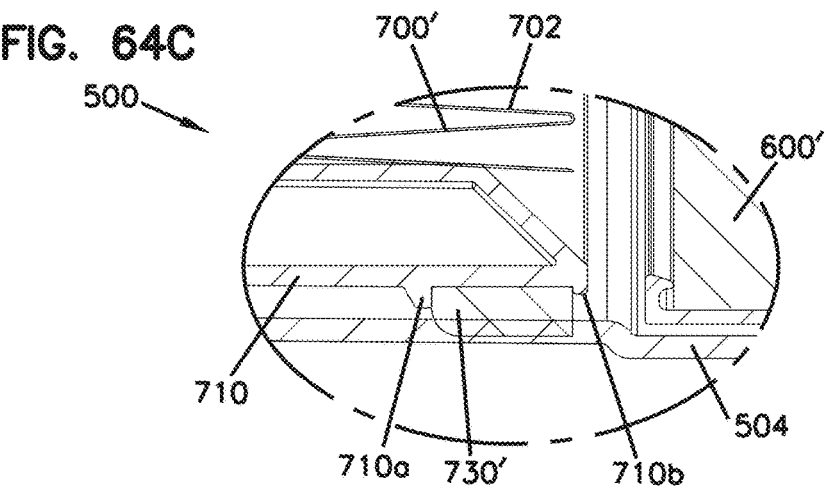
FIG. 64C is an enlarged schematic cross-sectional view of a portion of the air cleaner assembly shown at FIG. 64, as indicated by the encircled portion labeled FIG. 64B at FIG. 64.
Figure 65:
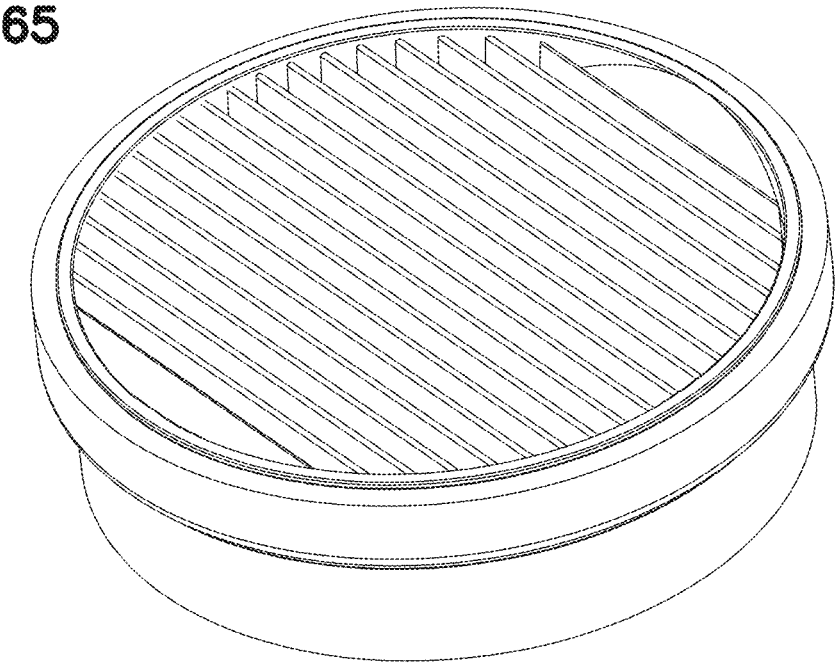
FIG. 65 is a schematic top perspective view of a secondary or safety filter cartridge component installable in the air cleaner assembly of FIG. 13, as shown at FIG. 64.
Figure 66:
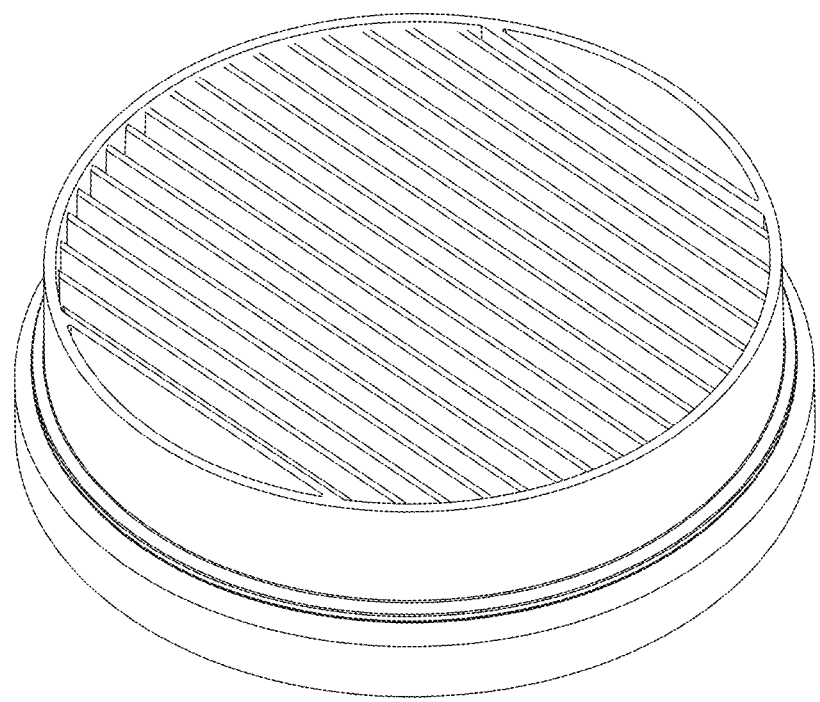
FIG. 66 is a schematic bottom perspective view of the filter cartridge shown in FIG. 65.
Figure 67:
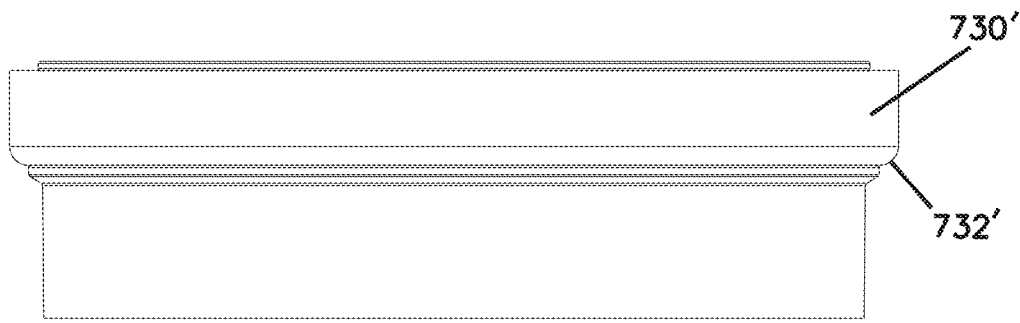
FIG. 67 is a schematic side view of the filter cartridge shown in FIG. 65.
Figure 68:
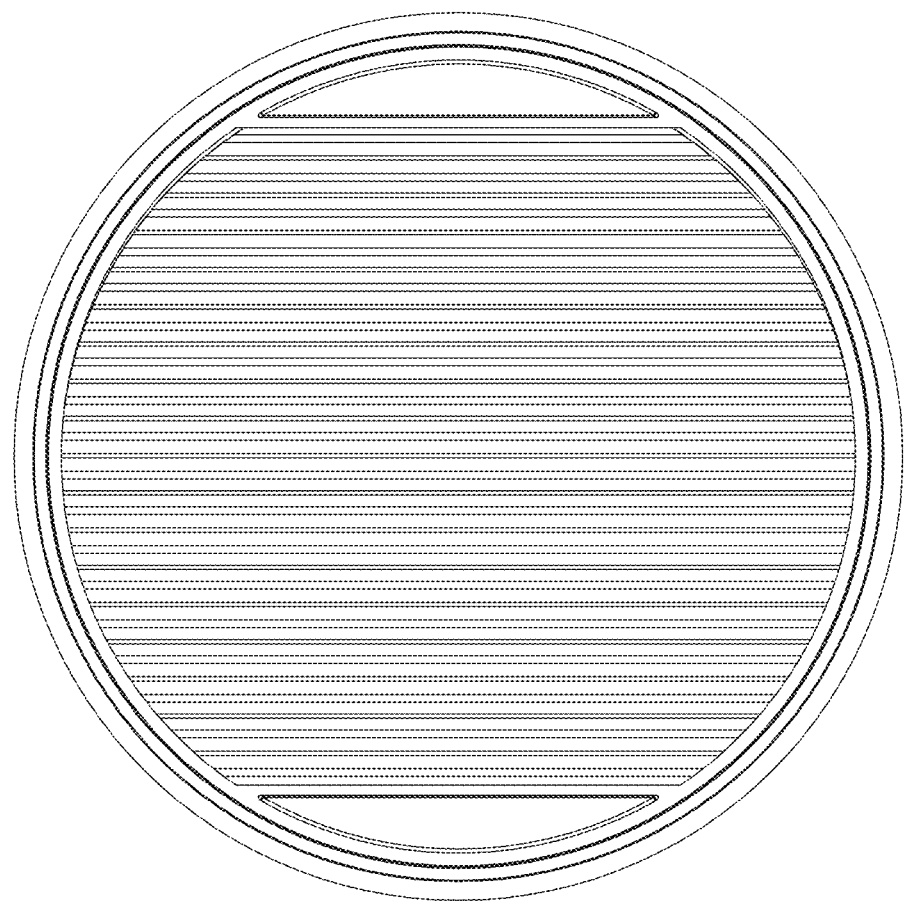
FIG. 68 is a schematic top view of the filter cartridge shown in FIG. 65.

Referring to FIGS. 58-64C, an alternative filter cartridge 600' is presented. In this example, the media 602 and shell 610 (and previously discussed alternatives) are the same as with filter cartridge 600 and can be installed into housing body 504, as shown at FIGS. 64-64C. Accordingly, the same reference numbers will be used for these features, which need not be discussed further here. It is to be noted that the filter cartridge 600' need not be provided with the same media and shell as shown for filter cartridge 600' and that alternative arrangements exist.

In this example, the filter cartridge 600' is provided with a seal arrangement 630' that differs from seal arrangement 630. However, the seal arrangement 630' does have many shared features with seal arrangement 630. For example, the seal arrangement 630' has alternating first and second adjoining segments 636', 638', wherein the second segment(s) 638' deviates away from the first segment(s) 636' with interconnected portions 638*a'*, 638*b'*, and 638*c'*. Accordingly, the description for the geometry of the seal arrangement 630 and alternate arrangements are applicable to seal arrangement 630', particularly as the description relates to the shell 610 and the projection-receiver arrangement 540.

The seal arrangement 630' differs from seal arrangement 630 in that the seal arrangement 630' has a relatively more monolithic profile without radially extending seal lips. The seal arrangement 630' is also provided with a plurality of steps 632' that transition the seal arrangement 630' from a first thickness t1 proximate the cartridge inlet end 614 to a second thickness t2 proximate the second end 616, wherein the second thickness t2 is less than the thickness t1. This configuration enables for a pinch-type radial seal to be formed between the seal arrangement 630' and the housing body 504, as can be seen at FIGS. 64-64B. In the example shown, the outer portion of the seal arrangement 630' forms a seal against the interior side of the housing body sidewall 504*b*. The seal arrangement 630' is also shown in this example as extending beyond the sidewall 504*b*. Other arrangements are possible. In alternative examples, the seal arrangement 630' could also be provided with a slanted or sloped surface to transition between thicknesses t1 and t2, or could be provided with a uniform thickness rather than steps 632'.

The relatively more simplistic profile of the seal arrangement 630' easily lends itself to being formed with a polyurethane material. Other materials are also possible. The material used for seal arrangement 630' can be molded onto the shell 610 in generally the same manner as described for seal arrangement 630. The seal arrangement 630' could also be independently molded from polyurethane or another material and secured to the shell 610 and/or media 602 with adhesive and/or sealant. As the seal arrangement 630' is disposed about the shell 610, the seal arrangement 630' will naturally have the same perimeter shape as the shell 610.

Figure 58:
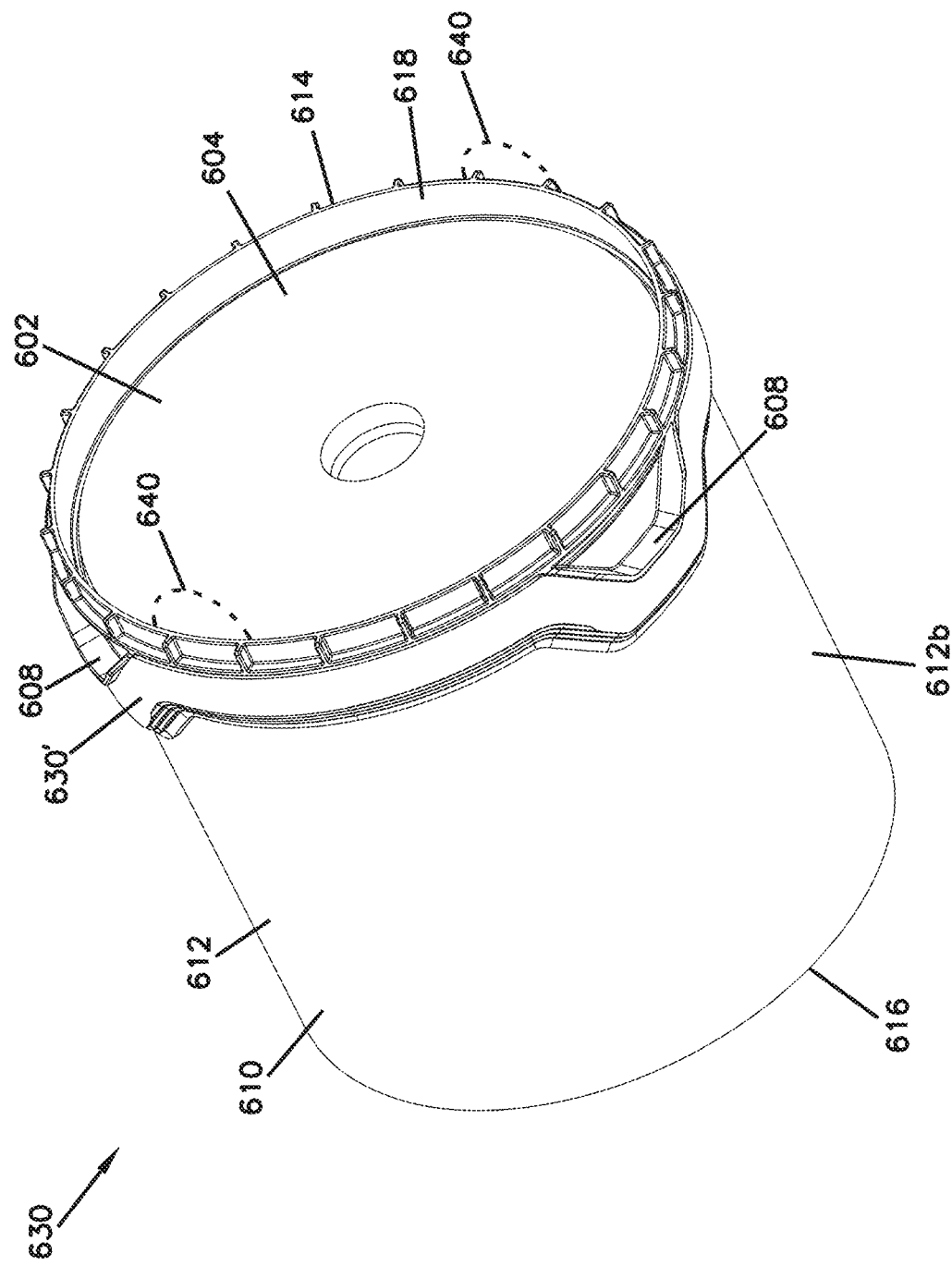
FIG. 58 is a schematic perspective view of a filter cartridge component installable in the air cleaner assembly of FIG. 13.
Figure 59:
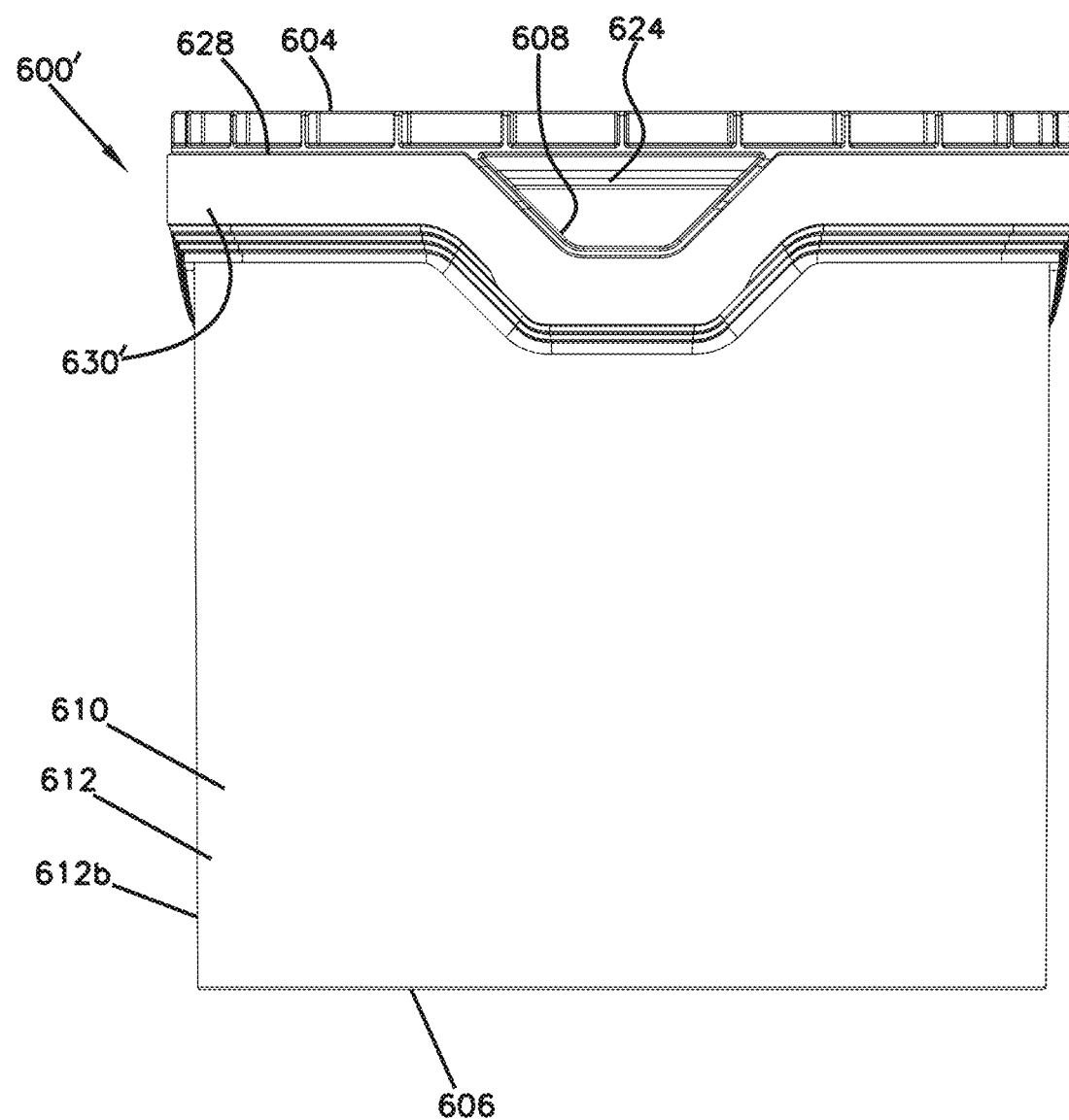
FIG. 59 is a schematic side view of the filter cartridge shown in FIG. 58.
Figure 60:
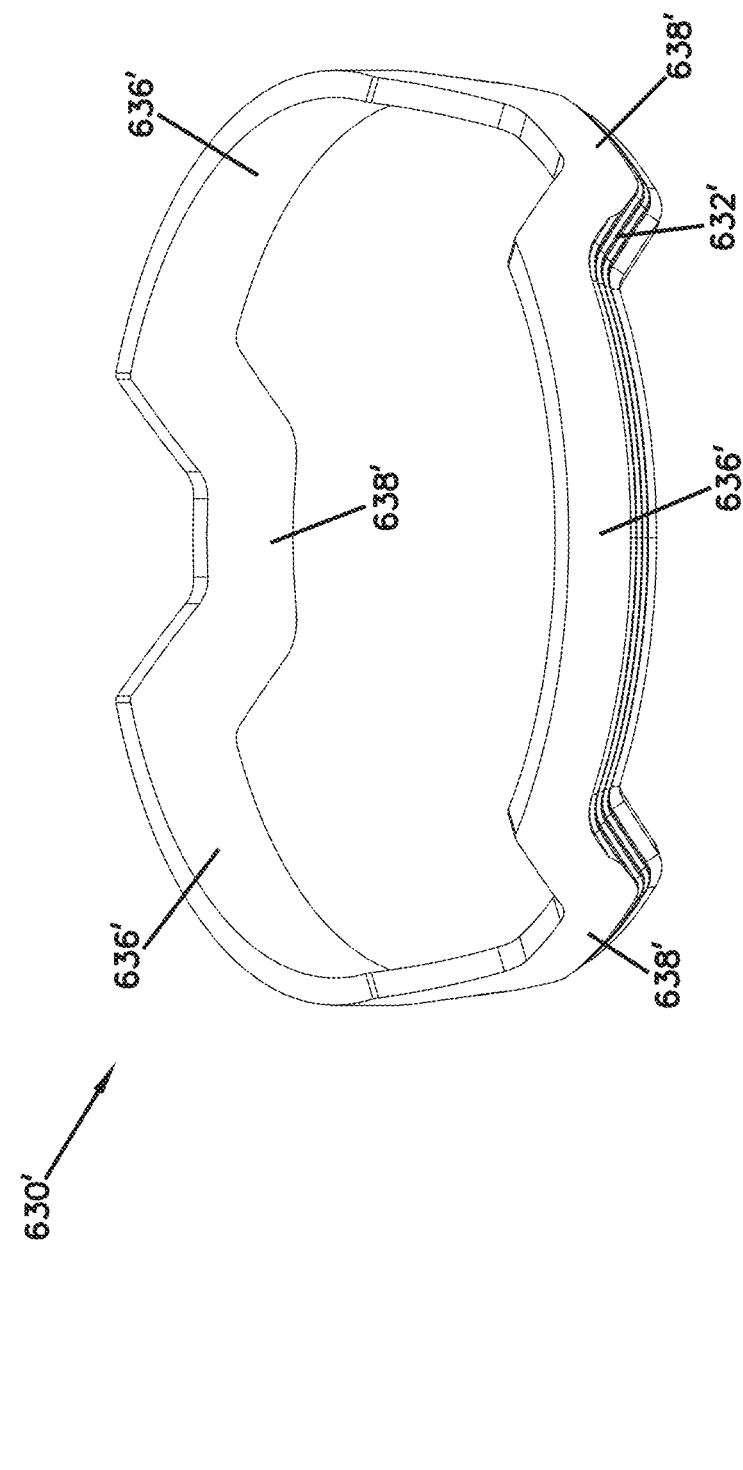
FIG. 60 is a schematic perspective view of a seal arrangement of the filter cartridge shown in FIG. 26.
Figure 61:
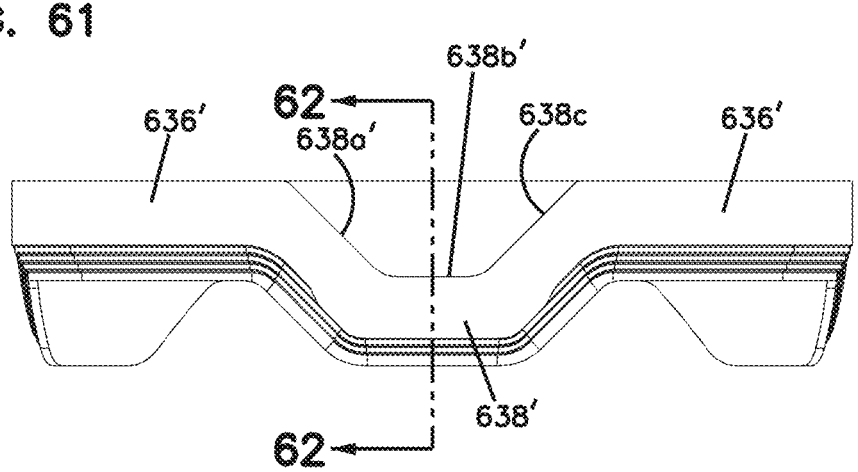
FIG. 61 is a schematic side view of the seal arrangement shown in FIG. 60.
Figure 62:
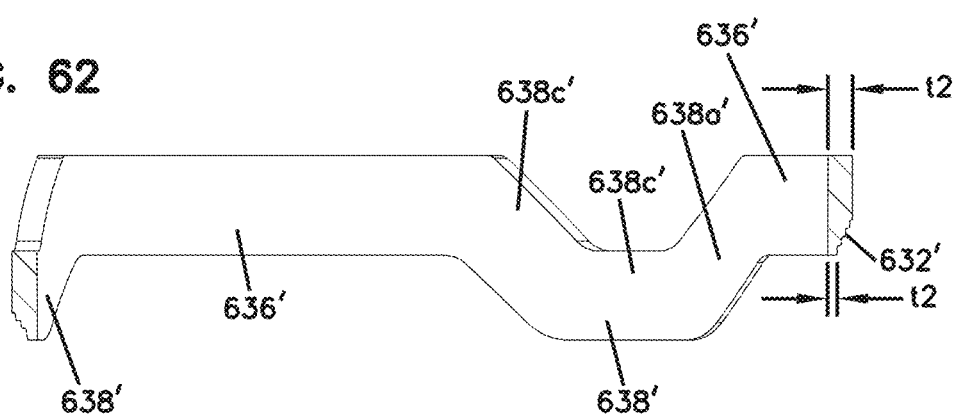
FIG. 62 is a schematic cross-sectional view of the seal arrangement shown in FIG. 60, taken along the line 62-62 in FIG. 61.
Figure 63:
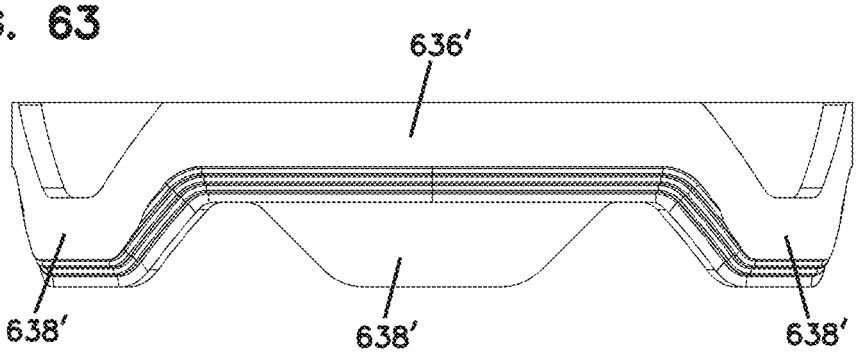
FIG. 63 is a schematic second side view of the seal arrangement shown in FIG. 60.

In FIG. 58 an embodiment is depicted wherein the shell 610 extends along the whole length of the filter media pack 602.

Alternatively, the shell, in that case rather a support structure 610', can extend only over an end portion of the filter media pack 602, for instance the end portion near cartridge inlet end 614. It can for instance comprise a ring or similar structure 6100' surrounding an end portion of the media pack 602, near the cartridge inlet 614. This is depicted for instance in FIG. 69(*b*), and the corresponding cross-sectional image along surface A thereof, in FIG. 69(*a*). In such cases, the sidewall of the filter cartridge is determined not only by the shell 610 (or support structure 610'), but also by the outer surface of the media pack 602. The shell or support structure can further be formed and/or comprise features as disclosed for the embodiment described in relation with FIG. 58.

Figure 69A:
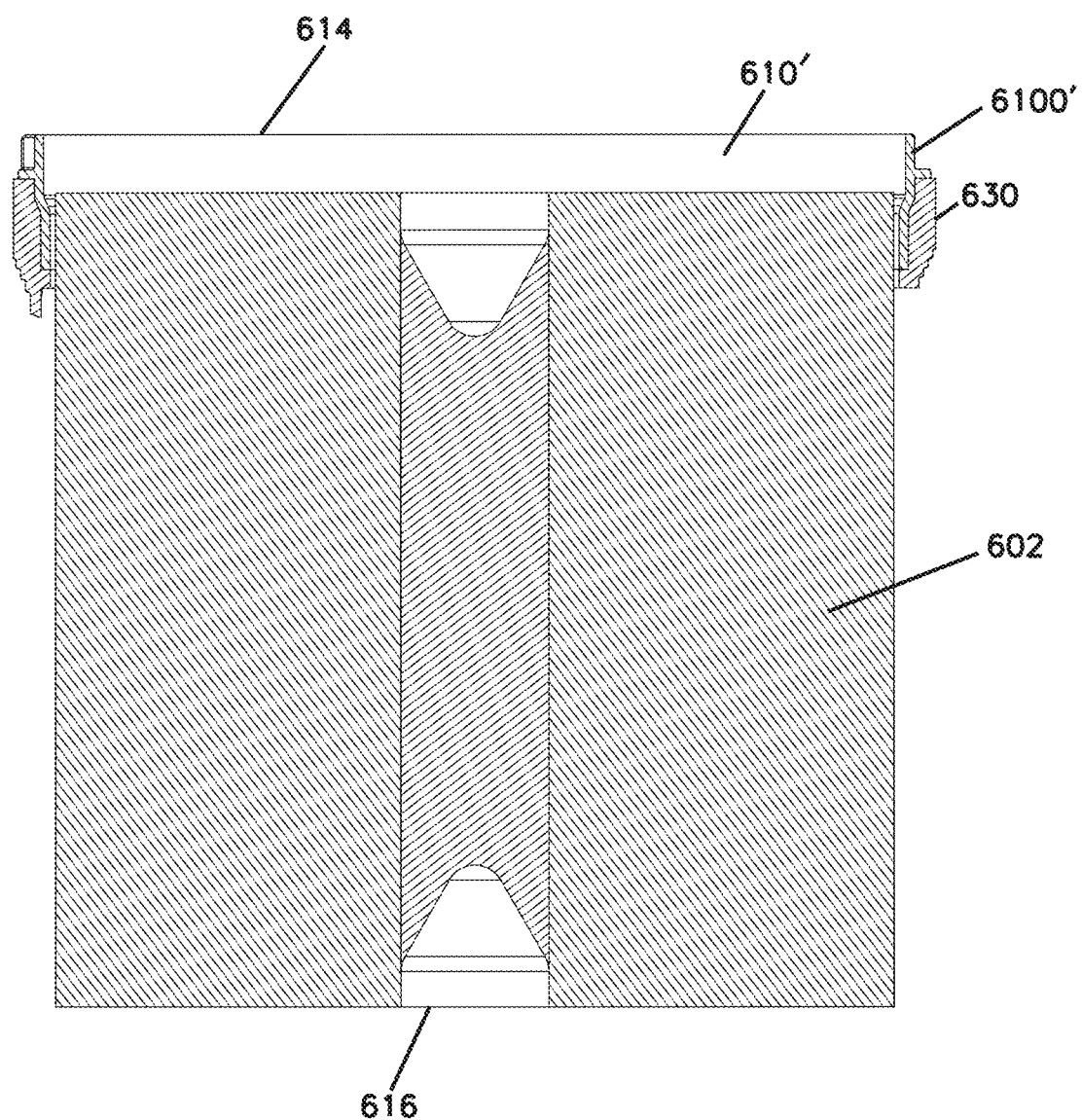
FIGS. 69(a) and (b) are schematic cross-sectional and perspective views of an alternative filter cartridge component installable in the air cleaner assembly, similar to the component described in relation with FIG. 58.
Figure 69B:
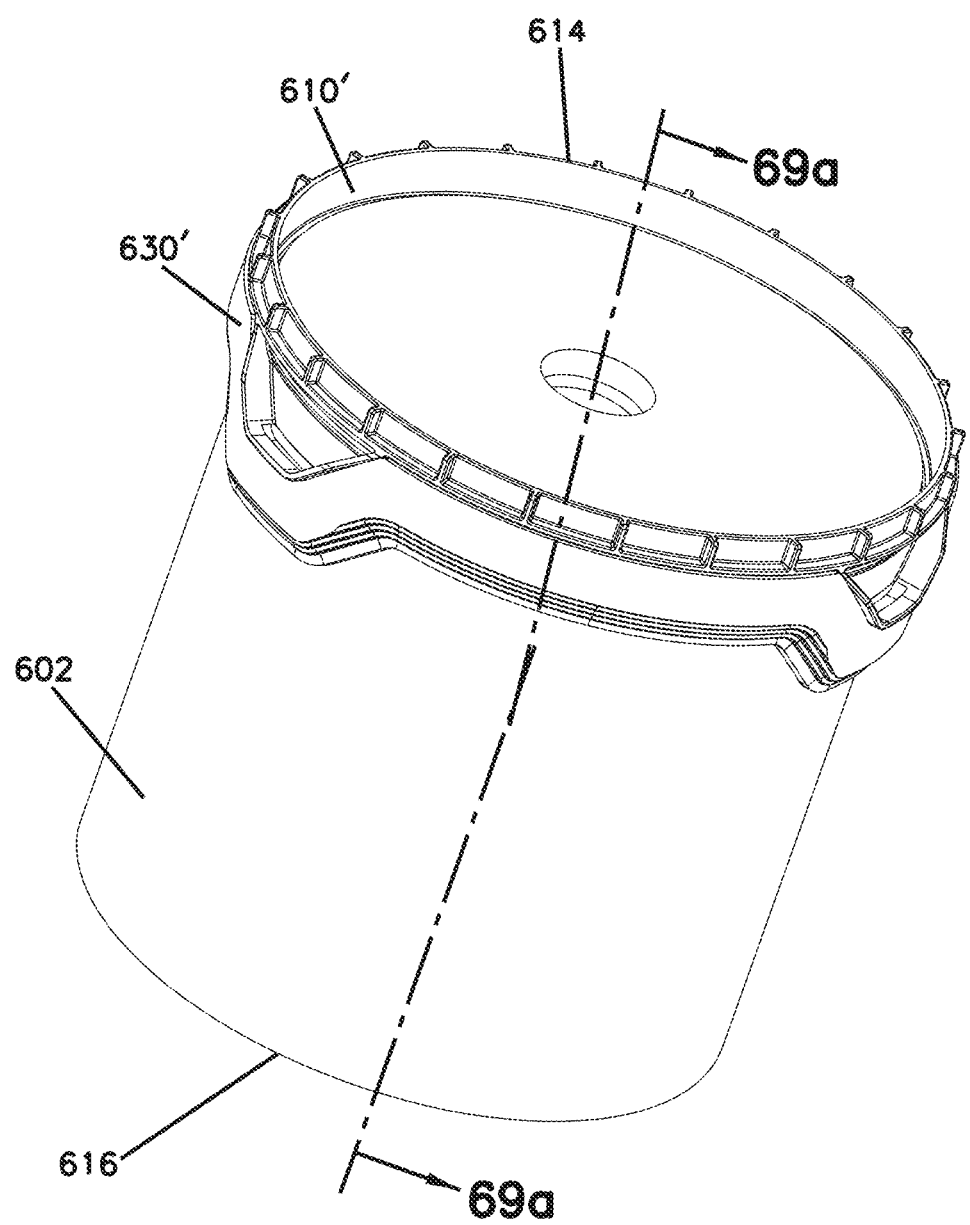
Figure 70:
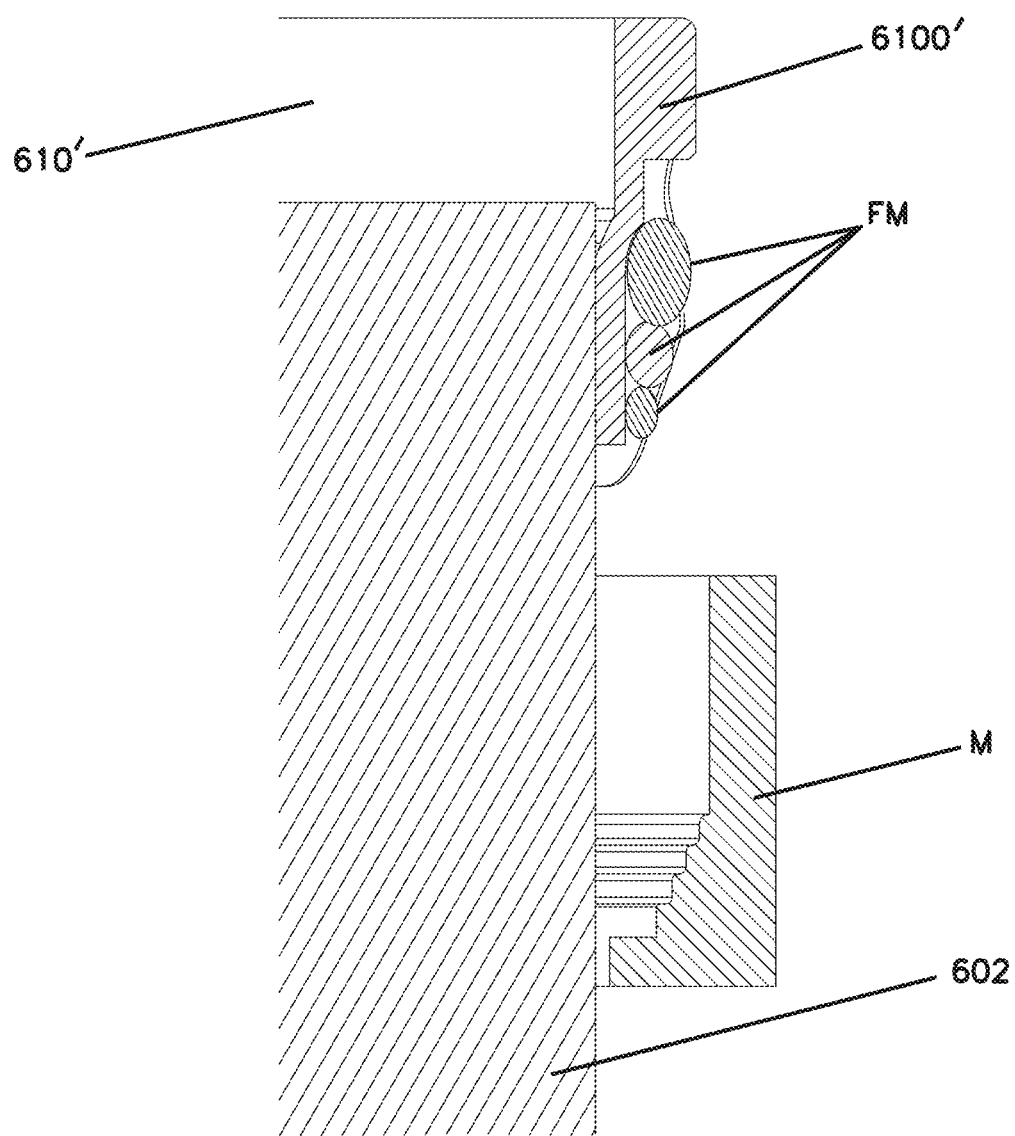
FIG. 70 to FIG. 72 illustrate a manufacturing process and manufacturing tools for manufacturing 3D gasket structures in general, by means of an illustration of the process for embodiments disclosed in relation with FIG. 58 and FIG. 69.
Figure 71:
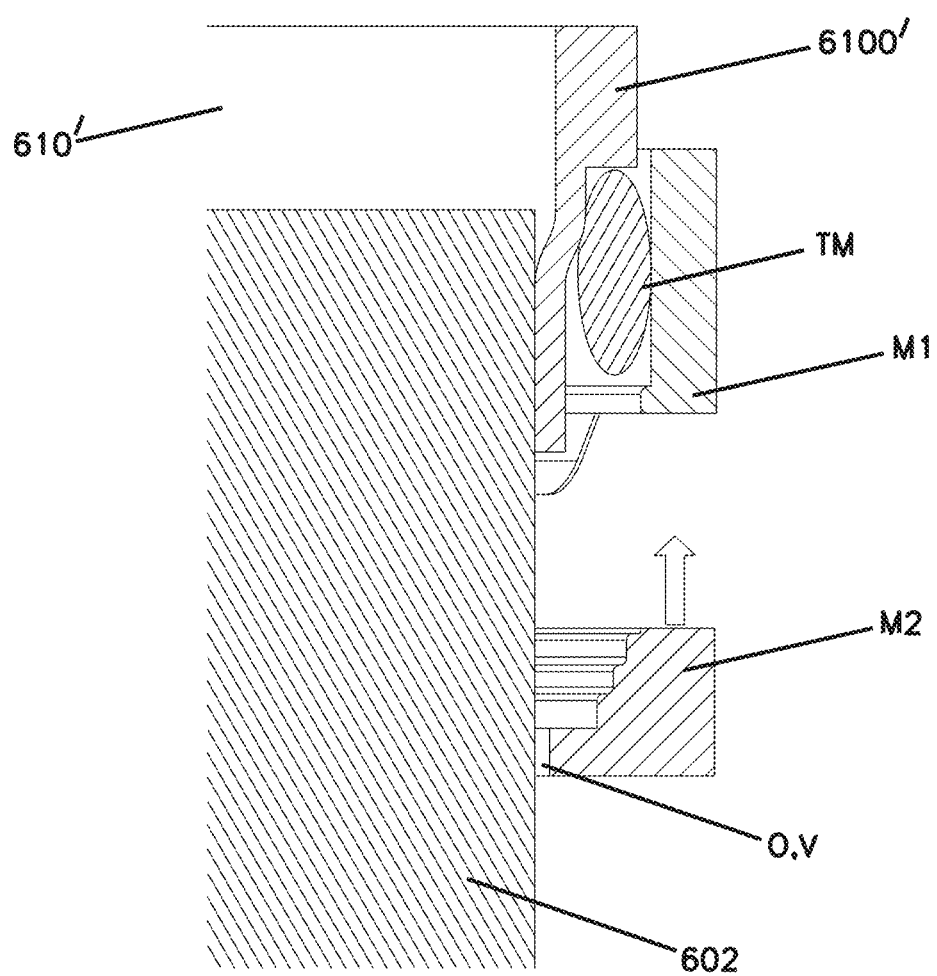
Figure 72:
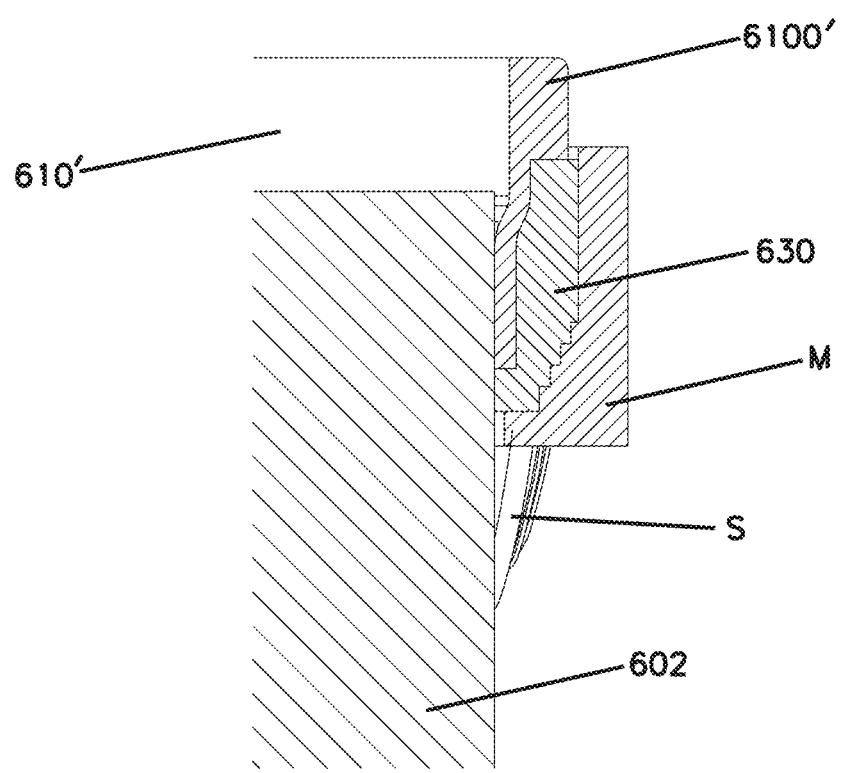

FIGS. 70 to 72 disclose an example of a possible manufacturing process for the seal arrangement 630' (e.g. a gasket) as described in relation with FIG. 58 or FIG. 69. The seal arrangement can be manufactured directly on the shell 610, or, on the support structure 610' (the side portion, surrounding ring portion, thereof 6100') and/or media 602, by making use of the physical process known as thixotropy.

Hereto, a thixotropic material (or other foaming material) is applied in a region in which the gasket is to be formed, hereby typically filling only part or all of that region. One or more shaping structures (M1, M2) as for instance one, two or a plurality of molds (M1, M2) are then applied over the thixotropic material TM, within a short time after having applied the thixotropic material TM. Hereby the available volume for the foaming system is limited. The thixotropic material is then present in an internal volume defined by an upper portion of the sidewall of the filter cartridge and the shaping structure(s). The thixotropic material is then expanding or foaming such that it will eventually fill the defined volume or cavity. The volume or cavity preferably defines the final shape of the gasket 630' to be manufactured. The cavity or volume can for instance internally, at least partially, be defined by the ring structure 6100' surrounding the support structure 610'/media pack 602 or shell structure 610. Preferably, the amount of thixotropic material is predetermined in view of the predetermined volume, shape and positioning of the gasket 630' to be manufactured. Preferably, sidewalls of the so defined cavity are not completely enclosing the cavity, such that a small amount S of thixotropic material TM is allowed to leave the cavity when expanding, at predetermined locations. This may facilitate a better filling of the defined cavity during the expansion process. This also can allow for density control of the gasket 630'. One or more molds M1, M2 may comprise openings O to achieve this. Alternatively or in combination therewith, one or more openings or an open ring-shaped volume V may be provided in between the mold M (M1, M2, . . . ) and the rest of the filter cartridge.

The thixotropic material can be applied in a single step, or in a plurality of steps. For instance, a single, relatively thick, band of thixotropic material can be applied (See FIG. 71). Alternatively, two or more bands of thixotropic material can be applied next to each other (e.g. three in an embodiment depicted in relation with FIG. 72). The thixotropic material can be applied in the form of a plurality of beads of equal or different sizes and shapes. The thixotropic material can for instance be provided contemporarily at all of the required locations.

During expansion, the plurality of bands can join or merge and define a homogeneous gasket structure 630'.

According to some embodiments, the respective materials of the shell 610 or support structure (610', 6100') and media pack 602 sidewall, foaming or thixotropic material FM and one or more molds M can be predetermined such that the foaming or thixotropic material adheres well to the shell or support structure and media pack sidewall, while badly or not adhering to the one or more molds.

According to some embodiments, the portion of the sidewall of the (unfinished, intermediate) filter cartridge where the thixotropic material is to be applied, for instance the shell 610 or support structure 610'-6100'/media pack 602 sidewall is pretreated by means of an adhesion promotor for the thixotropic material. According to some embodiments, the inner sidewalls of the one or more shaping means/molds M are provided with an adhesion inhibitor (e.g. demolding-agents) for the thixotropic material.

After expansion, and a predetermined curing period, the one or more molds M can be removed and the final filter cartridge is achieved.

According to some embodiments, the thixotropic material is applied along the respective portion of the shell 610, when embodiments according to FIG. 58 are envisaged.

According to some embodiments, the thixotropic material is applied along the support structure 610' (its outer portion, e.g. ring shaped portion 6100') and an adjacent portion of the media pack 602, when embodiments according to FIG. 69 are envisaged.

Preferably, a two-component polyurethane system can be used for the manufacture of the flexible foam seal (gasket). Alternatively, a three or more component polyurethane system can be used. As indicated before, alternatively, also other foaming materials may be used.

The two-component system can for instance consist of a resin and a hardener which are mixed together at a predetermined ratio. This produces a flexible sealing foam within a few minutes.

It will be appreciated that the proposed method can be used for manufacturing any 3D gasket structure, by applying the thixotropic material on a predetermined 3D surface and using 3D shaping or mold structures.

Accordingly, the seal arrangement 630' can also be provided in many shapes, such as round or circular, rectangular, obround, ovular, and other essentially geometric shapes with rounded or non-rounded corners.

E. Air Filter Cartridge 700, FIGS. 41-52

Referring to FIGS. 16, 17, 19, and 41-52, the particular air cleaner assembly 500 depicted includes an optional secondary or safety filter 700. The (optional) safety or secondary filter 700 is generally positioned between the main filter cartridge 600 and the outlet 510x. In a typical arrangement, the (optional) secondary filter cartridge 700 is removably positioned within the air cleaner assembly 500, and can be a service component. However, it is typically not subject to very significant dust load in use, and may be rarely, if ever, changed. It is an advantageous feature that the cartridge 700 is structurally separate from the main cartridge 600, since the cartridge 700 can remain in place protecting internal components from dust, even when the main filter cartridge 600 is removed. In the example shown, the filter cartridge 700 includes pleated media 702, but may include other types of media.

The filter cartridge 700 includes a shell 710 and a seal arrangement 730 that share features with the previously described shell 610 and seal arrangement 630. For example, the shell 710 can be molded from a relatively hard plastic, for example ABS plastic, and the seal arrangement 730 can be overmolded onto the shell 710 via injection molding a TPE material to form radially extending lip seals 732 extending from a base portion 734. In some examples, the seal arrangement 730 can be independently molded from TPE or another material and secured to the shell 710 and/or media 702 with or without an adhesive and/or sealant. The shell is 710 shown in isolation at FIGS. 45-48 while the seal arrangement 730 is shown in isolation at FIGS. 49-52. The shell is shown as having a sidewall 712 extending between first and second ends 714, 716 and defining an interior 718 within which the media 702 is installed. The media 702 can be secured to the shell 710 via an adhesive.

The shell 710 differs in one aspect from shell 610 in that the shell 710 is provided with circumferentially extending rib structures 710a, 710b. The seal arrangement 730 is molded against the rib structure 710a and over the rib structure 710b. The rib structures 710a, 710b aid in locking/retaining the seal arrangement 730 to the shell 710. The seal arrangement is additionally molded to have a flange structure 733 which extends radially further than the lip seals 732 and acts as the furthest upstream, primary seal. As can be seen at FIG. 16C, each of the lip seals 732 and flange seal 733 form a radial seal against the interior of the housing body 504. Once the filter cartridge 700 is installed, the shell second end 716 rests against interior walls/ribs 505 of the housing body 504 such that the filter cartridge 700 is supported and cannot be further inserted into the housing body 504.

As with filter cartridge 600, the filter cartridge 700, including the media 702, surrounding shell 710, and seal arrangement 730, may be provided in many different shapes, for example, circular, rectangular, obround, and other essentially geometric shapes with rounded or non-rounded corners. Some examples of obround include an oval shape with opposite curved ends attached by a pair of opposite sides. In some oval shapes, the opposite sides are also curved. In other oval shapes, sometimes called racetrack shapes, the opposite sides are generally straight.

F. Air Filter Cartridge 700', FIGS. 65-68

Referring to FIGS. 65-68, an alternative arrangement of an optional secondary or safety filter 700' is presented. In this example, the media and shell (and previously discussed alternatives) are the same as with filter cartridge 700 and can be installed into housing body 504, as shown at FIGS. 64 and 64C. Accordingly, the same reference numbers will be used for these features, which need not be discussed further here. It is to be noted that the filter cartridge 700' need not be provided with the same media and shell as shown for filter cartridge 700 and that alternative arrangements exist.

In this example, the filter cartridge 700' is provided with a seal arrangement 730' that differs from seal arrangement 730. The seal arrangement 730' has many shared features with seal arrangement 730. For example, the seal arrangement 730' abuts and is retained onto the shell 710 via engagement with the circumferentially extending rib structures 710a, 710b of the shell 710.

The seal arrangement 730' differs from seal arrangement 730 in that the seal arrangement 730' has a relatively more monolithic profile with a generally uniform thickness without radially extending seal lips. In the example shown, the outer portion of the seal arrangement 730' forms a seal against the interior side of the housing body sidewall 504b to ensure air flows through media 702 and not around cartridge 700'. To aid in installation, the seal arrangement 730' can be provided with a slanted or sloped portion 732'. In alternative examples, the seal arrangement 730' could also be provided with a stepped arrangement similar to that shown for seal arrangement 630'.

The relatively more simplistic profile of the seal arrangement 730' easily lends itself to being formed with a polyurethane material. Other materials are also possible. The material used for seal arrangement 730' can be molded onto the shell 710 in generally the same manner as described for seal arrangement 630 and 730.

As with filter cartridges 600, 600', and 700, the filter cartridge 700', including the media 702, surrounding shell 710, and seal arrangement 730', may be provided in many different shapes, for example, circular, rectangular, obround, and other essentially geometric shapes with rounded or non-rounded corners. Some examples of obround include an oval shape with opposite curved ends attached by a pair of opposite sides. In some oval shapes, the opposite sides are also curved. In other oval shapes, sometimes called racetrack shapes, the opposite sides are generally straight.

G. Air Filter Cartridge 800, FIGS. 53-57

Referring to FIGS. 53-57, an alternative filter cartridge 800 is presented. In this example, the media 802 has an inlet flow face 804 and an outlet flow face 806, and is the same as media 602. As such media 802 will not be further discussed here. In contrast to the cartridges 600, 700, the filter cartridge 800 includes a seal arrangement 830 that can be formed from a polyurethane material instead of TPE, similar to seal arrangement 630'. Additionally, and independently, rather than being provided with a shell that extends the full length of the media, the filter cartridge 800 is provided with a shell 810 that extends only partially along the media 802. A partially extending shell can also be provided for cartridges 600, 600', 700, and 700', if desired.

As shown, the shell 810 defines a sidewall 812 that circumscribes the media 802. At the interior portion of the sidewall 812, a plurality of circumferentially spaced tabs 809 are provided to provide a stop against the media inlet face 804. Accordingly, the shell 810 can be inserted over the inlet face 804 of the media 802 until the tabs 809 engage the inlet face 804. The shell further includes projections 808 that act as the first members 808 of the projection-receiver arrangement 540. Accordingly, the projections 808 are received into the receiving structures 542 of the housing body 504. The projections 808 include an end wall 844 similar in shape to the projection 608, but are instead supported by a radially extending sidewall 846 extending across the top side of the shell 810. As a result of this configuration, the perimeter edges 844a, 844b, 844c of the end wall 844 are the features directly engaged with the receiving structures 542. It is noted that the end wall and sidewall structures 844, 846 can be used with cartridge 600 while structures 644, 646 could be used with cartridge 800.

In contrast to cartridge 600, the seal arrangement 830 is shown as being molded directly onto a portion of the media 802 and onto a portion of the shell 810. Accordingly, the cartridge 800 is formed by placing both the shell 810 and the media 802 into a mold, and then pouring polyurethane into the mold. This process acts to bond the shell 810 to the media 802 in addition to forming a seal. In one example, the shell 810 can be provided with apertures to allow polyurethane flow between the shell 810 and media 802 to further enhance securing and sealing the media 802 to the shell 810. Shells 600 and 700 may also be provided with apertures to allow the seal structure material to bond the media to the shell. In the example presented, the seal arrangement 830 can be provided with steps 832 such that a pinch-type radial seal can be formed between the seal arrangement 830 and the housing body 504, similar to the arrangement shown for seal arrangement 630'. As with the filter cartridge 630 and 630', the seal arrangement 830 can be formed with alternating first and second segments 836, 838 with the same relationships to the projections 808. As such, the description for the seal geometry of seal arrangement 630 is applicable for seal arrangement 830, and need not be described further in this section.

As with filter cartridges 600, 600', 700, and 700', the filter cartridge 800', including the media 802, surrounding shell 810, and seal arrangement 830, may be provided in many different shapes, for example, circular, rectangular, obround, and other essentially geometric shapes with rounded or non-rounded corners. Some examples of obround include an oval shape with opposite curved ends attached by a pair of opposite sides. In some oval shapes, the opposite sides are also curved. In other oval shapes, sometimes called racetrack shapes, the opposite sides are generally straight.

H. Air Filter Cartridge 900, Air Filter Cartridge 700', and Housing 500', FIGS. 73-77

Referring to FIGS. 73-77, an alternative filter cartridge 900 and a modified housing 500' is presented. The depicted air cleaner assembly also includes a modified safety filter cartridge 700'. In this example, the media 902 and shell 910 (and previously discussed alternatives) share many overlapping or similar features with filter cartridge 600 and housing 500. Accordingly, similar reference numbers will be used for similar features (e.g. 902 instead of 602) and the overlapping features need not be discussed further here.

Figure 73:
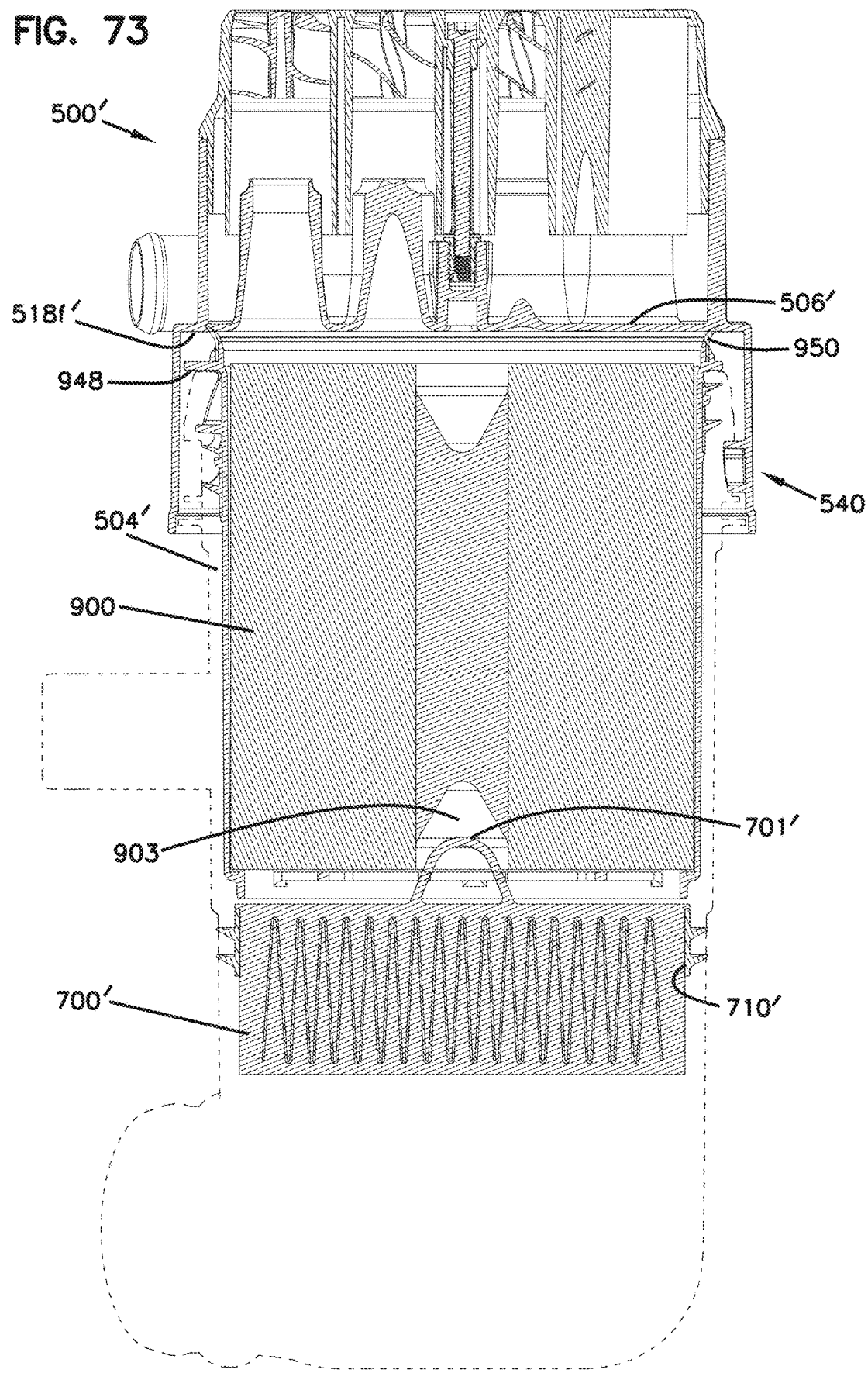
FIG. 73 is a schematic, side, cross-sectional view of an air cleaner assembly including features and components in accord with the present disclosure.

Referring to FIG. 73, it can be seen that the filter cartridge 900 is provided with an additional seal arrangement 950 that extends axially from the first end 914 of the shell 912 in a direction away from the second end 916. The seal arrangement 950 forms an axially directed seal against the tube sheet 518*f*′ of the inner cover portion 506′ associated with the pre-cleaner. Thus, the seal arrangement 950 ensures that air exiting the precleaner is introduced into the filter cartridge 900 while ensuring that air cannot bypass around the precleaner and enter the filter cartridge 900. In one example, the seal arrangement 950 is an injection molded seal (e.g. TPE) that is directly formed onto the shell 912. In one example, the seal arrangement 950 is separately formed and later installed onto the shell 912 with or without an adhesive. The primary seal arrangement 930 is also modified in comparison to seal arrangement 630 and is described in more detail later with respect to FIG. 76*a*. Another difference with filter cartridge 900 is that the shell 910 is provided with handle portions 948 that is formed with the circumferential sidewall 928 and extends over the second member 908 of the receiving-projection arrangement. FIG. 73 also shows the safety filter 700′ in a modified arrangement in which the seal arrangement 730′ includes two relatively thicker seal lips 732′ instead of three. The safety filter 700′ is also shown as being provided with a handle portion 701′ that is received into a central void area 903 formed by the media pack 902. The handle portion 701′, which is integrally molded into the shell 710′, enables a service person to more easily install and remove the safety filter cartridge 700′ into and out of the housing 500′.

Figure 74:
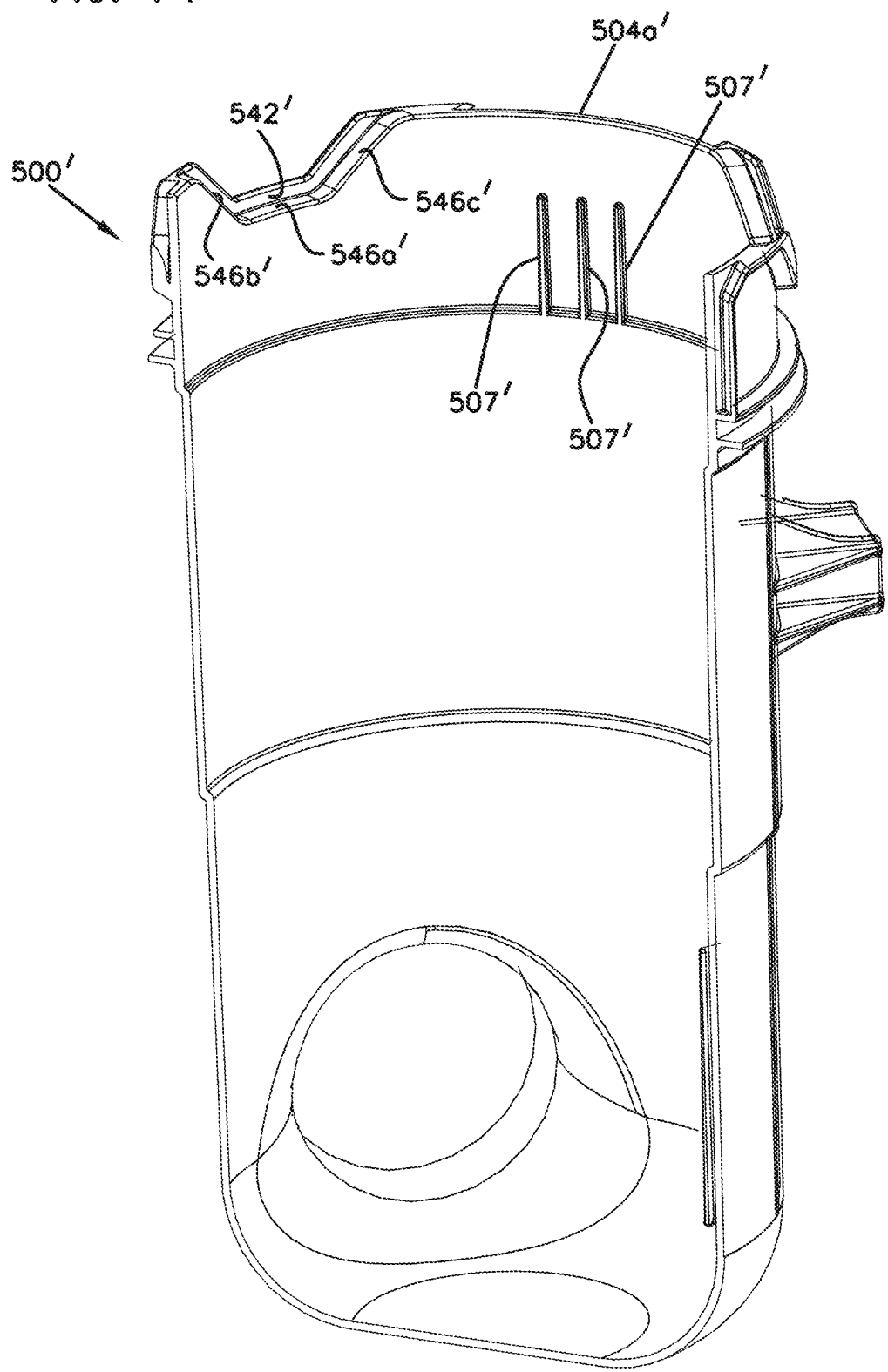
FIG. 74 is a schematic, perspective, cross-sectional view of a housing of the air cleaner assembly shown in FIG. 73.

Referring to FIG. 74, portions of the housing 500′ are shown that differ over housing 500. The primary difference is that first members 542′ of the projection receiver arrangement 540′ do not fully extend up to the open end 504*a* and instead trace the general trapezoid-shape of the sidewalls 546 to create a lip. This modified shape creates an open area that allows an operator's fingers to reach inwardly and grasp the filter cartridge handle portions 948 without the interference of the member 542′, even when the filter cartridge 900 is fully installed into the housing 900. As has been mentioned previously, the housing first members 542, the filter cartridge second members 908, and related handle portions 948, can be provided in numbers other than the three shown. For example, arrangements in which two oppositely arranged members and handles can be provided, as can an arrangement with four equally spaced members and handles. In implementations where an even number of oppositely positioned handle members are provided, the filter cartridge 900 can be removed by a pulling action that is parallel to the longitudinal axis of the filter cartridge 900. In the example shown with three handle members, grasping and pulling any two of the handle members will result in some eccentric force. The housing 500′ also includes a slightly different rib structure 507′.

Figure 75:
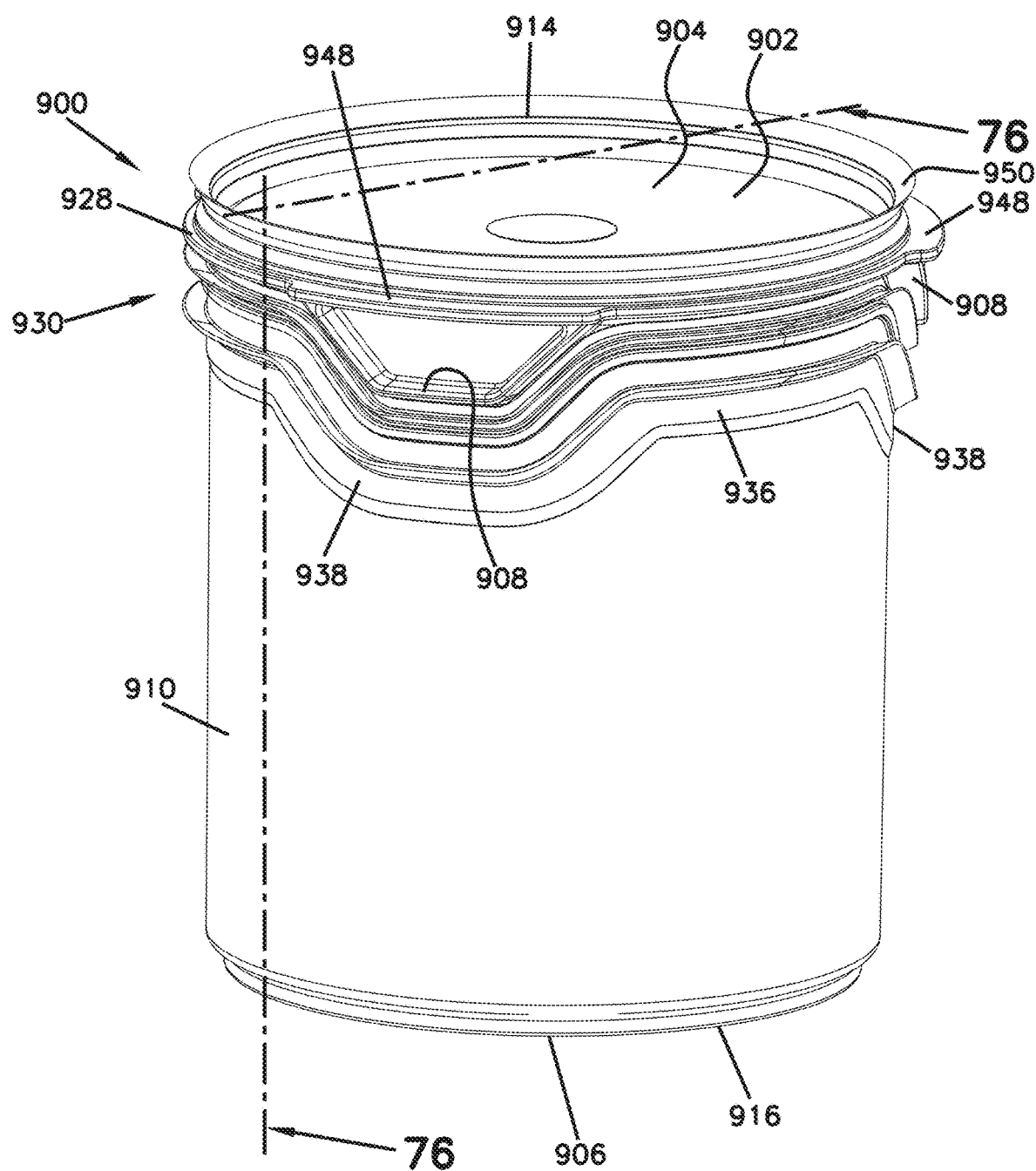
FIG. 75 is a schematic, perspective view of a filter cartridge of the air cleaner assembly shown in FIG. 73.
Figure 76:
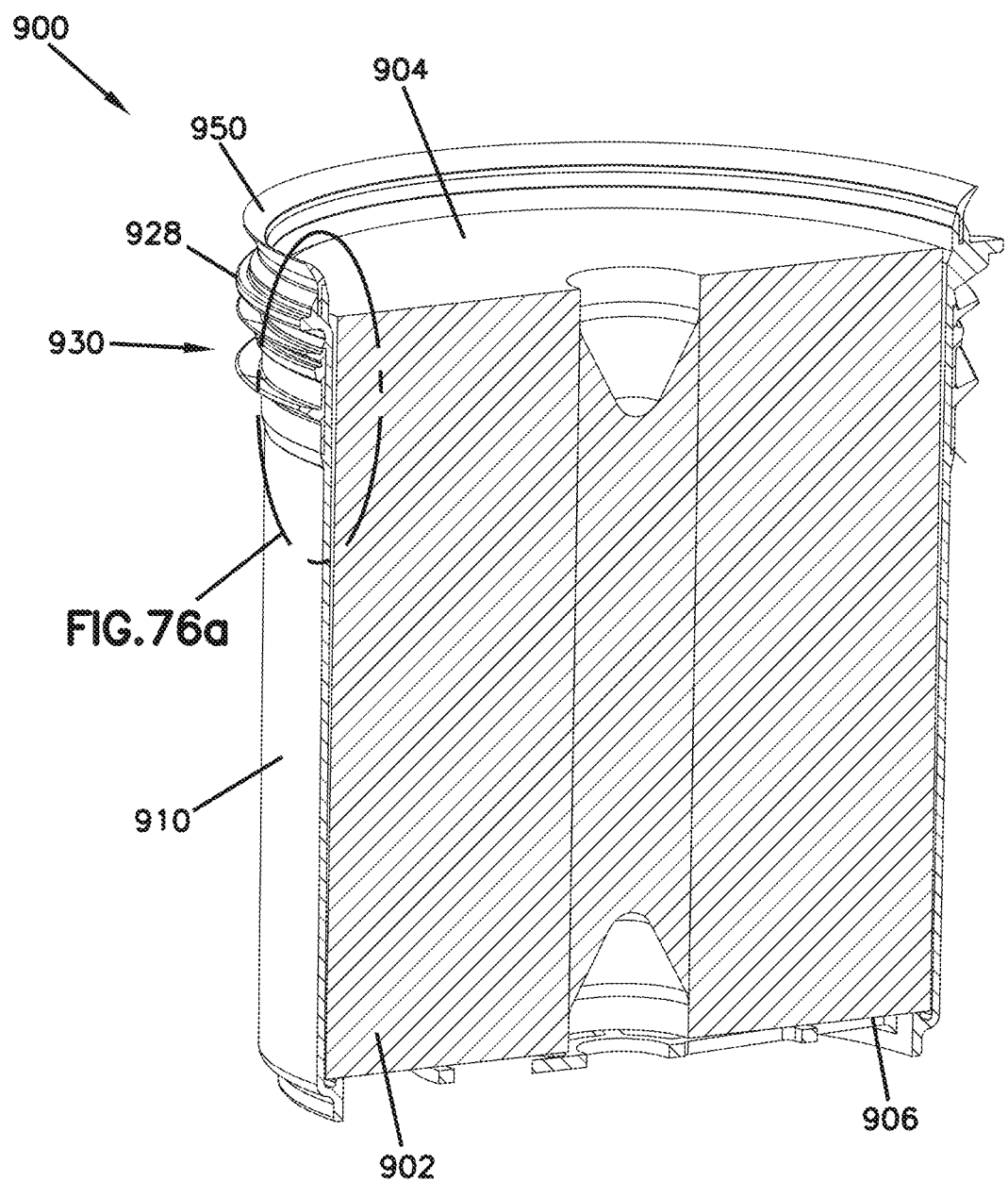
FIG. 76 is a schematic, cross-sectional view of the filter cartridge shown in FIG. 75, taken along the line 76-76.
Figure 76A:
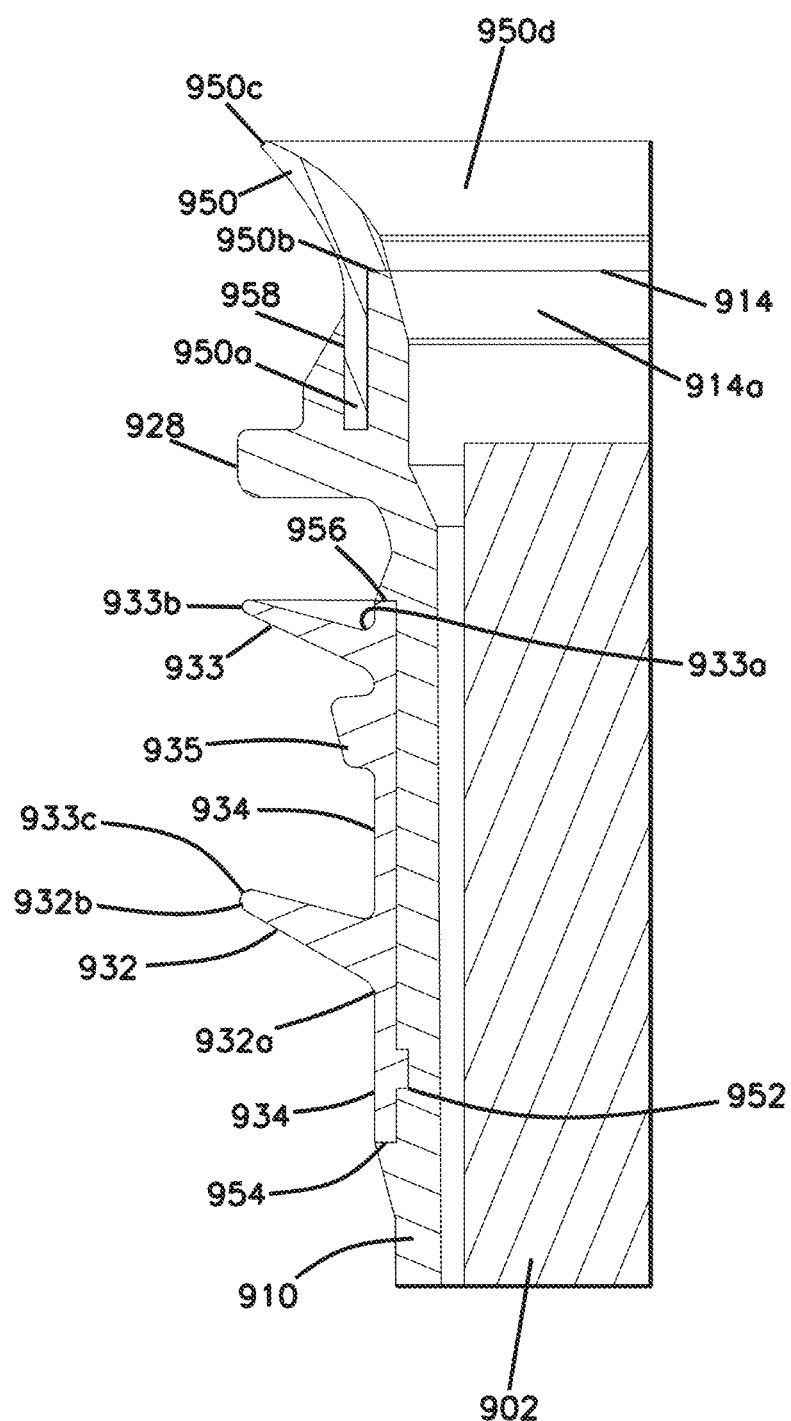
FIG. 76a is a schematic, cross-sectional view showing an enlarged portion of the filter cartridge shown in FIG. 76.
Figure 77:
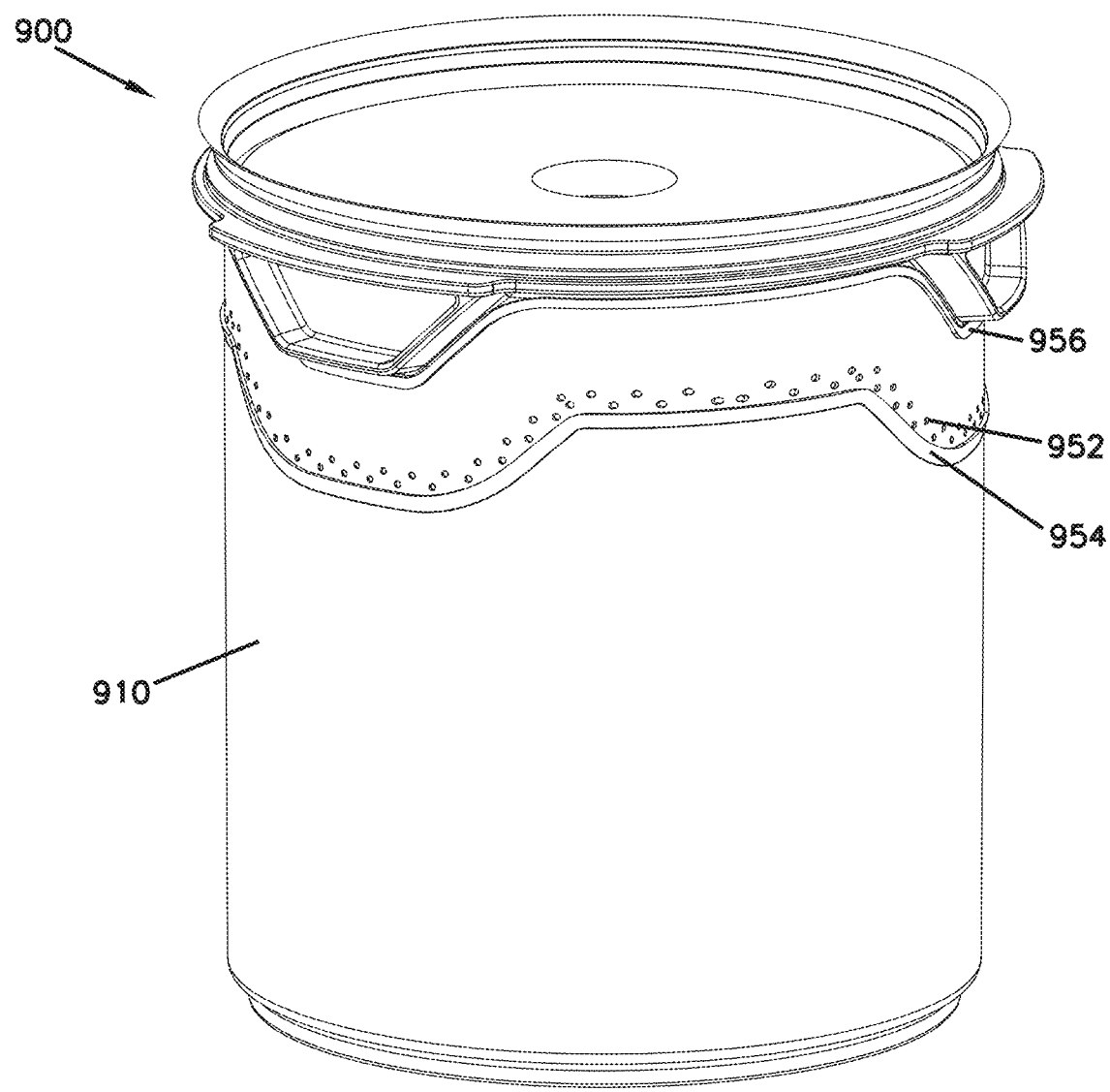
FIG. 77 is a schematic, perspective view of a filter cartridge of the air cleaner assembly shown in FIG. 73, with a seal arrangement removed.

Referring to FIGS. 75 to 77, the filter cartridge 900 is shown in further detail. As most easily seen in the enlarged view presented at FIG. 76*a*, it can be seen that the seal arrangement 950 is partially disposed within a channel 958 formed within the shell 910 at a leg portion 950*a*, and that the seal arrangement 950 tapers from a base portion 950*b* adjacent the shell open end 914 to a distal end 950*c*. The seal arrangement 950 is also shown as flaring radially outward as it extends in the axial direction such that the seal arrangement 950 can be said to be conically or frustoconically shaped. The seal arrangement 950 is also shown as extending across the shell open end 914 such that the radial inner surface 950*d* of the seal arrangement 950 is flush with a radial inner surface 914*a* of the shell open end 914 to ensure a smooth path for airflow.

With continued reference to FIG. 76*a*, differences between the seal arrangement 930 and the seal arrangement 630 can be seen in greater detail. Rather than having three seal lips 632 that extend radially, seal arrangement 930 includes two seal lips 932, 933 that extend at an oblique angle to the filter cartridge longitudinal axis from the base portion 934 such that the seal lips extend in a radial outward direction and in an axial direction towards the open end 914*a*. The seal arrangement 930 also includes a bumper projection 935 extending from the base portion 935 at a location between the seal lips 932, 933. The bumper projection 935, which is an area of thickened material extending radially outward, operates to help maintain the filter cartridge 900 in a generally centered position within the housing 500′ and limits radial movement of the filter cartridge 900 within the housing 500′. Accordingly, the bumper projection 933 ensures that the seal lips 932, 933 do not become overly compressed on one side and then uncompressed and potentially unsealed to the housing 500′ on the opposite side. The bumper projection 935 can also be positioned at other locations.

As shown, the seal lip 932 tapers from a wider base portion 932*a* to a narrower distal end 933*a* while the seal lip 933 tapers from a wider base portion 933*a* to a narrower distal end 933*b*. The tapered configuration is advantageous as it allows better demoulding of the seal lip and a better flow of the plastic when injected in the mold.

It is also noted that the seal lip 933 is generally narrower than the seal lip 932, wherein the seal lip 933 acts as a secondary type seal to inhibit dust intrusion while the seal lip 932 acts as a primary type seal to fully seal the filter cartridge 900 such that all air passing through the housing 500′ must pass through the filter cartridge media 902.

As with the seal arrangement 950, the seal arrangement 930 can be injection molded onto the shell 910 with a thermoplastic material, such as TPE. To facilitate bonding to the shell 910, surface features 952 can be provided in the shell surface. As can be seen at FIG. 77, the surface features include a plurality of spaced indentations into which the injection molded material can flow and bond. The shell 910 can be provided with stops or ridges 954 and 956 to positively control the flow of the injected material. The stops or ridges 954, 956 can also function as a mechanical lock to additionally secure the seal arrangement 930 in place on the shell 910. Due to manufacturing limitations, an injection molded seal arrangement 930 will have mold line seams at some portion along the seal arrangement 930. In one advantageous configuration, the mold is constructed such that the seam line 932*c* traversing the seal lip 932 is circumferentially disposed around the distal end 932*b*. In such a configuration, the seam line will not interfere with sealing performance of the seal arrangement 930. As the seal lip 933 is a secondary type seal, the mold can leave seam lines extending transversely to the circumferential plane of the seal lip (i.e. parallel to the longitudinal axis of the filter cartridge 900) without greatly compromising the function of the seal lip 933.

In alternate arrangements, the seal arrangements 930 and/or 950 can be separately formed and later bonded to the shell 910, for example with an adhesive or via friction or a mechanical securement without an adhesive. In such a case, the ridges 954, 956 can be provided with a larger profile in cross-section to more securely hold the bonded seal member 930.

I. Air Cleaner Assembly 1000, FIGS. 78-80

Figure 78:
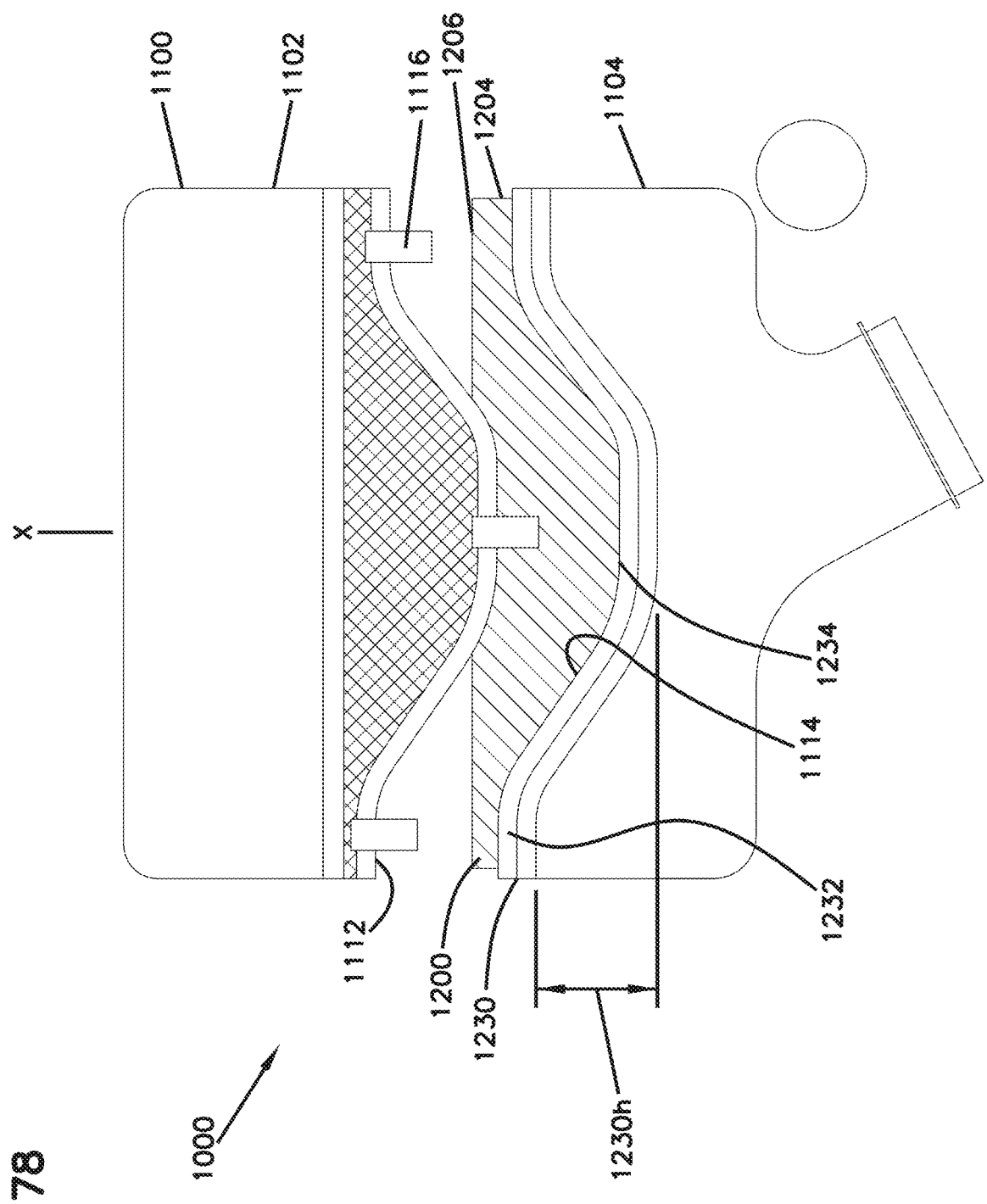
FIG. 78 is a schematic side view of an air cleaner arrangement in accordance with the present disclosure.
Figure 79:
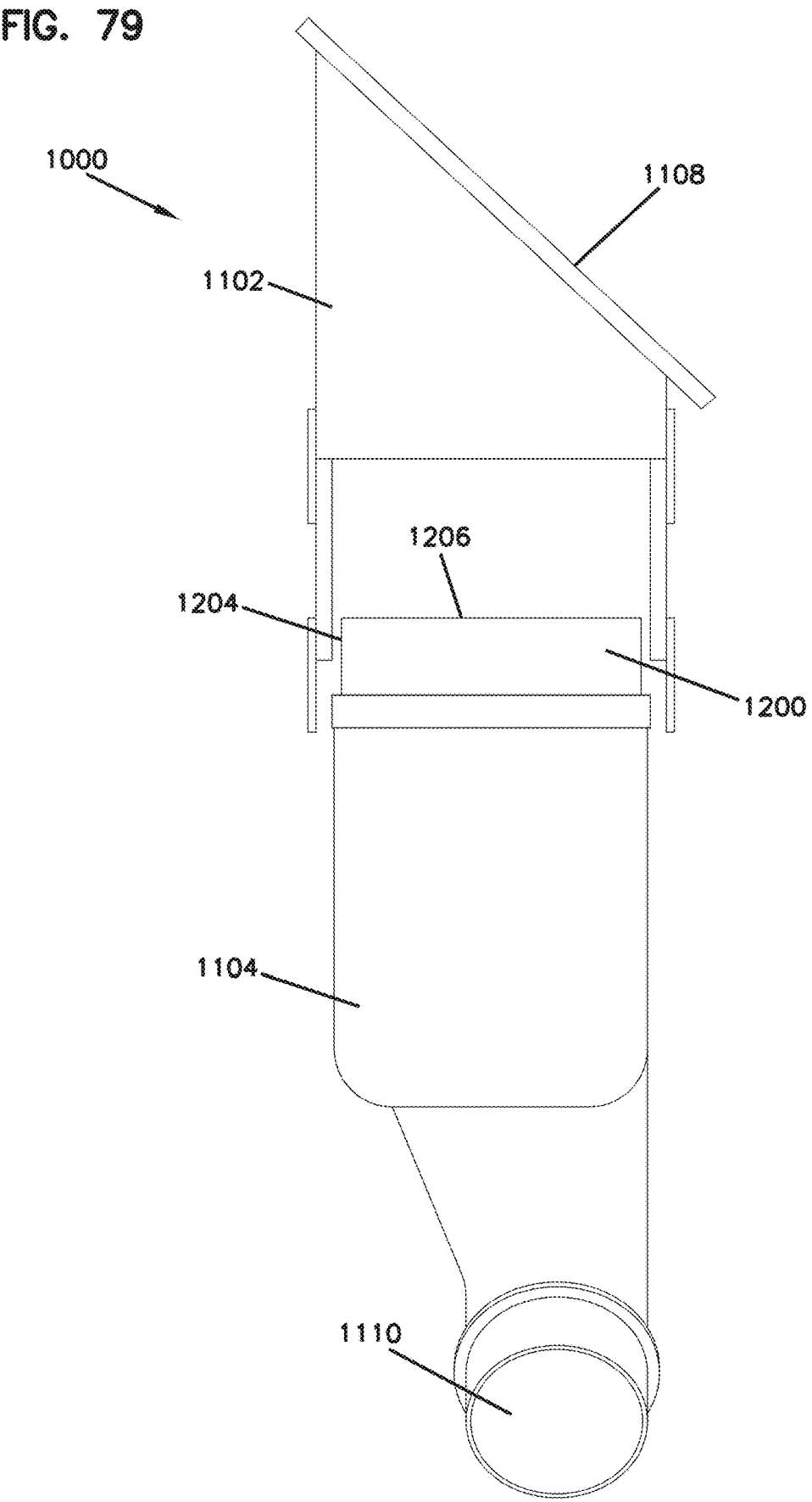
FIG. 79 is a schematic side view of the air cleaner arrangement shown in FIG. 78.
Figure 80:
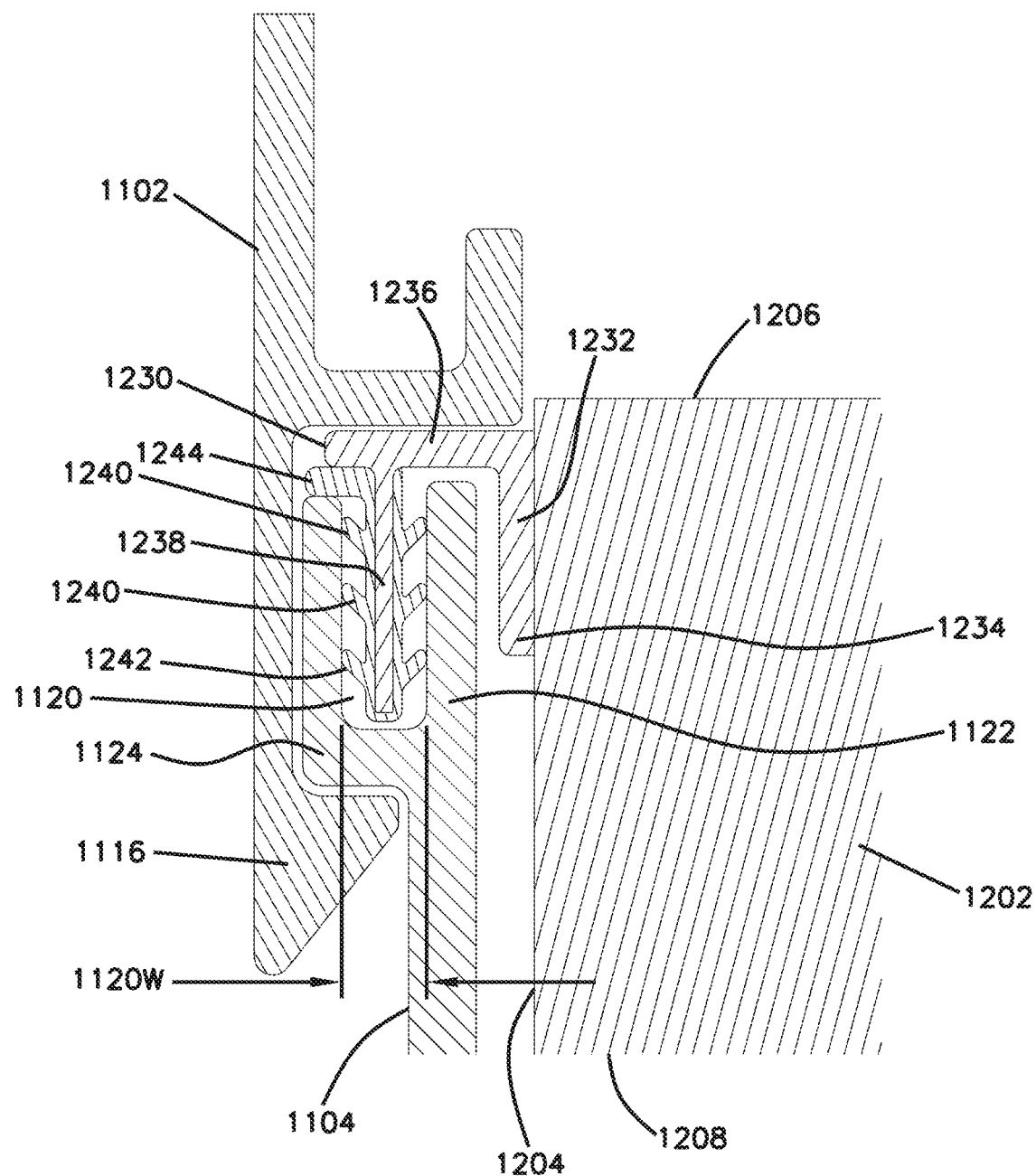
FIG. 80 is a schematic cross-sectional view of a portion of the air cleaner arrangement shown in FIG. 78.

Referring to FIGS. 78-80, an air cleaner assembly 1000 is shown which is similar to the previously described arrangements in that the air cleaner assembly 1000 includes a housing 1100 within which a filter cartridge 1200 is provided having a media pack 1202 with a seal arrangement 1230 circumscribing the media pack outer perimeter 1204, wherein the seal arrangement 1230 includes a first seal segment 1232 and at least one adjoining deviation seal segment 1234 extending away from the first seal segment in a direction toward one of the inlet and outlet flow ends 1206, 1208 of the media pack 1202. As can be seen at FIGS. 78 and 79, the housing 1100 includes a first part 1102 and a mating second part 1104 to define an interior space within which the filter cartridge 1200 is positioned. The first part 1102 includes an air intake 1108 and the second part has an air outlet 1110. In operation, air enters the air intake 1108, passes through the filter cartridge 1200, and then exits the air outlet 1110. Air is prevented from bypassing the filter cartridge by operation of the seal arrangement 1230. As with the other media packs described and shown herein, the media pack 1202 can have fluted type media or pleated type media, or another type of media.

As can be most easily seen at FIG. 78, the first housing part 1102 and the second housing part 1104 have complementarily shaped, axially deviating ends 1112, 1114 that adjoin each other. The seal arrangement 1230 also follows the path defined by the ends 1112, 1114 such that the seal is also axially deviating at a height 1230$h$ in a manner similar to the previously described examples. Latches 1116 can be provided to secure the housing halves 1102, 1104 together.

Referring to FIG. 80, the seal arrangement 1230 can be viewed in greater detail. As shown, the seal arrangement 1230 includes a circumferential support member 1232 that is bonded to the media pack 1202 or that is part of a shell surrounding the media pack of the type previously described. The circumferential support member 1232 includes an axially extending part 1234 and an adjoining radially extending part 1236. From the part 1236, an axially extending seal support part 1238 extends in a direction essentially parallel to the mounting part 1234. The seal arrangement 1230 can further include a sealing member 1240 which includes a plurality of seal lips 1242 and a bumper portion 1244. In the example shown, the seal support part 1238 is provided as a relatively hard plastic and the seal lips 1242 and bumper portion 1244 are injection molded onto the seal support part 1238 with a relatively softer material (e.g. TPE). The housing part 1104 can be formed with a channel 1120 having a width 1120$w$ defined by an inner wall 1122 and an outer wall 1124. The seal lips 1242 seal against the inner and outer walls 1122, 1124. The bumper portion 1244 prevents hard-to-hard contact between the housing parts 1102, 1104 and the seal support 1232 and also provides for an axial compression surface between the two latched housing parts 1102, 1104.

As should be appreciated, the width 1120$w$ is only a small fraction of the diameter of the media pack 1102. For large sized media packs, a sealing member 1240 that only needs to be sized for insertion into and sealing against a small channel can be advantageous over an arrangement in which the seal member is constructed to circumscribe the media pack. The depicted arrangement thus can have advantages such as lower cost, a more attractive looking product, and performance gains (lower masking of the inlet and outlet faces of the media pack). The design of the seal member 240 is also very insensitive to the dimensional challenges (that would otherwise exist with a large injection molded seal circumscribing the media pack) with mating/interlocking parts and would only be sensitive to features in the injection molded housing that have a small characteristic length and can be controlled within a few thousandths of an inch. Properly designed, the depicted arrangement would have several redundant sealing surfaces that would have a very small contact area, but a relatively high localized contact pressure, which would preserve seal integrity, but keep installation and removal forces to a minimum. The design shown in the FIG. 80 is very insensitive to insertion depth, which means that the use of over-center/music wire latches, and build spring loaded snap features that are molded into the service cover can be foregone. In addition, because of the insensitivity to insertion depth, any number of contours could be generated for the interface between the housing and service cover that would not compromise seal integrity, for example, the axially deviating pattern shown in FIG. 78.

J. Air Cleaner Assembly 2000, FIGS. 81-85

Figure 81:
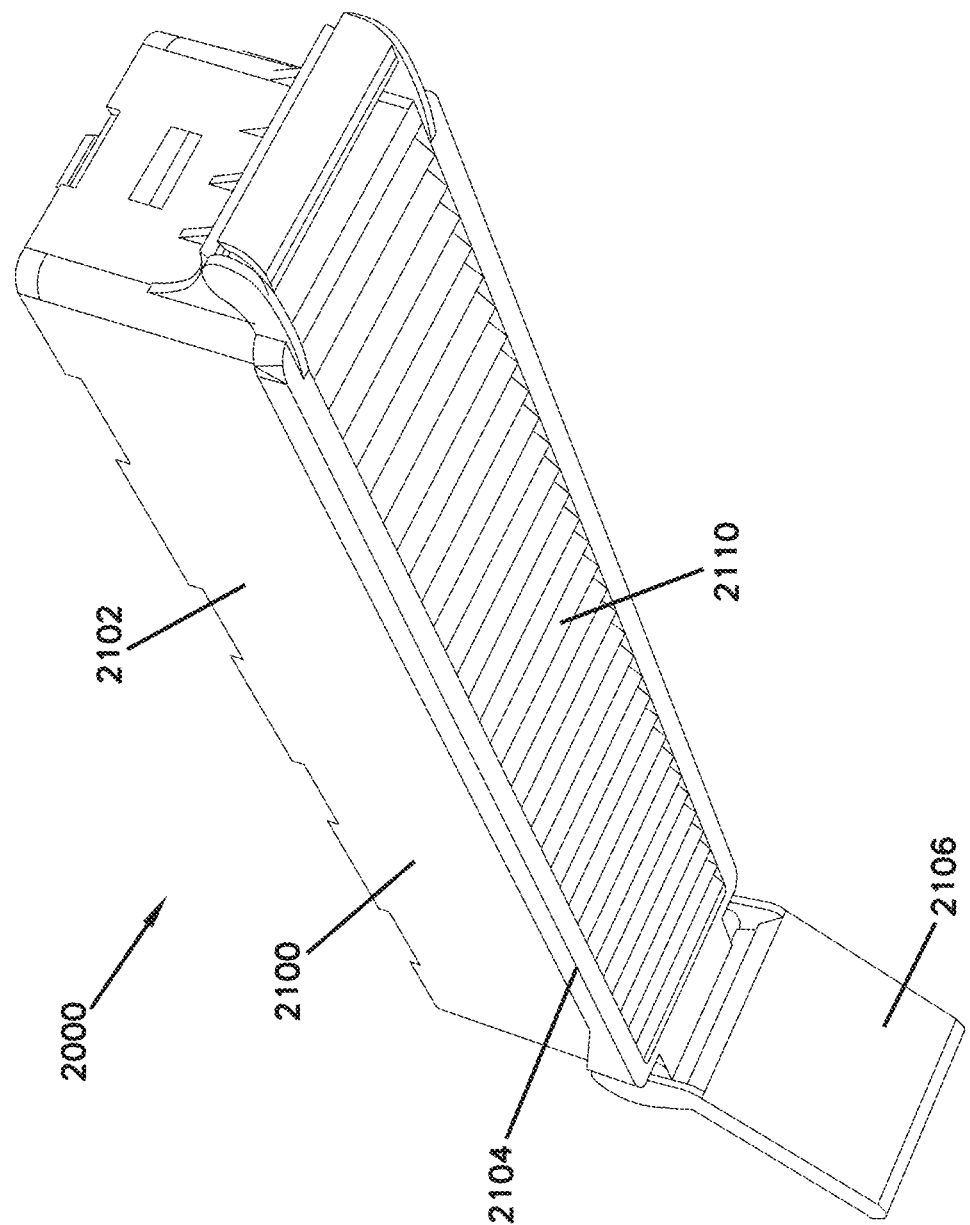
FIG. 81 is a schematic perspective view of an air cleaner arrangement in accordance with the present disclosure.
Figure 82:
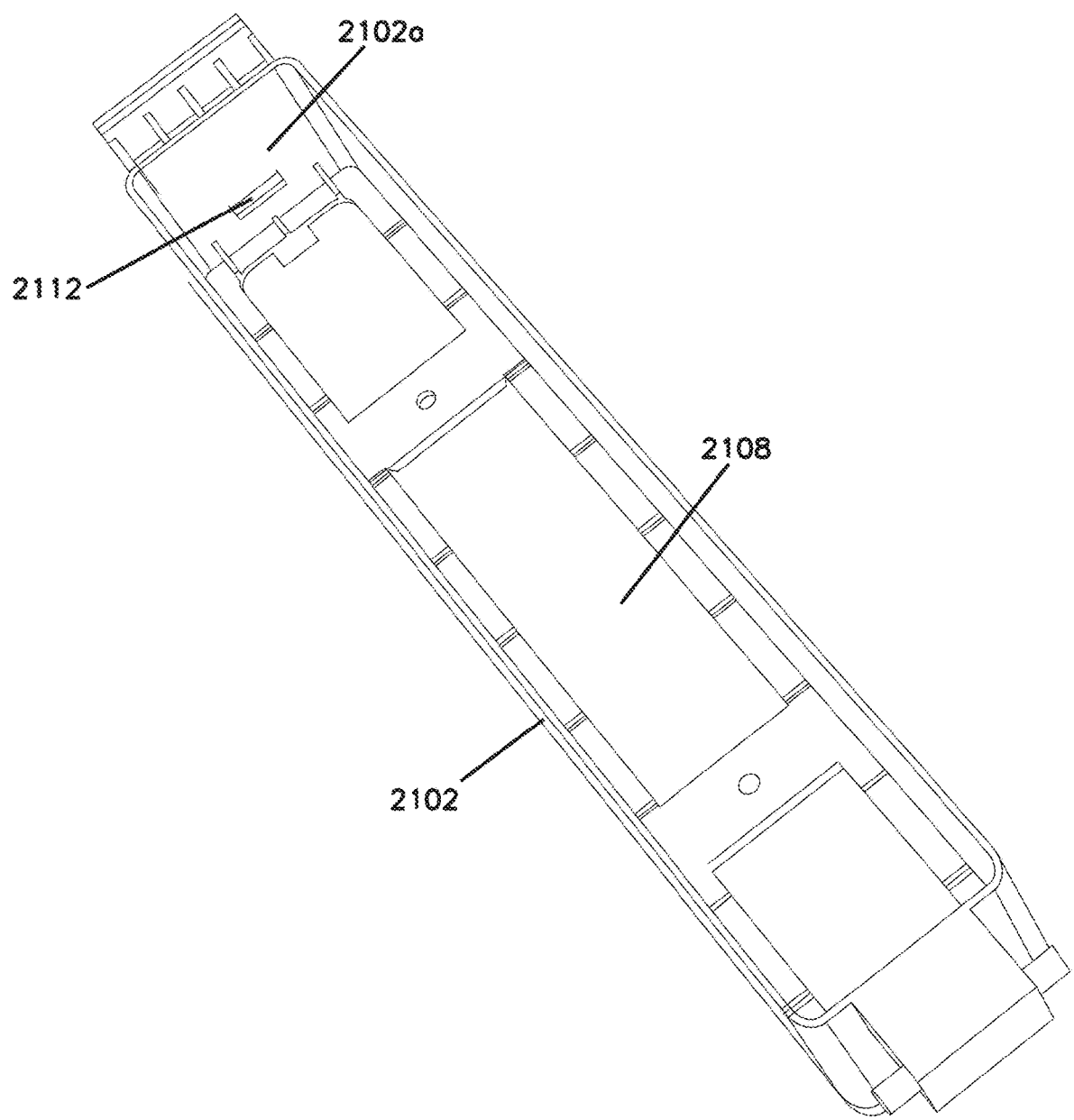
FIG. 82 is a schematic perspective view of a first housing part of the air cleaner arrangement shown in FIG. 81.
Figure 83:
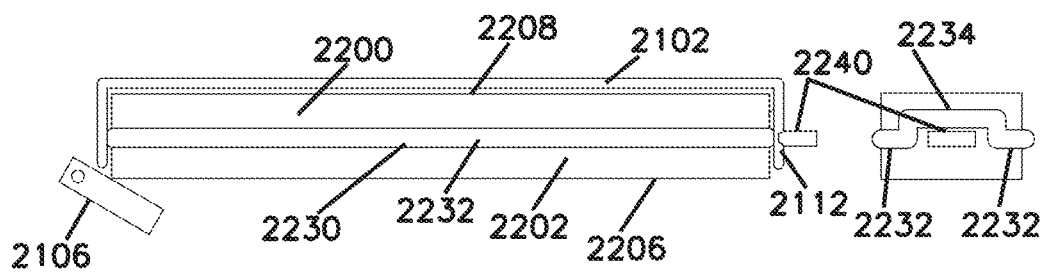
FIG. 83 is a schematic side view of the air cleaner arrangement shown in FIG. 81, with a filter cartridge being in a full installed and secured position.
Figure 84:
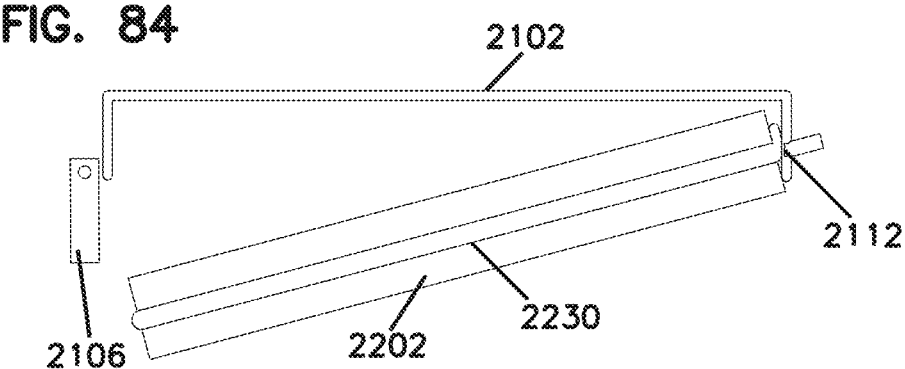
FIG. 84 is a schematic side view of the air cleaner arrangement shown in FIG. 81, with a filter cartridge being partially installed into the housing.

Referring to FIGS. 81-85, an air cleaner assembly 2000 is shown which is similar to the previously described arrangements in that the air cleaner assembly 2000 includes a housing 2100 within which a filter cartridge 2200 is provided having a media pack 2202 with a seal arrangement 2230 circumscribing the media pack outer perimeter 2204, wherein the seal arrangement 2230 includes a first seal segment 2232 and at least one adjoining deviation seal segment 2234 extending away from the first seal segment in a direction toward one of the inlet and outlet flow ends 2206, 2208 of the media pack 2202. As can be seen at FIGS. 81 and 82, the housing 2100 includes a first part 2102 and a second part 2104 defining an interior space within which the filter cartridge 2200 is positioned. As shown, the second part 2104 is rotatable with respect to the first part 2102 and is held in the closed position by a rotatable handle 2106 or other feature to lock the cartridge within the housing first part 2102. The first part 2102 includes an air intake 2108 and the second part 2104 has a louvered air outlet 2110. In operation, air enters the air intake 2108, passes through the filter cartridge 2200, and then exits the air outlet 2110. Air is prevented from bypassing the filter cartridge by operation of the seal arrangement 2230, which forms an outwardly radially directed seal against the sidewall inner surfaces 2102$a$ of the first housing part 2102. As with the other media packs described and shown herein, the media pack 2202 can have fluted type media or pleated type media, or another type of media.

Figure 85:
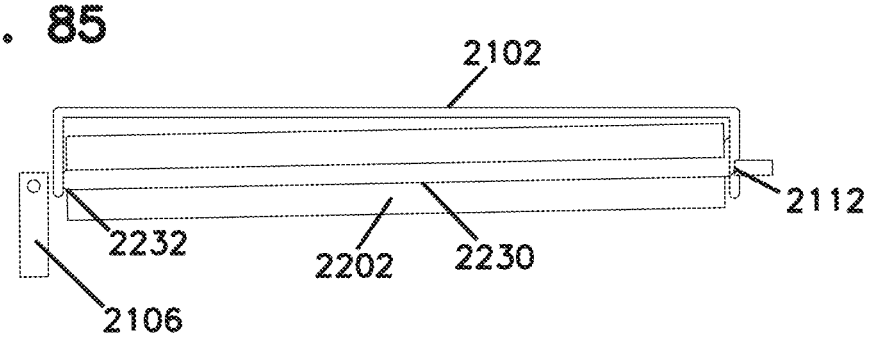
FIG. 85 is a schematic side view of the air cleaner arrangement shown in FIG. 81, with a filter cartridge being in a partially installed position.

In one aspect, the first housing part 2102 includes an aperture or slot 2112 in one of the sidewalls. The slot 2112 is for receiving an extension 2240 of the media pack 2202. The extension and slot arrangement improves serviceability of a panel type filter element that may be located, for example, when the air cleaner 2000 is used as a cabin air filter at the roof of a tractor. Prior to completely installing the filter cartridge 2200 in the housing first part 2102, the extension 2240 of the element is first fitted into the slot 2112 in the housing 2102. The panel 2200 is then beneficially held in place and constrained at one side of the housing 2102. This position can be seen at FIG. 84. The next step, which is shown at FIG. 85, is to further press the cartridge 2200 into its final position making use of the hinge that has been created by the extension and the slot.

Another purpose of this concept is to limit mounting features and interfaces that require narrow production tolerances in-between different parts, e.g. closing handle— filter element—housing. At the hinge side the position of the element with respect to the housing is controlled by the position of the slot and the extension. At the other side, less accuracy is required for only the radial part of the seal. The position of the removable element can be controlled by the closing second housing part 2104 (if provided) and the handle 2106 at this side or other features that lock the panel filter position.

To assure controlled compression of the seal arrangement 2230, a point of rotation that is in line with the seal arrangement is preferred. The hinge created by the element extension 2240 and the slot 2112 in the housing 2102, is for that reason within the virtual plane defined by the radial seal main contact area to the housing. Because this point of rotation is in line with the seal arrangement 2230, a radial seal over the full element circumference cannot be applied due to the presence of the slot 2112 and extension 2240. Basically, the extension 2240 disrupts the gasket area, resulting in leakage along the gasket. This is solved by having an axially deviating seal arrangement 2240 in which the first portion 2232 of the seal arrangement 2230 is in line with the extension 2240 and the second portion 2242 deviates axially towards the inlet end 2108 and around the extension 2240. Alternatively, the second portion 2242 could instead deviate towards the outlet end 2110. In some examples, the seal arrangement 2230 and housing first part 2102 can be configured such that a radial seal is formed between the inner wall surfaces 2102a and the seal arrangement 2230 and/or such that an axial seal is formed between the housing part 1102 and the seal arrangement 2230.

VII. Some Final Comments and Observations

In the following section, text is provided in the form of claims. The claims comprise characterizations indicating a variety of options, features, and feature combinations that can be used in accord with the teachings of the present disclosure. Alternate characterizations of the ones given, but consistent with the descriptions herein above, are possible.

What is claimed:
1. An air filter cartridge comprising:
   (a) a media pack having a media pack outer perimeter and including media having opposite inlet and outlet flow ends; and
   (b) a seal arrangement including a tapered lip seal circumscribing the media pack outer perimeter, the tapered lip seal including a first seal segment and a second seal segment positioned closer to the inlet end than the first segment;
   (c) wherein the seal arrangement includes a plurality of spaced apart lip seals.
2. The air filter cartridge of claim 1, wherein the second seal segment extends away from the first seal segment in a direction toward the inlet flow end.
3. The air filter cartridge of claim 2, wherein the seal arrangement includes a plurality of alternating radially directed first seal segments and second seal segments.
4. The air filter cartridge of claim 2, wherein the second seal segment includes a transition segment disposed at an oblique angle to the first seal segment.
5. The air filter cartridge of claim 1, wherein the seal arrangement is formed from a thermoplastic elastomer material.
6. The air filter cartridge of claim 1, wherein the seal arrangement is injection molded onto the media pack.
7. The air filter cartridge of claim 1, wherein the tapered lip seal is disposed at an oblique angle to the outer perimeter of the media pack.
8. The air filter cartridge of claim 2, wherein the seal arrangement includes three radially directed first seal segments separated by three second seal segments such that the seal arrangement has three orders of rotational symmetry.
9. The air filter cartridge of claim 1, wherein the media pack includes a plurality of flutes extending between the inlet flow end and the outlet flow end, the media pack being closed to passage of unfiltered air therethrough, between the inlet end and the outlet end.
10. The air filter cartridge of claim 9, wherein the seal arrangement and media pack each have a round cross-sectional shape.
11. An air filter cartridge for installation within an interior cavity of an air cleaner housing, the air filter cartridge comprising:
   (a) a media pack having an outer perimeter and including media having opposite first and second ends;
   (b) a seal arrangement disposed about the media pack outer perimeter; and
   (c) a first member of a projection-receiver arrangement extending from the media pack outer perimeter, wherein the first member is circumferentially aligned with at least a portion of the seal arrangement and is configured to engage with a second member of the projection-receiver arrangement associated with the air cleaner housing, wherein the first member defines a projection extending radially in a direction away from the media pack outer perimeter, and wherein the first member is a projection with a first section and an adjoining second section, the second section extending from the first section in a direction towards the media first end and at an oblique angle to the first section.
12. The air filter cartridge of claim 11, further comprising:
   (a) a protective shell surrounding the media pack, wherein the first member is integrally formed with the protective shell.
13. The air filter cartridge of claim 11, wherein the media pack can be aligned for insertion into the air cleaner housing interior cavity in a number of orientations equal to a number of the first members.
14. The air filter cartridge of claim 11, wherein the first member is located between the seal arrangement and the media first end.
15. The air filter cartridge of claim 11, wherein the second member has a third section adjoining the first section, the third section extending in a direction towards the media pack first end and at an oblique angle to the first section.
16. An air cleaner comprising:
   (a) a housing defining an interior cavity, the housing defining a second member of a projection-receiver arrangement; and
   (b) an air filter cartridge received into the interior cavity, wherein the air filter cartridge includes:
      i. a media pack having an outer perimeter and including media having opposite first and second ends;
      ii. a seal arrangement disposed about the media pack outer perimeter; and
      iii. a first member of the projection-receiver arrangement extending from the media pack outer perimeter, wherein the first member is circumferentially aligned with at least a portion of the seal arrangement and is configured to engage with the second member of the projection-receiver arrangement associated with the air cleaner;

(c) wherein the first member of the projection-receiver arrangement is received by the second member, and wherein the second member includes a plurality of radially spaced cavities and the first member includes a plurality of projections received by the plurality of cavities.

17. An air cleaner comprising:
(a) a housing including a sidewall defining an interior cavity; and
(b) an air filter cartridge received into the interior cavity, the air filter cartridge including:
   i. a media pack having a media pack outer perimeter and including media having opposite inlet and outlet flow ends;
   ii. a seal arrangement including a tapered lip seal circumscribing the media pack outer perimeter, the tapered lip seal including a first seal segment and a second seal segment positioned closer to the inlet end than the first segment;
(c) wherein the seal arrangement forms a seal against the sidewall.

\* \* \* \* \*

UNITED STATES PATENT AND TRADEMARK OFFICE
CERTIFICATE OF CORRECTION

| | | |
|---|---|---|
| PATENT NO. | : 11,772,031 B2 | Page 1 of 1 |
| APPLICATION NO. | : 17/066705 | |
| DATED | : October 3, 2023 | |
| INVENTOR(S) | : Kristof Decoster et al. | |

It is certified that error appears in the above-identified patent and that said Letters Patent is hereby corrected as shown below:

In the Specification

Column 16, Line 12: "by like reference numerals" should read --by like reference numerals.--

Column 20, Line 16: "usable to prelcean" should read --usable to preclean--

Column 22, Line 29: "at *600a* filter" should read --at 600 a filter--

Column 23, Line 59: "Referring to FIGS." should read --Referring to FIG.--

Column 25, Line 66: "638*a*, 63*b* are" should read --638*a*, 638*b* are--

Column 29, Line 57: "Cartridge 600," should read --Cartridge 600',--

Signed and Sealed this
Fifteenth Day of April, 2025

Coke Morgan Stewart
*Acting Director of the United States Patent and Trademark Office*